(12) United States Patent
Takyoh et al.

(10) Patent No.: US 10,545,459 B2
(45) Date of Patent: Jan. 28, 2020

(54) DRIVE CIRCUIT FOR TWO-COIL STEP MOTOR, TWO-COIL STEP MOTOR, AND ELECTRONIC WATCH USING THESE

(71) Applicant: CITIZEN WATCH CO., LTD., Tokyo (JP)

(72) Inventors: Yu Takyoh, Nishitokyo (JP); Toshiaki Fukushima, Tokorozawa (JP); Toshinari Maeda, Tokorozawa (JP); Daisuke Iri, Nishitokyo (JP); Daisuke Matsuoh, Nishitokyo (JP)

(73) Assignee: Citizen Watch Co., LTD., Tokyo (JP)

( * ) Notice: Subject to any disclaimer, the term of this patent is extended or adjusted under 35 U.S.C. 154(b) by 0 days.

(21) Appl. No.: 15/754,295

(22) PCT Filed: Sep. 9, 2016

(86) PCT No.: PCT/JP2016/076624
§ 371 (c)(1),
(2) Date: Feb. 22, 2018

(87) PCT Pub. No.: WO2017/043629
PCT Pub. Date: Mar. 16, 2017

(65) Prior Publication Data
US 2018/0246471 A1    Aug. 30, 2018

(30) Foreign Application Priority Data

Sep. 9, 2015 (JP) ................................. 2015-177432

(51) Int. Cl.
*H02P 8/02* (2006.01)
*G04C 3/14* (2006.01)

(52) U.S. Cl.
CPC . *G04C 3/14* (2013.01); *H02P 8/02* (2013.01)

(58) Field of Classification Search
CPC ... H02P 6/182; H02P 8/02; H02P 8/34; G04C 3/14
See application file for complete search history.

(56) References Cited

U.S. PATENT DOCUMENTS

| | | | |
|---|---|---|---|
| 5,550,795 A | * | 8/1996 | Takakura ............... G04C 3/143 318/696 |
| 5,721,959 A | | 2/1998 | Nakamura et al. |

(Continued)

FOREIGN PATENT DOCUMENTS

| | | |
|---|---|---|
| CN | 102576215 A | 7/2012 |
| CN | 107111278 A | 8/2017 |

(Continued)

OTHER PUBLICATIONS

English translation of the International Search Report for PCT/JP2016/076624.

(Continued)

*Primary Examiner* — Thai T Dinh
(74) *Attorney, Agent, or Firm* — HEA law PLLC

(57) ABSTRACT

Provided is a drive circuit for a two-coil stepper motor, including: a rotor; a stator including first, second, and third stator magnetic-pole portions; a coil A to be magnetically coupled to the first stator magnetic-pole portion and the third stator magnetic-pole portion; a coil B to be magnetically coupled to the second stator magnetic-pole portion and the third stator magnetic-pole portion; a drive pulse generation circuit configured to output a drive pulse; a detection pulse generation circuit configured to output a detection pulse for detecting counter-electromotive currents generated in the coil A and the coil B; and a rotation detection circuit configured to receive a detection signal generated due to the detection pulse as input to determine whether or not the rotor has rotated.

10 Claims, 55 Drawing Sheets

(56) References Cited

U.S. PATENT DOCUMENTS

| | | | |
|---|---|---|---|
| 6,476,579 B1 * | 11/2002 | Akahane | G04C 3/143 318/599 |
| 6,946,814 B2 * | 9/2005 | Takemori | H02P 8/16 318/685 |
| 7,129,669 B2 * | 10/2006 | Mamyoda | H02P 6/182 318/685 |
| 8,111,033 B2 * | 2/2012 | Ogasawara | H02P 8/38 318/466 |
| 8,319,468 B2 * | 11/2012 | Manaka | G04C 3/143 318/685 |
| 2009/0206789 A1 * | 8/2009 | Kasuo | H02P 8/02 318/696 |
| 2010/0238768 A1 * | 9/2010 | Kato | G04C 3/143 368/80 |
| 2011/0235472 A1 * | 9/2011 | Hasegawa | G04C 3/143 368/80 |
| 2012/0204640 A1 | 8/2012 | Takyo et al. | |
| 2015/0084573 A1 | 3/2015 | Saito et al. | |
| 2017/0357216 A1 | 12/2017 | Fukushima et al. | |

FOREIGN PATENT DOCUMENTS

| | | | |
|---|---|---|---|
| EP | 2487549 A1 | | 8/2012 |
| JP | 63-058192 A | | 3/1988 |
| JP | H02-16679 B2 | | 4/1990 |
| JP | 2014-195371 A | | 10/2014 |
| JP | 2014195371 A | * | 10/2014 |
| JP | 2015-084633 A | | 4/2015 |

OTHER PUBLICATIONS

JPS63-058192A—European search Report and Search opinion for related application, App. No. 16844490, dated Mar. 14, 2019, pp. 1-15.

* cited by examiner

FIG.3
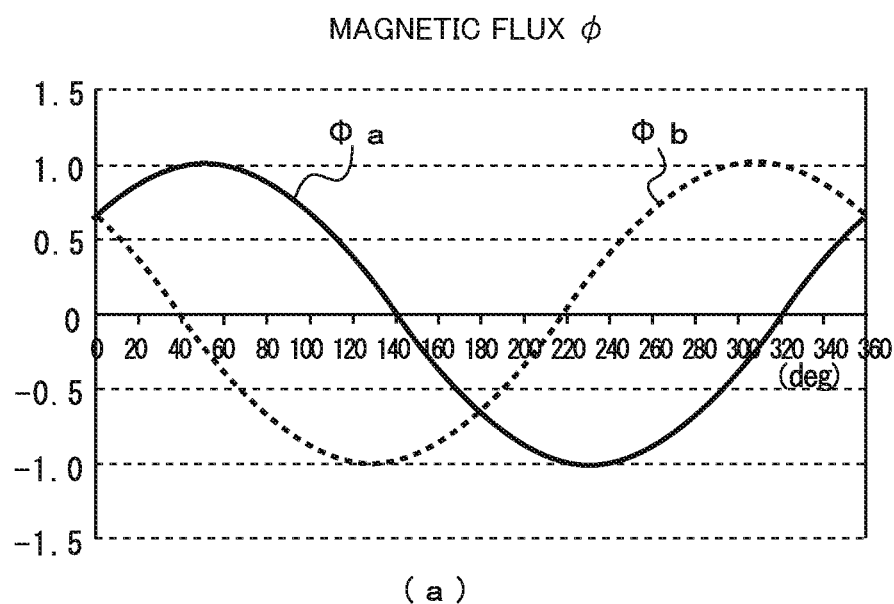
(a)
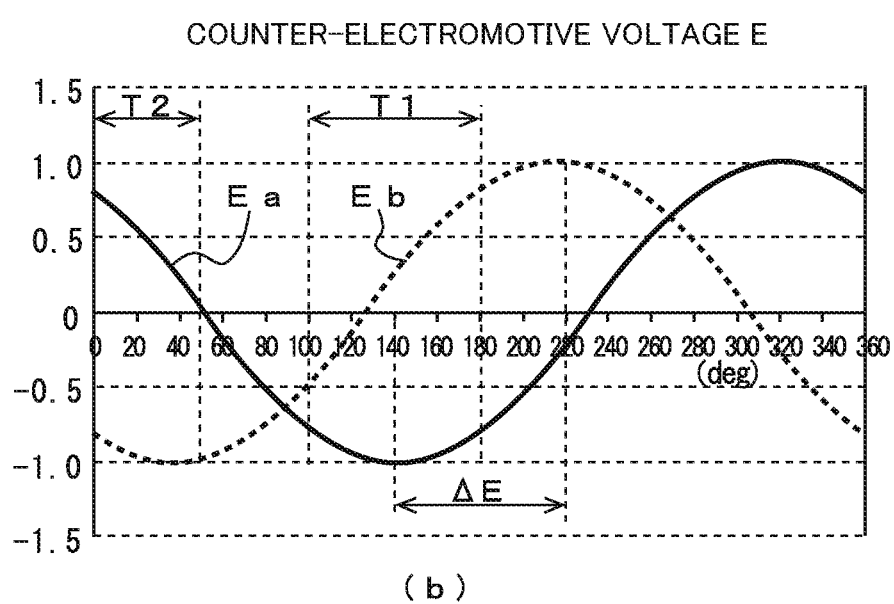
(b)

FIG.5
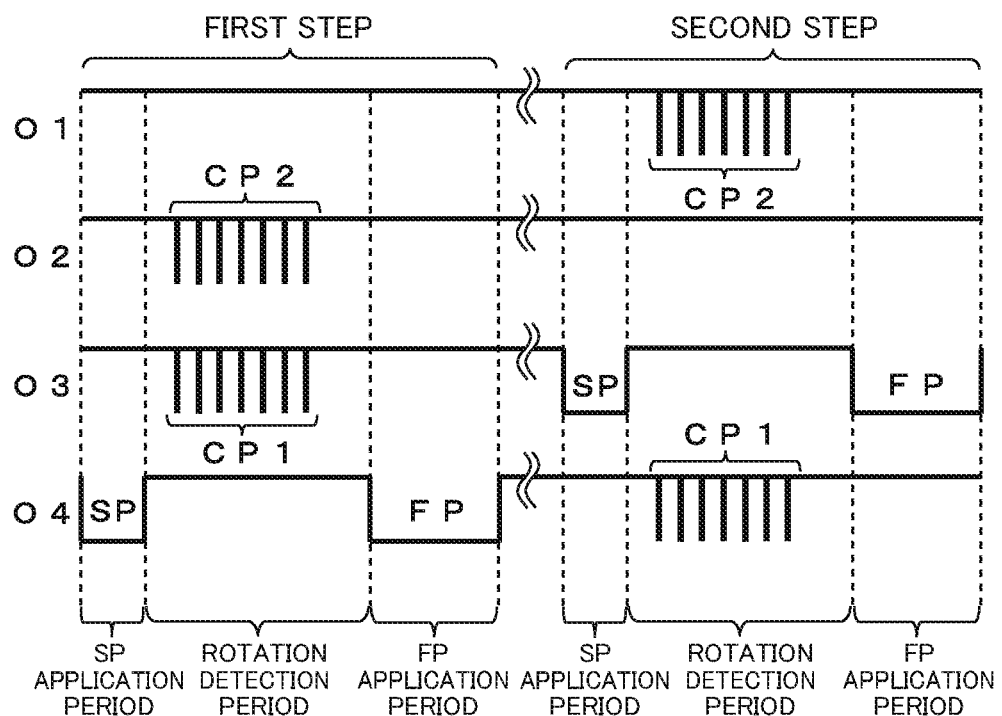
(a)
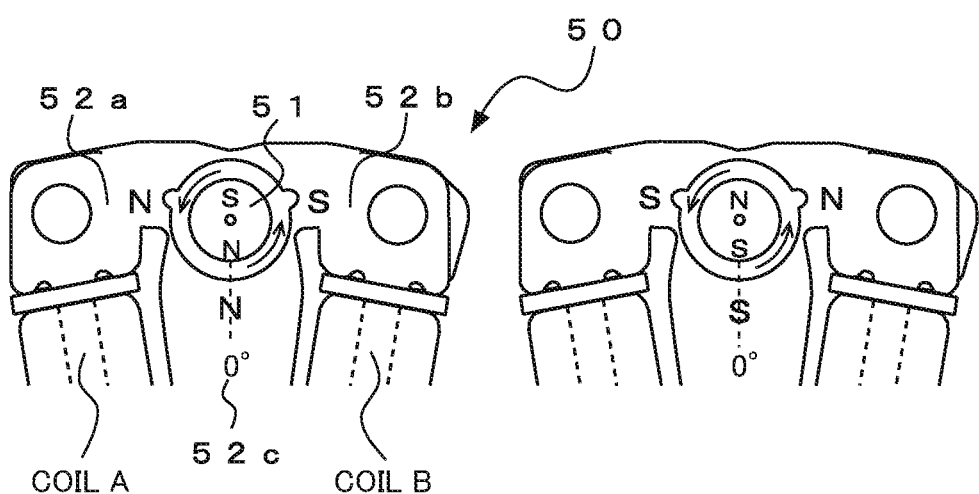
(b)  (c)

FIG.6
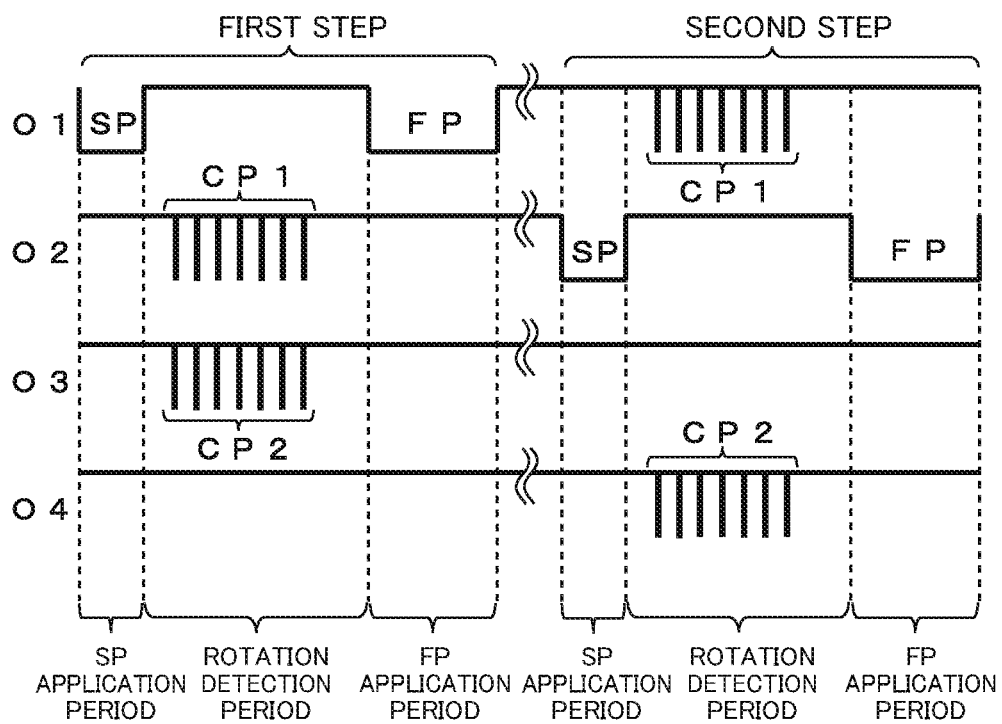
(a)
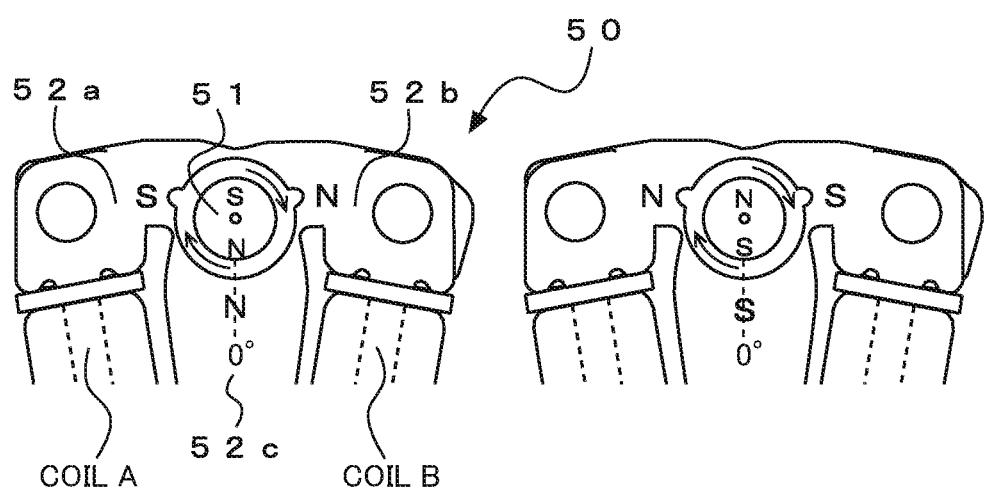
(b)  (c)

FIG.7

| DRIVE DIRECTION | FORWARD ROTATION | | | | REVERSE ROTATION | | | |
|---|---|---|---|---|---|---|---|---|
| N-POLE POSITION | 0° | | 180° | | 0° | | 180° | |
| OUTPUT PULSE | SP OUTPUT | CP OUTPUT | SP OUTPUT | CP OUTPUT | SP OUTPUT | CP OUTPUT | SP OUTPUT | CP OUTPUT |
| DRIVE WAVEFORM | O 4 | O2, O3 | O 3 | O1, O4 | O 1 | O2, O3 | O 2 | O1, O4 |
| P 1 | ON | ON | ON | OFF | OFF | ON | ON | OFF |
| N 1 | OFF | OFF | OFF | OFF | ON | OFF | OFF | OFF |
| P 2 | ON | OFF | ON | ON | ON | OFF | OFF | ON |
| N 2 | OFF | OFF | OFF | OFF | OFF | OFF | ON | OFF |
| P 3 | ON | OFF | OFF | ON | ON | OFF | ON | ON |
| N 3 | OFF | OFF | ON | OFF | OFF | OFF | OFF | OFF |
| P 4 | OFF | ON | ON | OFF | ON | ON | ON | OFF |
| N 4 | ON | OFF | OFF | OFF | OFF | OFF | OFF | OFF |
| TP 1 | OFF | ON/OFF | OFF | ON | OFF | ON/OFF | OFF | ON |
| TP 2 | OFF | ON | OFF | ON/OFF | OFF | ON | OFF | ON/OFF |
| TP 3 | OFF | ON | OFF | ON/OFF | OFF | ON | OFF | ON/OFF |
| TP 4 | OFF | ON/OFF | OFF | ON | OFF | ON/OFF | OFF | ON |

(a)

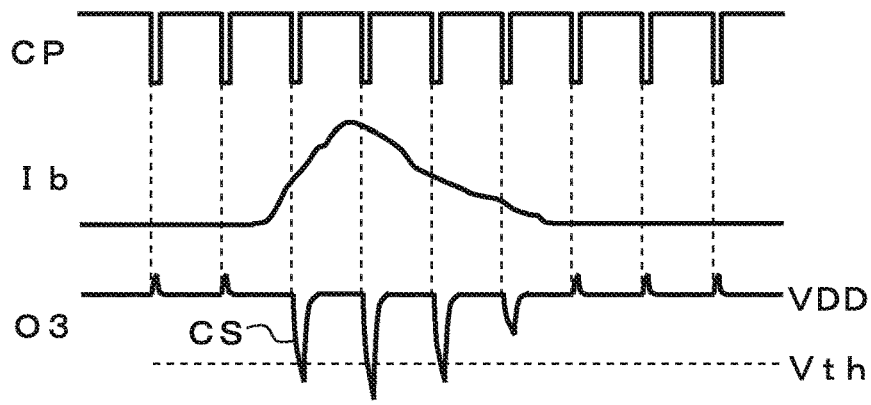

(b)

FIG.18
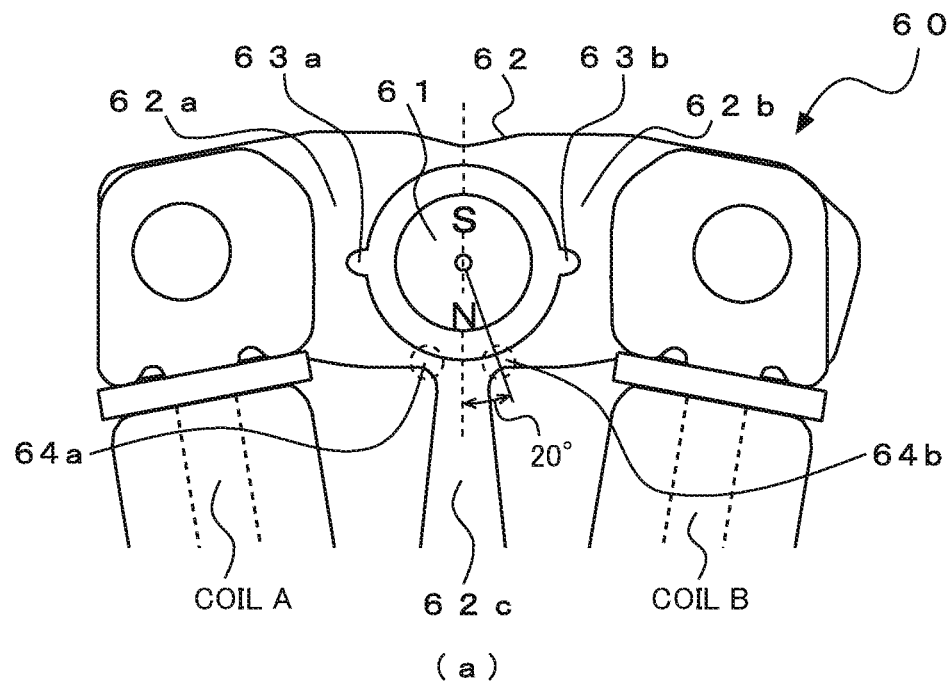
(a)
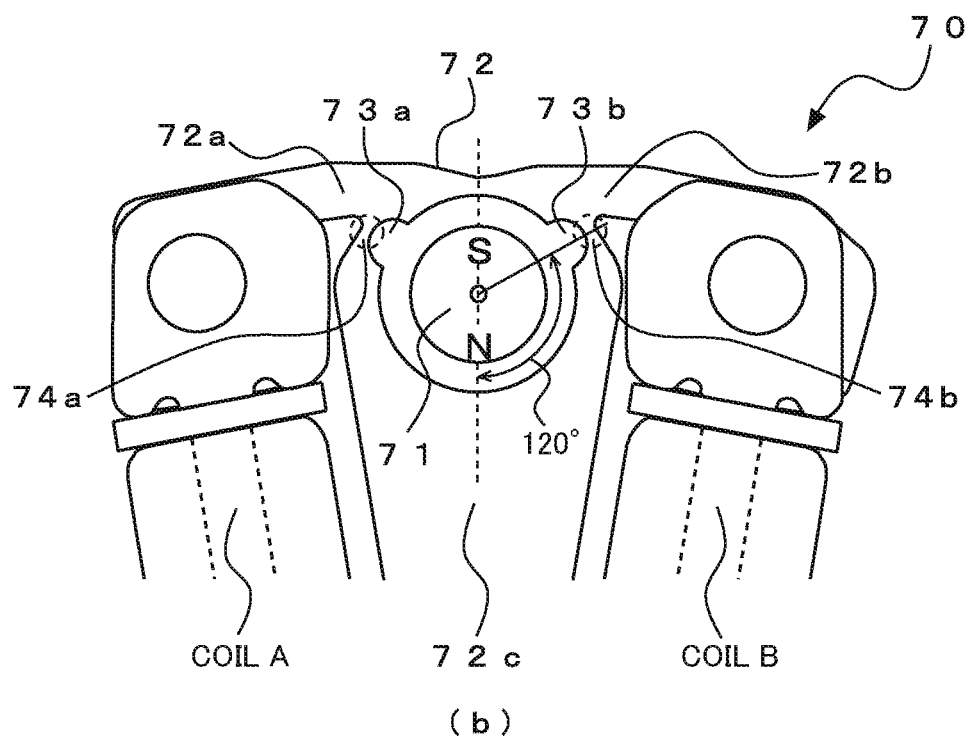
(b)

FIG.24
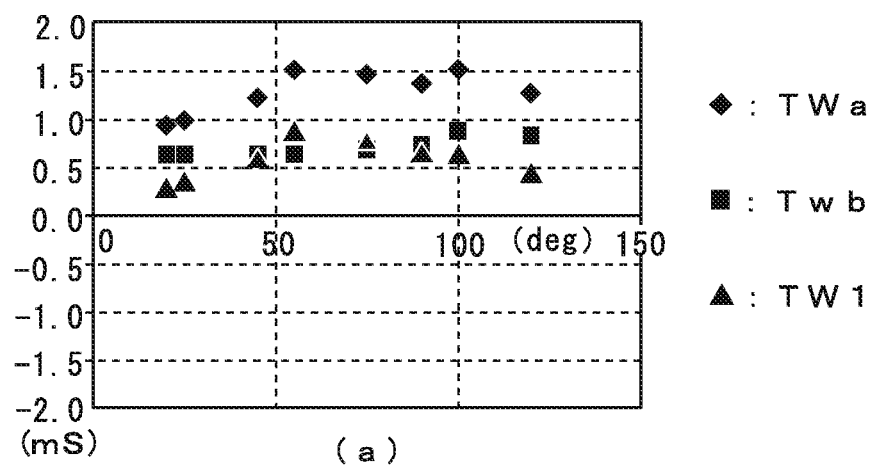
(a)
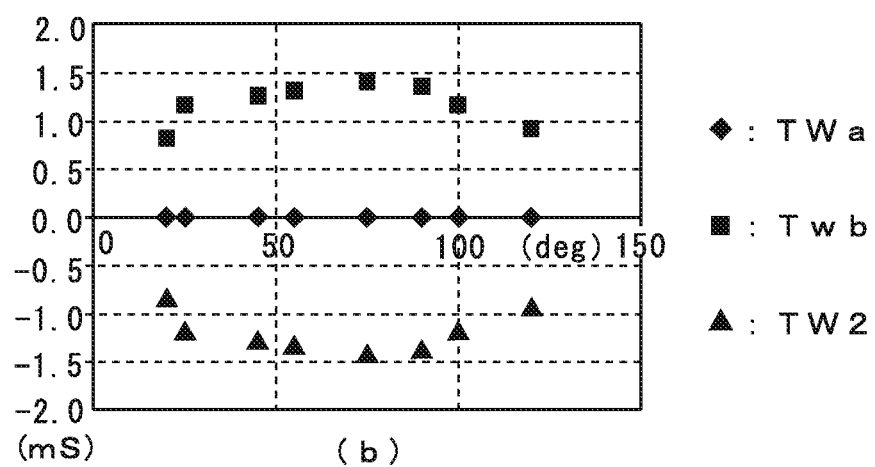
(b)
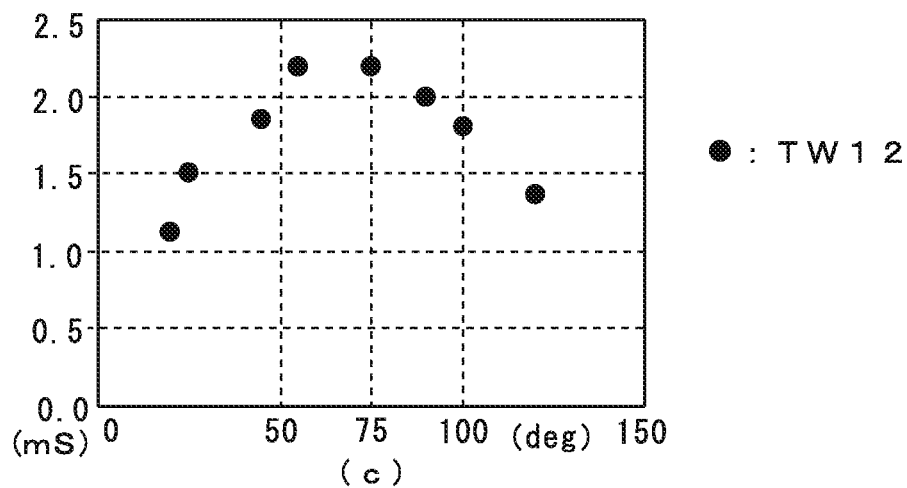
(c)

FIG.25
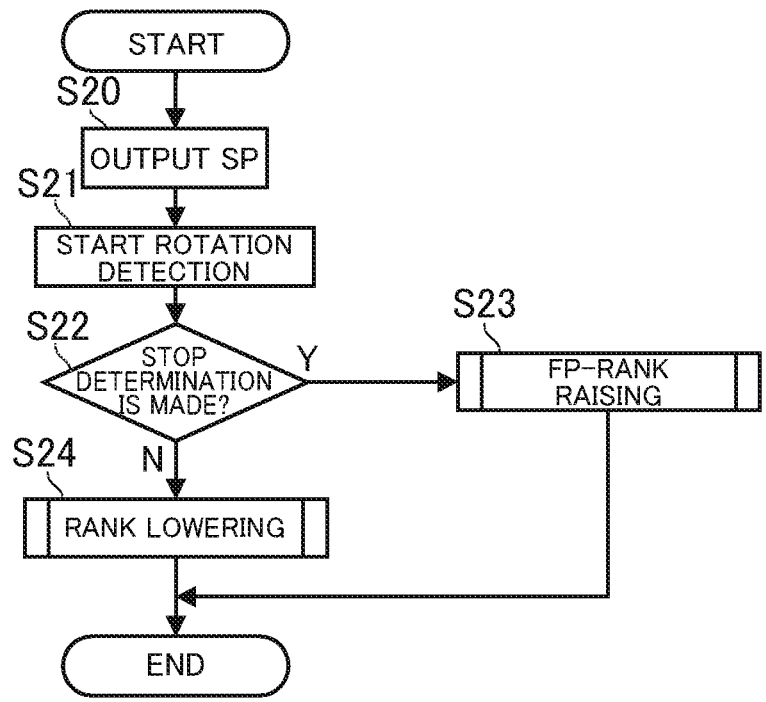
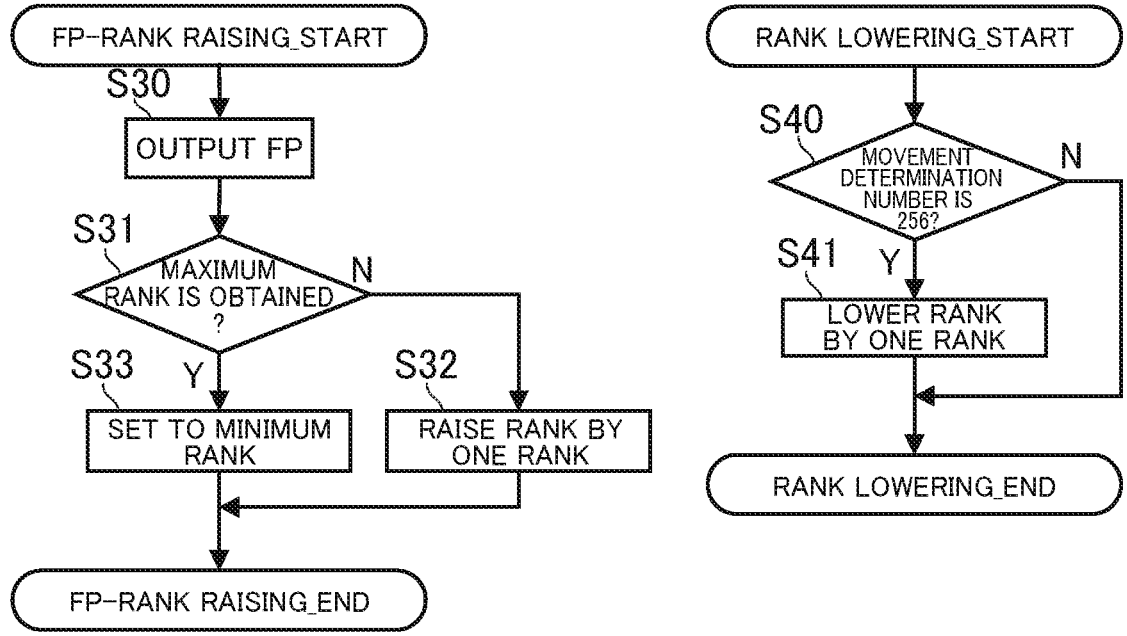

FIG.32
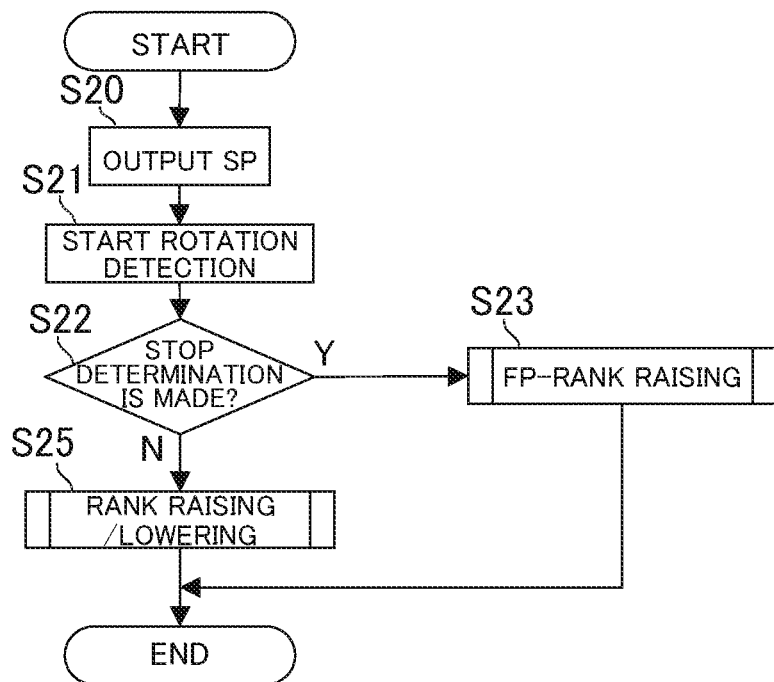
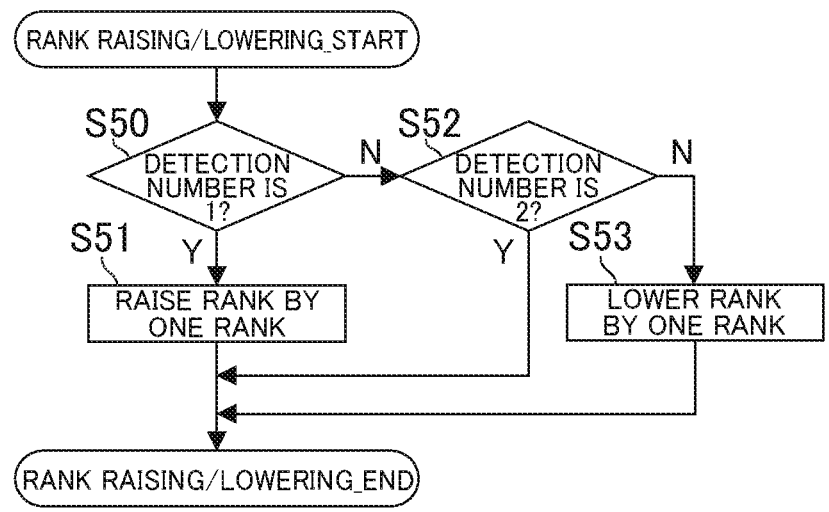

FIG.37
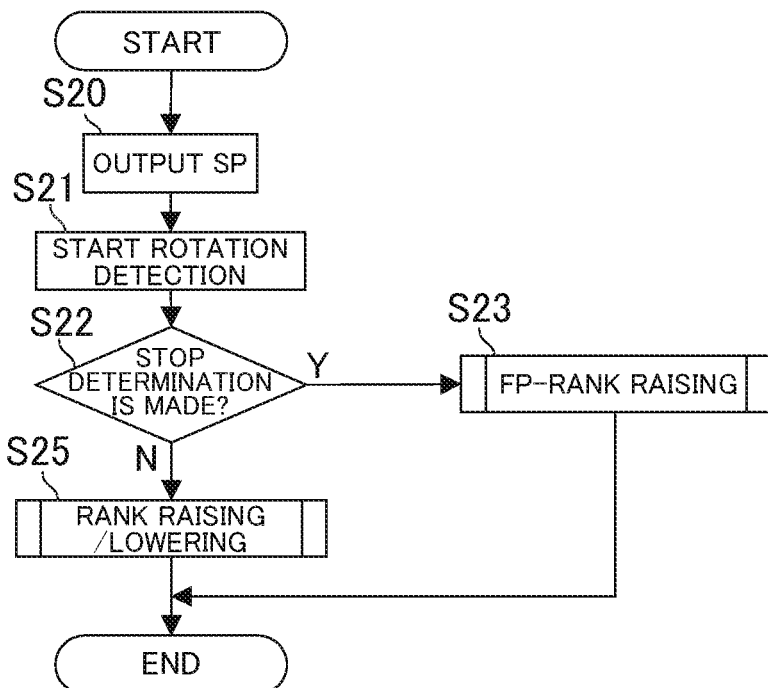
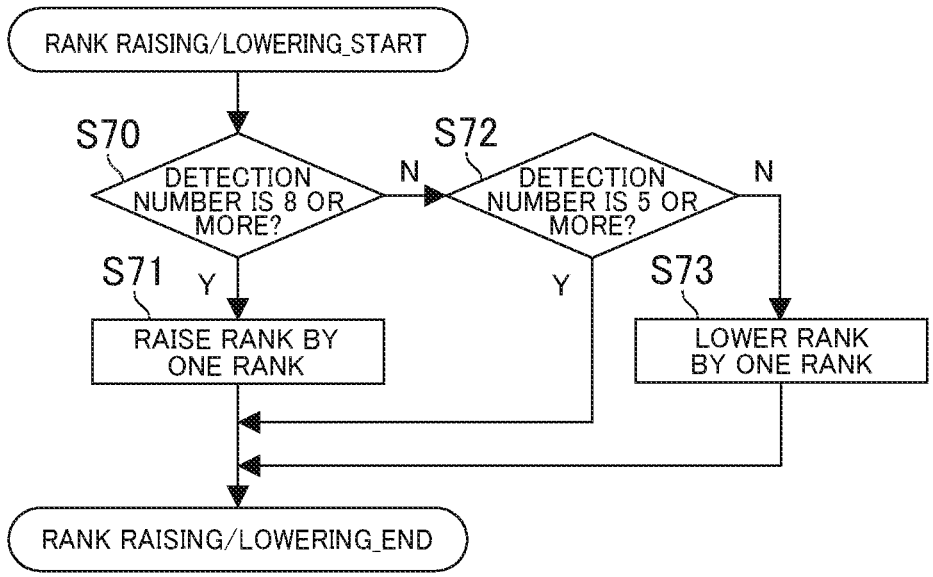

DRIVE CIRCUIT FOR TWO-COIL STEP MOTOR, TWO-COIL STEP MOTOR, AND ELECTRONIC WATCH USING THESE

CROSS REFERENCE TO RELATED APPLICATIONS

This application is a National Stage of International Application No. PCT/JP2016/076624 filed on Sep. 9, 2016, which claims priority from Japanese Patent Application 2015-177432, filed on Sep. 9, 2015. The contents of the above documents are incorporated herein by reference in their entirety.

TECHNICAL FIELD

The present invention relates to a drive circuit for a two-coil stepper motor having a rotation detection function, a two-coil stepper motor, and an analog indication-type electronic watch using the drive circuit for a two-coil stepper motor and the two-coil stepper motor.

BACKGROUND ART

Hitherto, in general, an electronic watch including analog indication means has hands that are driven by a stepper motor. This stepper motor includes a stator to be magnetized by a coil, and a rotor that is a disc-shaped rotary member magnetized into two poles. For example, the stepper motor is driven for each second to indicate the time with the hands.

Further, the electronic watch obtaining multiple functions in recent years is capable of presenting indication depending on various situations by using a bi-directional rotation stepper motor capable of obtaining forward rotation and reverse rotation to rotate the hands in both directions. Under the circumstance, there has been proposed a bi-directional rotation stepper motor including two coils and being capable of obtaining forward rotation and reverse rotation easily and at high speed (see, for example, Patent Literature 1).

The bi-directional rotation stepper motor of Patent Literature 1 is a one-rotor two-coil stepper motor. A stepper motor capable of easily obtaining both of clockwise rotation and counterclockwise rotation (forward and reverse rotations) is achieved by controlling each of drive pulses to be supplied to the two coils.

CITATION LIST

Patent Literature

[Patent Literature 1] JP H02-16679 B2 (page 1 and FIG. 1)

SUMMARY OF INVENTION

Technical Problem

However, the bi-directional rotation stepper motor presented in Patent Literature 1 is required to be rotated with a larger drive force than necessary even when a load is light in order to respond to variations in load due to environmental change or other factors. Therefore, there has been a problem in that consumption of power for driving the stepper motor is always large.

Specifically, particularly in a wristwatch-type electronic watch, the load applied to the stepper motor significantly varies due to movement of a user, for example, depending on change in external magnetic field, a mechanical impact, temperature change, humidity change, watch posture, and a train wheel state. Therefore, an extremely small load may be applied, or a large load may be applied.

Therefore, when the electronic watch is designed, it is required that the maximum load to be applied to the stepper motor be assumed, and the electronic watch have a drive force that enables the stepper motor to rotate even when the maximum load is applied. However, when the stepper motor is always driven with the drive force corresponding to the maximum load, the stepper motor continuously consumes more power than necessary. Thus, the battery life of the electronic watch is shortened. Further, when a power source is a secondary battery, undesirable problems such as the need of large charging power may be caused.

The present invention has an object to solve the above-mentioned problems and provide a drive circuit for a two-coil stepper motor, a two-coil stepper motor, and an electronic watch using the drive circuit for a two-coil stepper motor and the two-coil stepper motor, which are capable of achieving high-speed drive in both forward and reverse rotations and achieving low power consumption drive responding to load variation in the stepper motor.

Solution to Problem

In order to solve the above-mentioned problems, a drive circuit for a two-coil stepper motor, a two-coil stepper motor, and an electronic watch using the drive circuit for a two-coil stepper motor and the two-coil stepper motor according to embodiments of the present invention employ configurations described below.

The drive circuit for a two-coil stepper motor according to one embodiment of the present invention includes: a rotor, which is magnetized into two poles or more in a radial direction of the rotor; a stator including: a first stator magnetic-pole portion and a second stator magnetic-pole portion, which are formed so as to oppose to each other through intermediation of the rotor; and a third stator magnetic-pole portion, which is formed between the first stator magnetic-pole portion and the second stator magnetic-pole portion so as to face the rotor; a first coil, which is to be magnetically coupled to the first stator magnetic-pole portion and the third stator magnetic-pole portion; a second coil, which is configured to be magnetically coupled to the second stator magnetic-pole portion and the third stator magnetic-pole portion; a drive pulse generation circuit, which is configured to output a drive pulse for driving the rotor toward the first coil or toward the second coil; a detection pulse generation circuit, which is configured to output, to at least one of the first coil or the second coil, a detection pulse for detecting a counter-electromotive current generated in at least one of the first coil or the second coil, during or after the driving of the rotor due to the drive pulse; and a rotation detection circuit, which is configured to receive a detection signal generated in response to the detection pulse as input to detect whether or not the rotor has rotated.

According to the drive circuit for a two-coil stepper motor of the present invention, the detection pulse is output to the two coils, namely, the first coil and the second coil, so that success/failure of the rotation of the rotor can be determined with high accuracy after the rotor is driven by the drive pulse. As a result, drive responding to load variation in the stepper motor is possible, and hence a drive pulse having a small drive force can be used in normal drive. Thus, it is possible to provide the drive circuit for a two-coil stepper motor that achieves lower power consumption and is capable of achieving high-speed drive in both forward and reverse rotations.

Further, the detection pulse generation circuit is configured to output a first detection pulse to one of the first coil and the second coil to which the drive pulse is output, and a second detection pulse to another one of the first coil and the second coil, and the rotation detection circuit is configured to determine whether or not the rotor is rotated with use of a first detection signal generated in response to the first detection pulse and a second detection signal generated in response to the second detection pulse.

According to the above-mentioned configuration, the rotation detection circuit can simultaneously receive as input the two first and second detection signals output from the coil to which the drive pulse is output and the other coil to detect the counter-electromotive currents. Thus, the success/failure of the rotation of the rotor can be determined with high accuracy.

Further, the rotation detection circuit is configured to: count a total detection number of first detection signals and a total detection number of second detection signals; determine that the rotor has not rotated when the total detection number of first detection signals is equal to or larger than the total detection number of second detection signals; and determine that the rotor has rotated when the total detection number of first detection signals is smaller than the total detection number of second detection signals.

According to the above-mentioned configuration, the success/failure of the rotation of the rotor is determined based on a difference between the total detection numbers of the detection signals from the two coils. Thus, influence of external noise or the like can be reduced, and highly-accurate rotation detection with less false detection can be achieved.

Further, the rotation detection circuit is configured to: determine that the rotor has not rotated when detection of a predetermined number of first detection signals is earlier than or at the same time as detection of a predetermined number of second detection signals; and determine that the rotor has rotated when the detection of the predetermined number of first detection signals is later than the detection of the predetermined number of second detection signals.

According to the above-mentioned configuration, the success/failure of the rotation of the rotor is determined based on which of the detection signals from the two coils is detected earlier. Thus, the success/failure of the rotation of the rotor can be determined in a short time period, and rotation detection corresponding to high-speed drive of the stepper motor can be achieved.

Further, the first detection pulse has a pulse width that is larger than a pulse width of the second detection pulse.

According to the above-mentioned configuration, the detection sensitivity with respect to the counter-electromotive current generated from the drive coil to which the first detection pulse is output is increased, and thus the frequency of occurrence of false determination of non-rotation can be reduced. That is, when the rotor is not rotated but is falsely determined as being rotated, the hands get out of order because the correction pulse is not output. However, when the detection sensitivity on the drive coil side is increased, the frequency of occurrence of false determination of non-rotation can be reduced. As a result, the frequency at which the hands get out of order due to the false determination can be reduced, and thus the reliability of time indication by the hands can be increased.

Further, the drive circuit for a two-coil stepper motor further includes one detection resistor and another detection resistor, which are configured to be connected to the first coil and the second coil at least when the first detection pulse and the second detection pulse are output, and a resistance value of the one detection resistor obtained when the first detection pulse is output is larger than a resistance value of the another detection resistor obtained when the second detection pulse is output.

According to the above-mentioned configuration, the detection sensitivity with respect to the counter-electromotive current generated from the drive coil to which the first detection pulse is output is increased. As a result, the frequency of occurrence of false determination of non-rotation can be decreased, and thus the reliability of time indication by the hands can be increased.

Further, a threshold value for determining whether or not to adopt the first detection signal is lower than a threshold value for determining whether or not to adopt the second detection signal.

According to the above-mentioned configuration, the detection sensitivity with respect to the first detection signal is increased. As a result, the frequency of occurrence of false determination of non-rotation can be decreased, and thus the reliability of time indication by the hands can be increased.

Further, the detection pulse generation circuit is configured to output a detection pulse to be output to one of the first coil and the second coil to which the drive pulse is not output, and the rotation detection circuit is configured to determine whether or not the rotor has rotated with use of the detection signal generated in response to the detection pulse.

According to the above-mentioned configuration, the rotation of the two-coil stepper motor can be detected by detecting the counter-electromotive current generated from one of the two coils.

Further, the rotation detection circuit is configured to determine whether or not the rotor is rotated based on the detection signal detected during a period in which the drive pulse is output. Alternatively, the rotation detection circuit is configured to determine whether or not the rotor has rotated based on the detection signal detected immediately after a period in which the drive pulse is output has ended.

According to the above-mentioned configuration, rapid rotation detection is possible, and the fast-forwarding speed of the stepper motor can be increased.

Further, the rotation detection circuit is configured to determine whether or not the rotor has rotated based on a number of detected detection signals. Alternatively, the rotation detection circuit is configured to determine whether or not the rotor has rotated based on a number of groups of detected detection signals.

According to the above-mentioned configuration, the rotation of the two-coil stepper motor can be detected with a simple algorithm.

Further, the detection pulse generation circuit is configured to output the detection pulse while the rotor is driven, and the drive pulse generation circuit is configured to end continuous output of the drive pulse due to detection of rotation of the rotor by the rotation detection circuit. Further, the drive pulse generation circuit may be configured to change a pulse width of the drive pulse until the detection signal is obtained during a period in which the drive pulse is output.

According to the above-mentioned configuration, the frequency of output of the correction pulse can be decreased, and thus the power consumption can be reduced.

Further, when a rotation detection period of determining whether or not the rotor has rotated is divided into a first rotation detection period on a front side and a second rotation detection period on a back side, the detection pulse generation circuit outputs the second detection pulse in the first rotation detection period, the rotation detection circuit determines whether the second detection signal satisfies a given condition, the detection pulse generation circuit outputs the first detection pulse in the second rotation detection period when the given condition is satisfied, and the rotation detection circuit determines whether or not the rotor is rotated based on the first detection signal.

According to the above-mentioned configuration, the second rotation detection period is not required to be provided when the given condition is not satisfied, and thus the time required for rotation detection can be reduced.

The two-coil stepper motor according to one embodiment of the present invention includes: a rotor, which is magnetized into two poles or more in a radial direction of the rotor; a stator including: a first stator magnetic-pole portion and a second stator magnetic-pole portion, which are formed so as to oppose to each other through intermediation of the rotor; and a third stator magnetic-pole portion, which is formed between the first stator magnetic-pole portion and the second stator magnetic-pole portion so as to face the rotor; a first coil, which is configured to be magnetically coupled to the first stator magnetic-pole portion and the third stator magnetic-pole portion; and a second coil, which is configured to be magnetically coupled to the second stator magnetic-pole portion and the third stator magnetic-pole portion. The stator has a slit for magnetically separating the third stator magnetic-pole portion and each of the first stator magnetic-pole portion and the second stator magnetic-pole portion from each other. An angle formed between a line connecting a center of the rotor to the slit and a center line of the third stator magnetic-pole portion, which passes through the center of the rotor, is 75°±20°.

According to the two-coil stepper motor of the present invention, the angle of the slit for magnetically separating the stator is optimally set so that the waveforms of the respective counter-electromotive currents generated from the two coils can have a large difference depending on rotation and non-rotation of the rotor. As a result, the success/failure of the rotation of the rotor can be clearly determined. Thus, it is possible to provide the high-performance two-coil stepper motor that is improved in accuracy of rotation detection, and achieves low power consumption and very little occurrence of false rotation.

Further, the electronic watch of one embodiment of the present invention includes: the two-coil stepper motor of the present invention; and the drive circuit for a two-coil stepper motor of the present invention.

According to the electronic watch of the present invention, a drive pulse having a small drive force can be used in normal drive in response to the load variation in the stepper motor, and it is possible to provide the high-performance electronic watch that achieves extremely low power consumption and little occurrence of false rotation of the stepper motor, and is capable of achieving high-speed drive in both forward and reverse rotations.

Advantageous Effects of Invention

As described above, according to the present invention, the drive circuit for a two-coil stepper motor includes the detection pulse generation circuit configured to detect the counter-electromotive currents generated from the two coils, and the rotation detection circuit configured to determine whether or not the rotor is rotated based on the two detection signals. Therefore, the success/failure of the rotation of the rotor can be determined with high accuracy. As a result, a drive pulse having a small drive force can be used in normal drive in response to the load variation in the stepper motor. Thus, it is possible to provide the drive circuit for a two-coil stepper motor that achieves extremely low power consumption and is capable of achieving high-speed drive in both forward and reverse rotations.

BRIEF DESCRIPTION OF DRAWINGS

FIG. 3 are graphs for showing relationships of change in magnetic fluxes and change in counter-electromotive voltages with respect to a rotational angle of a rotor of the two-coil stepper motor according to each of the first to third embodiments of the present invention.

FIG. 5 are a drive waveform chart and explanatory diagrams of forward rotation of the rotor, for illustrating forward rotation drive of the two-coil stepper motor according to each of the first to third embodiments of the present invention.

FIG. 6 are a drive waveform chart and explanatory diagrams of reverse rotation of the rotor, for illustrating reverse rotation drive of the two-coil stepper motor according to each of the first to third embodiments of the present invention.

FIG. 7 are an operation table for each transistor in the driver circuit of each of the first and second embodiments of the present invention and a timing chart for illustrating a principle of an operation of detecting counter-electromotive currents.

FIG. 18 are plan views for illustrating parts of a stepper motor having a slit angle of 20° and a stepper motor having a slit angle of 120° of the third embodiment of the present invention.

FIG. 24 are graphs for showing an optimal slit angle range of the stepper motor, which is based on a difference between waveform lengths of the counter-electromotive currents during rotation and non-rotation of the rotor, and depends on a difference in slit angle in the third embodiment of the present invention.

FIG. 25 is a flow chart for illustrating an operation of a drive circuit for a two-coil stepper motor according to a fourth embodiment of the present invention.

FIG. 32 is a flow chart for illustrating an operation of the drive circuit for a two-coil stepper motor according to Modification Example 1 of the fourth embodiment of the present invention.

FIG. 37 is a flow chart for illustrating an operation of the drive circuit for a two-coil stepper motor according to Modification Example 2 of the fourth embodiment of the present invention.

DESCRIPTION OF EMBODIMENTS

Now, embodiments of the present invention are described in detail with reference to the drawings.

[Feature of Each Embodiment]

A first embodiment of the present invention has a feature in a drive circuit for a two-coil stepper motor configured to determine success/failure of rotation of a rotor based on a difference between total detection numbers of detection signals detected from two coils. A second embodiment of the present invention has a feature in a drive circuit for a two-coil stepper motor configured to determine the success/failure of the rotation of the rotor based on which of the detection signals from the two coils is detected earlier. A third embodiment of the present invention has a feature in a stepper motor in which a slit angle range of a two-coil stepper motor is optimally selected so that waveform shapes of counter-electromotive currents generated from the two coils greatly differ depending on the success/failure of the rotation of the rotor. Further, a fourth embodiment of the present invention has a feature in a drive circuit for a two-coil stepper motor configured to determine the success/failure of the rotation of the rotor based on the detection signal from one coil, and to adjust a drive force with use of a result of the determination. Further, a fifth embodiment of the present invention has a feature in a drive circuit for a two-coil stepper motor configured to determine the success/failure of the rotation of the rotor based on the detection signals from the two coils, and to adjust the drive force with use of a result of the determination.

First Embodiment

Figure 1:
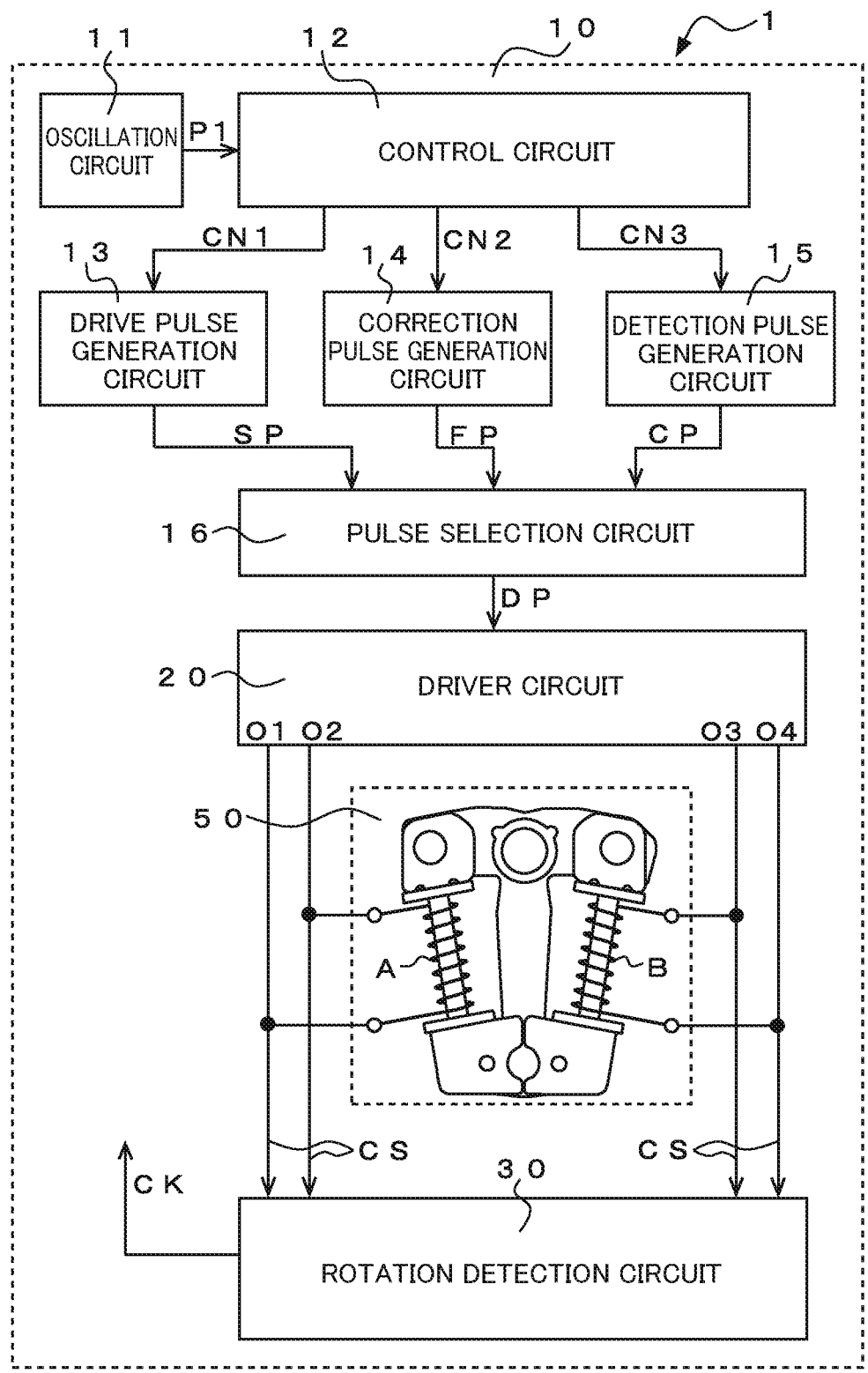
FIG. 1 is a configuration diagram for illustrating a schematic configuration of a drive circuit for a two-coil stepper motor according to first and second embodiments of the present invention.

[Description of Configuration of Drive Circuit for Two-Coil Stepper Motor of First Embodiment: FIG. 1]

A schematic configuration of a drive circuit for a two-coil stepper motor according to the first embodiment is described with reference to FIG. 1. In FIG. 1, reference symbol 1 denotes an analog-indication electronic watch of the present invention. The electronic watch 1 includes a drive circuit 10 for a two-coil stepper motor of the present invention (electronic circuit element surrounded by the dotted line in a large size), and a two-coil stepper motor 50 of the present invention (surrounded by the dotted line in a small size).

The electronic watch 1 includes an indication part including hands, a train wheel, a power source, and an operation member, but illustration thereof is omitted because those components do not directly relate to the present invention. Further, the configuration of the electronic watch 1 illustrated in FIG. 1 is similarly employed also in the second embodiment to be described later.

The drive circuit 10 for a two-coil stepper motor (hereinafter abbreviated as "drive circuit 10") includes an oscillation circuit 11 configured to output a predetermined reference signal P1 with use of a quartz crystal unit (not shown), a control circuit 12 configured to receive the reference signal P1 as input to output control signals CN1 to CN3 for controlling respective circuits, a drive pulse generation circuit 13, a correction pulse generation circuit 14, a detection pulse generation circuit 15, a pulse selection circuit 16, a driver circuit 20, and a rotation detection circuit 30.

The two-coil stepper motor 50 (hereinafter abbreviated as "stepper motor 50") includes two coils, namely, a coil A as a first coil and a coil B as a second coil. Details of the stepper motor 50 are described later.

The drive pulse generation circuit 13 receives the control signal CN1 as input to generate a drive pulse SP for driving the stepper motor 50 and output the drive pulse SP to the pulse selection circuit 16.

The correction pulse generation circuit 14 receives the control signal CN2 as input to generate a correction pulse FP and output the correction pulse FP to the pulse selection circuit 16.

The detection pulse generation circuit 15 receives the control signal CN3 as input to generate a detection pulse CP at a predetermined cycle and output the detection pulse CP to the pulse selection circuit 16. When this detection pulse CP is output from the driver circuit 20 to the coil A and the coil B of the stepper motor 50, counter-electromotive currents generated from the two coils A and B can be simultaneously detected.

The pulse selection circuit 16 receives the drive pulse SP, the correction pulse FP, and the detection pulse CP as input, and selects one of the pulses in accordance with an operation mode to output the selected pulse as a driver control pulse DP to the driver circuit 20.

The driver circuit 20 receives the driver control pulse DP as input to supply drive waveforms O1, O2, O3, and O4 that are based on the respective pulse signals to the coil A and the coil B of the stepper motor 50, to thereby drive the stepper motor 50. Detailed configuration of the driver circuit 20 is described later.

The rotation detection circuit 30 receives detection signals CS generated due to the detection pulse CP as input to determine whether or not the rotor of the stepper motor 50 is rotated, and outputs a result of the determination to the control circuit 12 as a determination signal CK. The control circuit 12 receives the determination signal CK as input. When the rotor is not rotated, the control circuit 12 outputs the control signal CN2 to cause the correction pulse generation circuit 14 to output the correction pulse FP, and controls the pulse selection circuit 16 to output the correction pulse FP as the driver control pulse DP to the driver circuit 20.

Figure 2:
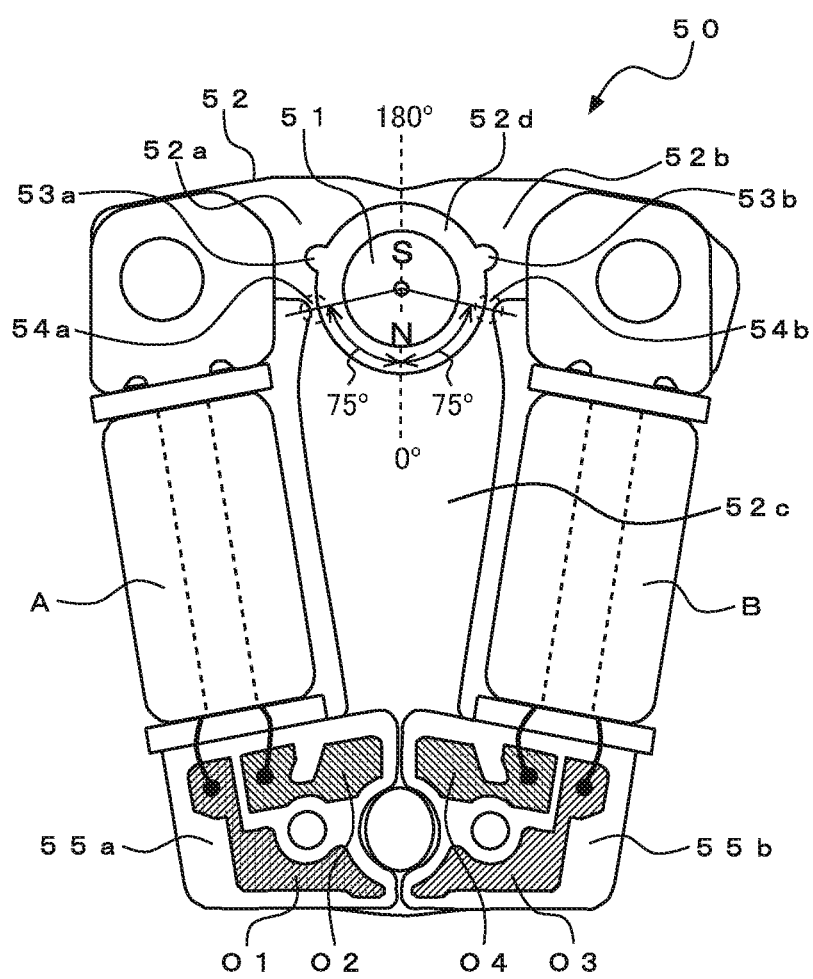
FIG. 2 is a plan view for illustrating a schematic configuration of a two-coil stepper motor according to each of first to third embodiments of the present invention.

[Description of Configuration of Stepper Motor: FIG. 2]

Next, the configuration of the stepper motor 50 is described with reference to FIG. 2. In FIG. 2, the stepper motor 50 includes a rotor 51, a stator 52, and the two coils A and B. The rotor 51 is a disc-shaped rotary member magnetized into two poles, and is magnetized to an S-pole and an N-pole in a radial direction of the rotor 51.

In this case, the rotor 51 illustrated in FIG. 2 is in a stationary state. The lower side of FIG. 2 is defined as 0°, and 90° (not shown), 180°, and 270° (not shown) are defined therefrom in a counterclockwise direction. When the N-pole of the rotor 51 is positioned at 0° and at 180°, the rotor 51 is at a stationary position (statically stable point). Thus, the rotor 51 illustrated in FIG. 2 is at the stationary position with the N-pole being positioned at 0°. Further, in the rotor 51, the counterclockwise direction is defined as forward rotation, and the clockwise direction is defined as reverse rotation. The definition of the rotor 51 described here is applied to all of the stepper motors described later.

The stator 52 is made of, for example, a soft magnetic material, and has a rotor hole 52d for allowing the rotor 51 to be inserted therethrough. The rotor 51 is arranged in this rotor hole 52d. The stator 52 includes a first stator magnetic-pole portion 52a (hereinafter abbreviated as "first magnetic-pole portion 52a") and a second stator magnetic-pole portion 52b (hereinafter abbreviated as "second magnetic-pole portion 52b") that are formed so as to oppose to each other through intermediation of the rotor 51. Further, the stator 52 includes a third stator magnetic-pole portion 52c (hereinafter abbreviated as "third magnetic-pole portion 52c") formed between the first magnetic-pole portion 52a and the second magnetic-pole portion 52b so as to face the rotor 51.

Further, at two positions on an inner periphery of the rotor hole 52d, substantially concave-shaped notches 53a and 53b are formed so as to face the rotor 51. That is, the notch 53a is formed in the first magnetic-pole portion 52a, and the notch 53b is formed in the second magnetic-pole portion 52b. The notches 53a and 53b have a function of changing the flow of magnetic fluxes formed between the stator 52 and the rotor 51 to apply a holding torque for keeping the rotor 51 at the stationary position.

In this case, as the widths of the notches 53a and 53b are increased, the holding torque is increased, and as the widths of the notches 53a and 53b are decreased, the holding torque is decreased. When the holding torque is small, the rotor 51 is easily rotated, which is advantageous for, for example, low power consumption drive and high-speed drive, but disadvantageous for impact resistance. Therefore, the widths of the notches 53a and 53b are preferred to be adjusted so that an optimal holding torque can be obtained.

Further, a narrow connection part for magnetically separating the first magnetic-pole portion 52a and the third magnetic-pole portion 52c from each other is referred to as "slit 54a" (indicated by a small dotted-line circle), and a narrow connection part for magnetically separating the second magnetic-pole portion 52b and the third magnetic-pole portion 52c from each other is referred to as "slit 54b" (indicated by a small dotted-line circle). In this case, an angle formed between a line connecting the center of the rotor 51 to each of the slits 54a and 54b and a center line of the third magnetic-pole portion 52c, which passes through the center of the rotor 51, is referred to as "slit angle". The flow of the magnetic fluxes generated between the stator 52 and the rotor 51 changes depending on the difference in the slit angle, and waveforms of counter-electromotive currents generated in the coil A and the coil B have a difference caused depending on whether or not the rotor 51 is rotated due to the drive pulse SP. In this case, the slit refers to a structure for magnetically separating the magnetic poles from each other by partially increasing a magnetic resistance. The slit may be formed by a narrow connection part (narrowed portion) as described here, or the slit may be formed by making a narrow cut in the stator 52 to obtain a physical separation (literally, a slit). Alternatively, the slit may be formed by filling the formed narrow cut with a substance having a high magnetic resistance, for example, a non-magnetic body.

The present invention has a feature in that whether or not the rotor 51 is rotated is determined based on the difference between waveforms of the counter-electromotive currents of the coil A and the coil B. Therefore, it is preferred to use a stepper motor having a slit angle selected so as to achieve a large difference between the waveforms of the counter-electromotive currents. The selection range of the slit angle is described in detail in the third embodiment later, but the stepper motor 50 of FIG. 2 is illustrated as an example in which the slit angle is 75°, which provides a large difference between the waveforms of the counter-electromotive currents.

That is, the slit 54a is formed at a position of 75° on the upper left side of FIG. 2 from the stationary position of 0° (center of the third magnetic-pole portion 52c), and the slit 54b is formed at a position of 75° on the upper right side of FIG. 2 from the stationary position of 0°. In all of the operations of the stepper motors in the first and second embodiments described below, the stepper motor 50 having a slit angle of 75° is represented as an example.

Further, the coil A to be magnetically coupled to the first magnetic-pole portion 52a and the third magnetic-pole portion 52c, and the coil B to be magnetically coupled to the second magnetic-pole portion 52b and the third magnetic-pole portion 52c are provided.

The coil A includes coil terminals O1 and O2 on an insulating substrate 55a, and both ends of winding of the coil A are connected to the coil terminals O1 and O2. Further, the coil B includes coil terminals O3 and O4 on an insulating substrate 55b, and both ends of winding of the coil B are connected to the coil terminals O3 and O4. The above-mentioned drive waveforms O1 to O4 output from the driver circuit 20 are supplied to the coil terminals O1 to O4, respectively. For easy understanding of the description, the same reference symbol is used for each coil terminal and each drive waveform.

[Description of Change in Magnetic Fluxes and Change in Counter-Electromotive Voltages of Stepper Motor: FIGS. 3]

Next, with reference to FIG. 3, description is given of counter-electromotive voltages E generated in the coil A and the coil B, which cause the counter-electromotive currents to be used for rotation detection. FIG. 3 are graphs for showing change in magnetic fluxes Φ generated in the stator 52 when the rotor 51 of the stepper motor 50 is rotated, and change in counter-electromotive voltages E generated due to the magnetic fluxes Φ. The stepper motor 50 has a slit angle of 75° as described above.

FIG. 3(a) is a graph for showing change in magnetic fluxes Φ to be applied to the coil A and the coil B depending on the rotational angle of the rotor 51. In FIG. 3(a), the lateral axis represents the rotational angle ranging from 0° to 360° of the rotor 51 rotated in the forward rotation direction (counterclockwise direction), and the vertical axis represents the magnetic fluxes Φ. Peaks of the magnetic flux Φ are shown to range from +1.0 to −1.0.

In FIG. 3(a), when the rotor 51 of the stepper motor 50 is rotated one revolution from the stationary position of 0° (see FIG. 2) in the forward rotation direction, a magnetic flux Φa is generated in the first magnetic-pole portion 52a around which the coil A is wound, and a magnetic flux Φb is generated in the second magnetic-pole portion 52b around which the coil B is wound.

In this case, as shown in FIG. 3(a), the magnetic flux Φa has a positive-side peak when the rotational angle of the rotor 51 is in the vicinity of 50°, and has a negative-side peak in the vicinity of 230°. Further, the magnetic flux Φb has a positive-side peak when the rotational angle of the rotor 51 is in the vicinity of 310°, and has a negative-side peak in the vicinity of 130°.

Next, FIG. 3(b) is a graph for showing change in counter-electromotive voltages E to be generated in the coil A and the coil B depending on the rotational angle of the rotor 51. In FIG. 3(b), the lateral axis represents the rotational angle ranging from 0° to 360° of the rotor 51 rotated in the forward rotation direction, and the vertical axis represents the counter-electromotive voltages E. Peaks of the counter-electromotive voltages E are shown to range from +1.0 to −1.0. The counter-electromotive voltage E can be represented as a derivative value (E=dΦ/dt) of the magnetic flux Φ.

In FIG. 3(b), a counter-electromotive voltage Ea is generated in the coil A due to the magnetic flux Φa (FIG. 3(a)) generated when the rotor 51 of the stepper motor 50 rotates one revolution from the stationary position of 0° in the forward rotation direction. Further, a counter-electromotive voltage Eb is generated in the coil B due to the magnetic flux Φb (FIG. 3(a)). In this case, as described above, the counter-electromotive voltages Ea and Eb are derivative values of the magnetic fluxes Φa and Φb, respectively. The counter-electromotive voltage Ea has a positive-side peak when the rotational angle of the rotor 51 is in the vicinity of 320°, and has a negative-side peak in the vicinity of 140°. Further, the counter-electromotive voltage Eb has a positive-side peak when the rotational angle of the rotor 51 is in the vicinity of 220°, and has a negative-side peak in the vicinity of 40°.

In the present invention, as described above, the success/failure of the rotation of the rotor 51 is determined based on the difference between the waveforms of the counter-electromotive currents generated from the coil A and the coil B, and hence the difference between the counter-electromotive voltages Ea and Eb shown in FIG. 3(b) is important. In this case, the difference between the counter-electromotive voltages is defined as a difference ΔE (difference in rotational angle of the rotor 51) between close peak values of positive-side peaks (peaks) or negative-side peaks (valleys) in the counter-electromotive voltages Ea and Eb. A stepper motor having a slit angle that provides a large difference ΔE between the peak values is likely to correctly determine the success/failure of the rotation of the rotor.

In this case, in the example of FIG. 3(b), that is, when the slit angle of the stepper motor 50 is 75°, the difference ΔE between the peak values is (peak of the counter-electromotive voltage Eb (about 220°))−(valley of the counter-electromotive voltage Ea (about 140°))=(about 80°), which is a large value. The difference ΔE between the peak values is described in detail in the third embodiment later, but it can be said that the stepper motor 50 having a slit angle of 75° and having the difference ΔE between the peak values of about 80° is likely to correctly determine the success/failure of the rotation of the rotor 51. Description is given later of Symbols T1 and T2 of FIG. 3(b).

Figure 4:
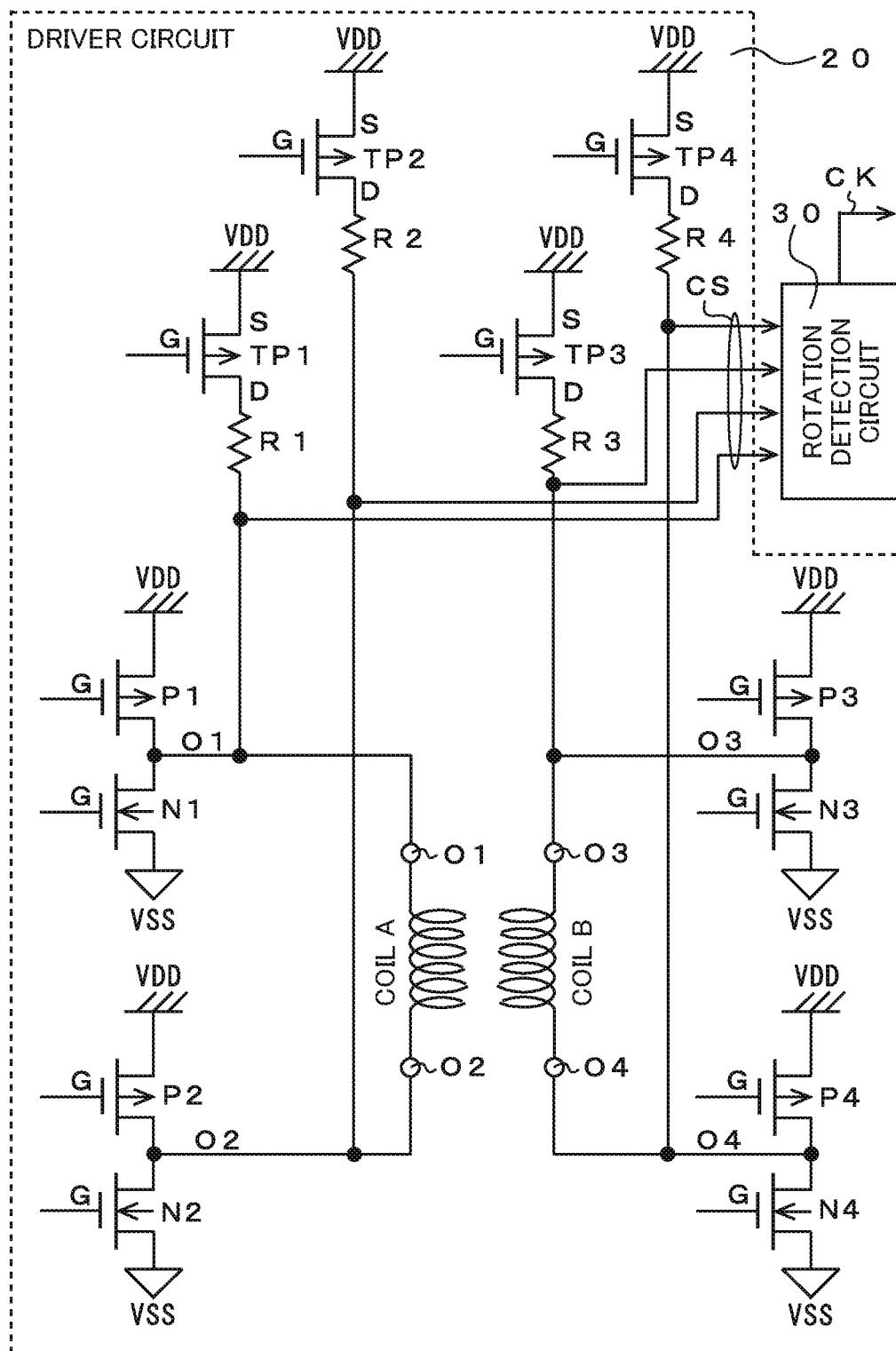
FIG. 4 is a circuit diagram for illustrating an example of a driver circuit of each of the first and second embodiments of the present invention.

[Description of Circuit Configuration of Driver Circuit: FIG. 4]

Next, an example of the circuit configuration of the driver circuit 20 configured to drive the stepper motor 50 is described with reference to FIG. 4. In FIG. 4, the driver circuit 20 includes four buffer circuits configured to supply the drive pulse SP to the coil A and the coil B of the stepper motor 50, and four transistors and four resistors for generating the detection signals CS.

In this case, a buffer circuit including a transistor P1 being a P-channel MOS transistor having a low ON resistance and a transistor N1 being an N-channel MOS transistor having a low ON resistance, which are complementarily connected to each other, outputs the drive waveform O1 and is connected to the coil terminal O1 of the coil A.

Further, similarly, a buffer circuit including a transistor P2 and a transistor N2 each having a low ON resistance outputs the drive waveform O2 and is connected to the coil terminal O2 of the coil A.

Further, similarly, a buffer circuit including a transistor P3 and a transistor N3 each having a low ON resistance outputs the drive waveform O3 and is connected to the coil terminal O3 of the coil B.

Further, similarly, a buffer circuit including a transistor P4 and a transistor N4 each having a low ON resistance outputs the drive waveform O4 and is connected to the coil terminal O4 of the coil B.

Although not shown, each of gate terminals G of the transistors P1 to P4 and N1 to N4 receives the driver control pulse DP output from the pulse selection circuit 16 as input, and each of the transistors is ON/OFF controlled based on the drive pulse SP, the correction pulse FP, and the detection pulse CP, to thereby supply the drive waveforms O1 to O4 to the coil A and the coil B.

Further, four pairs of P-channel MOS transistors TP1 to TP4 (hereinafter abbreviated as "transistors TP1 to TP4") and detection resistors R1 to R4 have a function of generating the detection signals CS due to the detection pulse CP.

In this case, a source terminal S of the transistor TP1 is connected to VDD, a drain terminal D of the transistor TP1 is connected to one terminal of the detection resistor R1, and the other terminal of the detection resistor R1 is connected to the coil terminal O1 of the coil A.

Further, a source terminal S of the transistor TP2 is connected to VDD, a drain terminal D of the transistor TP2 is connected to one terminal of the detection resistor R2, and the other terminal of the detection resistor R2 is connected to the coil terminal O2 of the coil A.

Further, a source terminal S of the transistor TP3 is connected to VDD, a drain terminal D of the transistor TP3 is connected to one terminal of the detection resistor R3, and the other terminal of the detection resistor R3 is connected to the coil terminal O3 of the coil B.

Further, a source terminal S of the transistor TP4 is connected to VDD, a drain terminal D of the transistor TP4 is connected to one terminal of the detection resistor R4, and the other terminal of the detection resistor R4 is connected to the coil terminal O4 of the coil B.

In this case, although not shown, each of the gate terminals G of the transistors TP1 to TP4 receives the detection pulse CP as input from the pulse selection circuit 16. When the detection pulse CP is active, the detection resistors R1 to R4 are connected to the respective coil terminals O1 to O4 of the coils A and B, and the counter-electromotive currents generated in the coil A and the coil B flow through the detection resistors R1 to R4 due to the detection pulse CP. Thus, the pulsed detection signals CS are generated.

The rotation detection circuit 30 is connected to the other terminals of the detection resistors R1 to R4, that is, the coil terminals O1 and O2 of the coil A and the coil terminals O3 and O4 of the coil B, and receives the detection signals CS generated in the detection resistors R1 to R4 as input to detect whether or not the detection signals CS exceed a threshold value Vth set in the rotation detection circuit 30.

As an input circuit of the rotation detection circuit 30, for example, a C-MOS inverter circuit in which about ½ of the power supply voltage is set as the threshold value Vth may be used. Further, the threshold value Vth may be variable, and a circuit capable of adjusting the detection sensitivity with respect to the detection signal CS may be used. The threshold value Vth is a negative voltage with respect to a power supply VDD (0 V).

Further, the rotation detection circuit 30 has a function of detecting the presence/absence of the detection signal CS exceeding the threshold value Vth and counting the number of detection signals CS exceeding the threshold value Vth, and determines the success/failure of the rotation of the rotor based on a result of the counting to output the result as the determination signal CK. The rotation detection circuit 30 may detect only whether or not the detection signals CS exceed the threshold value Vth to output the information as the determination signal CK. In this case, the control circuit 12 determines the success/failure of the rotation of the rotor based on the determination signal CK.

When the control circuit 12 receives the determination signal CK as input and the rotor is not rotated, the control circuit 12 controls the correction pulse generation circuit 14 and the pulse selection circuit 16 to output the correction pulse FP to the driver circuit 20 as the driver control pulse DP. Details of the operation of the driver circuit 20 are described later.

[Description of Drive of Two-Coil Stepper Motor: FIG. 5 and FIGS. 6]

Next, although the drive of the two-coil stepper motor including two coils is known, with reference to FIG. 5 and FIG. 6, description is given of an example of the drive pulse for driving the stepper motor 50 and the outline of the rotational operation of the stepper motor 50 because such description is necessary for understanding the present invention. Description is also given of the detection pulse CP for detecting the rotation of the rotor and the correction pulse FP output when it is determined that the rotor is not rotated.

First, with reference to FIG. 5, description is given of the drive pulse SP and the rotational operation of the rotor 51 when the rotor 51 is rotated from the stationary position of 0° (N-pole) in the forward direction (counterclockwise direction). FIG. 5(a) is an illustration of a drive waveform of the drive pulse SP for rotating the rotor 51 of the stepper motor 50 from the stationary position of 0° (N-pole) in the forward direction (counterclockwise direction) in two steps, and drive waveforms of the detection pulse CP and the correction pulse FP. Further, FIG. 5(b) is an illustration of the magnetization of the stator 52 due to the drive pulse SP in the first step, and the rotational direction of the N-pole of the rotor 51 from the stationary position of 0°. FIG. 5(c) is an illustration of the magnetization of the stator 52 due to the drive pulse SP in the second step, and the rotational direction of the N-pole of the rotor 51 from the stationary position of 180°. In FIG. 5(b) and FIG. 5(c) and FIG. 6(b) and FIG. 6(c) to be referred to later, only a part of the stepper motor 50 in the vicinity of the rotor 51 is illustrated.

In FIG. 5(a), when the rotor 51 is rotated from the stationary position of 0° (N-pole) in the forward direction in the first step, the drive pulse SP is output from the coil terminal O4. The drive pulse SP may have any pulse width, but a short pulse width is preferred in order to achieve low power consumption drive. Further, the drive pulse SP may be formed of a plurality of continuous pulse groups (not shown).

When the drive pulse SP is output from the coil terminal O4, the coil B is driven so that, as illustrated in FIG. 5(b), the second magnetic-pole portion 52b is magnetized to the S-pole and the third magnetic-pole portion 52c is magnetized to the N-pole. Further, the coil A is not driven, and hence the first magnetic-pole portion 52a has the N-pole as in the third magnetic-pole portion 52c. With this, the N-pole of the rotor 51 and the S-pole of the second magnetic-pole portion 52b attract each other, and the S-pole of the rotor 51 and the N-pole of the first magnetic-pole portion 52a attract each other. Thus, the rotor 51 is rotated in the counterclockwise direction, and the N-pole of the rotor 51 is rotated to reach the stationary position of 180° (S-pole is at 0°) and is held (see FIG. 5(c)).

Next, description is given of the drive pulse SP and the rotational operation of the rotor 51 in the second step when the rotor 51 is rotated from the stationary position of 180° (N-pole) in the forward direction (counterclockwise direction). On the right side of the figure being FIG. 5(a), when the rotor 51 is rotated from the stationary position of 180° (N-pole) in the forward direction, the drive pulse SP is output from the coil terminal O3.

When the drive pulse SP is output from the coil terminal O3, the coil B is driven in the reverse direction, and hence, as illustrated in FIG. 5(c), the second magnetic-pole portion 52b is magnetized to the N-pole and the third magnetic-pole portion 52c is magnetized to the S-pole. Further, the coil A is not driven, and hence the first magnetic-pole portion 52a has the S-pole as in the third magnetic-pole portion 52c. With this, the S-pole of the rotor 51 and the N-pole of the second magnetic-pole portion 52b attract each other, and the N-pole of the rotor 51 and the S-pole of the first magnetic-pole portion 52a attract each other. Thus, the rotor 51 is rotated in the counterclockwise direction, and the N-pole of the rotor 51 is rotated to reach the stationary position of 0° (S-pole is at 180°) and is held (see FIG. 5(b)).

Further, in FIG. 5(a), a period after the drive pulse SP is output from the coil terminal O4 in the first step corresponds to a rotation detection period, and the detection pulses CP are output at predetermined cycles from the coil terminals O2 and O3 to both of the coils A and B. In this case, the detection pulse output to the coil terminal O3 of the coil B being the drive coil is referred to as "first detection pulse CP1", and the detection pulse output to the coil terminal O2 of the other coil A is referred to as "second detection pulse CP2".

In diagrams including FIG. 6 to be referred to later, each of the first detection pulse CP1 and the second detection pulse CP2 represents a position of a timing at which the detection pulse is output. In the actual drive waveform, the detection signal CS generated due to the detection pulse CP appears. Further, after the rotation detection period, when it is determined that the rotor 51 is not rotated, the correction pulse FP with a large drive force is output from the coil terminal O4 during a correction pulse application period.

Similarly, a period after the drive pulse SP is output from the coil terminal O3 in the second step corresponds to the rotation detection period, and the detection pulses CP are output at predetermined cycles from the coil terminals O1 and O4 to both of the coils A and B. In this case, the detection pulse output to the coil terminal O4 of the coil B being the drive coil is referred to as "first detection pulse CP1", and the detection pulse output to the coil terminal O1 of the other coil A is referred to as "second detection pulse CP2". Further, after the rotation detection period, when it is determined that the rotor 51 is not rotated, the correction pulse FP with a large drive force is output from the coil terminal O3 during the correction pulse application period.

The above-mentioned pulse output is merely an example, and the output of each of the drive pulse SP, the detection pulse CP, and the correction pulse FP depends on the winding direction of each of the coil A and the coil B. For example, when the winding direction of the coil A is reversed, the output of each pulse is required to be reversed at the coil terminals O1 and O2. The same holds true in the coil B, and when the winding direction of the coil B is reversed, the output of each pulse is required to be reversed at the coil terminals O3 and O4.

Next, with reference to FIG. 6, description is given of the drive pulse SP and the rotational operation of the rotor 51 when the rotor 51 is rotated from the stationary position of 0° (N-pole) in the reverse direction (clockwise direction). FIG. 6(a) is an illustration of a drive waveform of the drive pulse SP for rotating the rotor 51 of the stepper motor 50 from the stationary position of 0° (N-pole) in the reverse direction (clockwise direction) in two steps, and drive waveforms of the detection pulse CP and the correction pulse FP. FIG. 6(b) is an illustration of the magnetization of the stator 52 due to the drive pulse SP in the first step, and the rotational direction of the N-pole of the rotor 51 from the stationary position of 0°. FIG. 6(c) is an illustration of the magnetization of the stator 52 due to the drive pulse SP in the second step, and the rotational direction of the N-pole of the rotor 51 from the stationary position of 180°.

In FIG. 6(a), when the rotor 51 is rotated from the stationary position of 0° (N-pole) in the reverse direction in the first step, the drive pulse SP is output from the coil terminal O1. The drive pulse SP may have any pulse width, but a short pulse width is preferred in order to achieve low power consumption drive.

When the drive pulse SP is output from the coil terminal O1, the coil A is driven so that, as illustrated in FIG. 6(b), the first magnetic-pole portion 52a is magnetized to the S-pole and the third magnetic-pole portion 52c is magnetized to the N-pole. Further, the coil B is not driven, and hence the second magnetic-pole portion 52b has the N-pole as in the third magnetic-pole portion 52c. With this, the N-pole of the rotor 51 and the S-pole of the first magnetic-pole portion 52a attract each other, and the S-pole of the rotor 51 and the N-pole of the second magnetic-pole portion 52b attract each other. Thus, the rotor 51 is rotated in the clockwise direction, and the N-pole of the rotor 51 is rotated to reach the stationary position of 180° and is held (see FIG. 6(c)).

Next, description is given of the drive pulse SP and the rotational operation of the rotor 51 in the second step when the rotor 51 is rotated from the stationary position of 180° (N-pole) in the reverse direction (clockwise direction). On the right side of the figure being FIG. 6(a), when the rotor 51 is rotated from the stationary position of 180° (N-pole) in the reverse direction, the drive pulse SP is output from the coil terminal O2.

When the drive pulse SP is output from the coil terminal O2, the coil A is driven in the reverse direction, and hence, as illustrated in FIG. 6(c), the first magnetic-pole portion 52a is magnetized to the N-pole and the third magnetic-pole portion 52c is magnetized to the S-pole. Further, the coil B is not driven, and hence the second magnetic-pole portion 52b has the S-pole as in the third magnetic-pole portion 52c. With this, the S-pole of the rotor 51 and the N-pole of the first magnetic-pole portion 52a attract each other, and the N-pole of the rotor 51 and the S-pole of the second magnetic-pole portion 52b attract each other. Thus, the rotor 51 is rotated in the clockwise direction, and the N-pole of the rotor 51 is rotated to reach the stationary position of 0° (S-pole is at 180°) and is held (see FIG. 6(b)).

Further, in FIG. 6(a), a period after the drive pulse SP is output from the coil terminal O1 in the first step corresponds to the rotation detection period, and the detection pulses CP are output at predetermined cycles from the coil terminals O2 and O3 to both of the coils A and B. In this case, the detection pulse output to the coil terminal O2 of the coil A being the drive coil is referred to as "first detection pulse CP1", and the detection pulse output to the coil terminal O3 of the other coil B is referred to as "second detection pulse CP2". Further, after the rotation detection period, when it is determined that the rotor 51 is not rotated, the correction pulse FP with a large drive force is output from the coil terminal O1.

Similarly, a period after the drive pulse SP is output from the coil terminal O2 in the second step corresponds to the rotation detection period, and the detection pulses CP are output at predetermined cycles from the coil terminals O1 and O4 to both of the coils A and B. In this case, the detection pulse output to the coil terminal O1 of the coil A being the drive coil is referred to as "first detection pulse CP1", and the detection pulse output to the coil terminal O4 of the other coil B is referred to as "second detection pulse CP2". Further, after the rotation detection period, when it is determined that the rotor 51 is not rotated, the correction pulse FP with a large drive force is output from the coil terminal O2. Details of the operation of detecting rotation of the rotor 51 are described later.

As described above, the two-coil stepper motor can output the drive pulses SP having the same specification to any of the coil terminals O1 to O4 to execute the forward rotation drive and the reverse rotation drive. Thus, there are great advantages in that equal drive speeds can be obtained in the forward rotation and the reverse rotation, and both of forward and reverse rotation drives can be achieved at high speed. Further, the detection pulses CP are output to both of the coils A and B after the drive pulse SP is output, and hence the success/failure of the rotation of the rotor 51 can be determined with high accuracy.

[Description of Operation of Driving Stepper Motor and Detecting Rotation Performed by Driver Circuit: FIGS. 7]

Next, with reference to the operation table of FIG. 7(a), description is given of how the driver circuit 20 drives the stepper motor as illustrated in FIG. 5 and FIG. 6 and detects the rotation of the rotor. Further, with reference to the timing chart of FIG. 7(b), description is given of an operation principle of how the driver circuit 20 detects the counter-electromotive currents in order to detect the rotation of the rotor. FIG. 4 is referred to for the circuit configuration of the driver circuit 20, and FIG. 5 and FIG. 6 are referred to for the drive waveforms.

FIG. 7(a) is a table for showing the operation (ON/OFF) of each transistor of the driver circuit 20, which corresponds to the output of the drive pulse SP for driving the stepper motor 50 in the forward direction or the reverse direction and the output of the detection pulse CP for detecting rotation.

In FIG. 7(a), the drive of the stepper motor 50 includes forward rotation drive and reverse rotation drive as described above. Further, when the rotor 51 is at the stationary position, there are a case in which the N-pole is at 0° and a case in which the N-pole is at 180°. Further, as output pulses, there are the drive pulse SP for rotating the rotor 51, the correction pulse FP, and the detection pulse CP for detecting the rotation of the rotor 51. The operation of the correction pulse FP is the same as that of the drive pulse SP, and hence description thereof is omitted.

In this case, when the forward rotation drive is executed with the N-pole of the rotor 51 being located at the stationary position of 0°, as described above with reference to FIG. 5, the drive pulse SP is output from the coil terminal O4, and hence the transistor P3 and the transistor N4 of the driver circuit 20 are turned on, and the transistor N3 and the transistor P4 of the driver circuit 20 are turned off. Further, both of the terminals O1 and O2 of the coil A are connected to VDD by turning on the transistors P1 and P2 and turning off the transistors N1 and N2. Further, while the drive pulse SP is output, the detection pulse CP is not output, and hence the transistors TP1 to TP4 are turned off.

Further, after the drive pulse SP is output, the processing enters the rotation detection period, and the detection pulses CP are output from the coil terminals O2 and O3 (see FIG. 5). In this case, the driver circuit 20 turns on the transistors P1 and P4 and turns off the other transistors N1, P2, N2, P3, N3, and N4 in order to connect the other terminal O1 of the coil A and the other terminal O4 of the coil B to VDD.

Meanwhile, the transistors TP2 and TP3 are turned on due to the active detection pulse CP. The transistors TP1 and TP4 may be any one of ON and OFF. With this, the coil terminal O2 of the coil A is connected to the detection resistor R2 via VDD. When a counter-electromotive current is generated in the coil A as a result, a voltage corresponding to the counter-electromotive current is generated in the detection resistor R2.

Further, the coil terminal O3 of the coil B is connected to the detection resistor R3 via VDD. When a counter-electromotive current is generated in the coil B as a result, a voltage corresponding to the counter-electromotive current is generated in the detection resistor R3. The voltages generated in the detection resistors R2 and R3 are input as the detection signals CS to the rotation detection circuit 30 as described above so that the success/failure of the rotation is determined.

Next, in FIG. 7(a), when the rotor 51 is rotated by one step in the forward direction to be further rotated in the forward direction from the state in which the N-pole is located at the stationary position of 180°, as described above with reference to FIG. 5, the drive pulse SP is output from the coil terminal O3, and hence the transistor P4 and the transistor N3 of the driver circuit 20 are turned on, and the transistor N4 and the transistor P3 of the driver circuit 20 are turned off. Further, both of the terminals O1 and O2 of the coil A are connected to VDD by turning on the transistors P1 and P2 and turning off the transistors N1 and N2. Further, while the drive pulse SP is output, the detection pulse CP is not output, and hence the transistors TP1 to TP4 are turned off.

Further, after the drive pulse SP is output, the processing enters the rotation detection period, and the detection pulses CP are output from the coil terminals O1 and O4 (see FIG. 5). In this case, the driver circuit 20 turns on the transistors P2 and P3 and turns off the other transistors P1, N1, N2, N3, P4, and N4 in order to connect the other terminal O2 of the coil A and the other terminal O3 of the coil B to VDD.

Meanwhile, the transistors TP1 and TP4 are turned on due to the active detection pulse CP. The transistors TP2 and TP3 may be any one of ON and OFF. With this, the coil terminal O1 of the coil A is connected to the detection resistor R1 via VDD. When a counter-electromotive current is generated in the coil A as a result, a voltage corresponding to the counter-electromotive current is generated in the detection resistor R1.

Further, the coil terminal O4 of the coil B is connected to the detection resistor R4 via VDD. When a counter-electromotive current is generated in the coil B as a result, a voltage corresponding to the counter-electromotive current is generated in the detection resistor R4. The voltages generated in the detection resistors R1 and R4 are input as the detection signals CS to the rotation detection circuit 30 as described above so that the success/failure of the rotation is determined.

Further, when the reverse rotation drive is executed with the N-pole of the rotor 51 being located at the stationary position of 0° or 180°, as described above with reference to FIG. 6, the drive pulse SP is output from the coil terminal O1 or O2. The operation of each transistor of the driver circuit 20 is as shown in the operation table of FIG. 7(a). Further, the transistors TP1 to TP4 are operated due to the detection pulse CP in the same way in both of the forward rotation and the reverse rotation, and the operations of the transistors TP1 to TP4 are as shown in the operation table of FIG. 7(a).

Next, with reference to the timing chart of FIG. 7(b), description is given of the principle of the operation of detecting the counter-electromotive currents by the driver circuit 20. As a condition of the description, it is assumed that the drive pulse SP is output from the coil terminal O4 in order to subject the rotor to forward rotation drive (see FIG. 5(a)).

In FIG. 7(b), the detection pulse CP is output to each of the coil terminals O2 and O3 as a signal having a short pulse width at a predetermined cycle during the rotation detection period. It is assumed that, during the rotation detection period, a counter-electromotive current Ib is generated from the coil B in a substantially convex shape in the positive direction as illustrated in FIG. 7(b) in accordance with the rotation of the rotor. Then, as described above, the coil terminal O3 of the coil B is connected to the detection resistor R3 via VDD due to the detection pulse CP. As a result, every time the detection pulse CP becomes active, a pulsed voltage corresponding to the magnitude of the counter-electromotive current Ib is generated at the coil terminal O3.

This pulsed signal corresponds to the detection signal CS generated due to the detection pulse CP. That is, the detection signal CS is a pulsed signal generated when the counter-electromotive current Ib instantaneously flows through the detection resistor R3 due to the sampling operation caused by the detection pulse CP. The crest value of the detection signal CS (height in the negative direction with VDD serving as a reference) represents the magnitude of the counter-electromotive current Ib at the moment when the detection pulse CP becomes active as illustrated in FIG. 7(b).

As described above, the detection signal CS is input to the rotation detection circuit 30. The detection signal CS exceeding the threshold value Vth (straight dotted line) is detected so that the success/failure of the rotation of the rotor is determined. In FIG. 7(b), it is shown as an example that three detection signals CS exceed the threshold value Vth.

FIG. 7(b) is an illustration of the operation of detecting the counter-electromotive current generated from the coil B, but the operation of detecting the counter-electromotive current generated from the coil A is similarly performed.

As described above, the driver circuit 20 has the following function. The driver circuit 20 controls ON/OFF of each transistor in accordance with the operation table of FIG. 7(a) to output the drive pulse SP, the correction pulse FP, and the detection pulse CP to the stepper motor 50. Thus, the driver circuit 20 subjects the stepper motor 50 to forward/reverse rotation drive, and detects the counter-electromotive currents generated in the coil A and the coil B due to the detection pulse CP to output the detection signals CS corresponding to the counter-electromotive currents.

Figure 8:
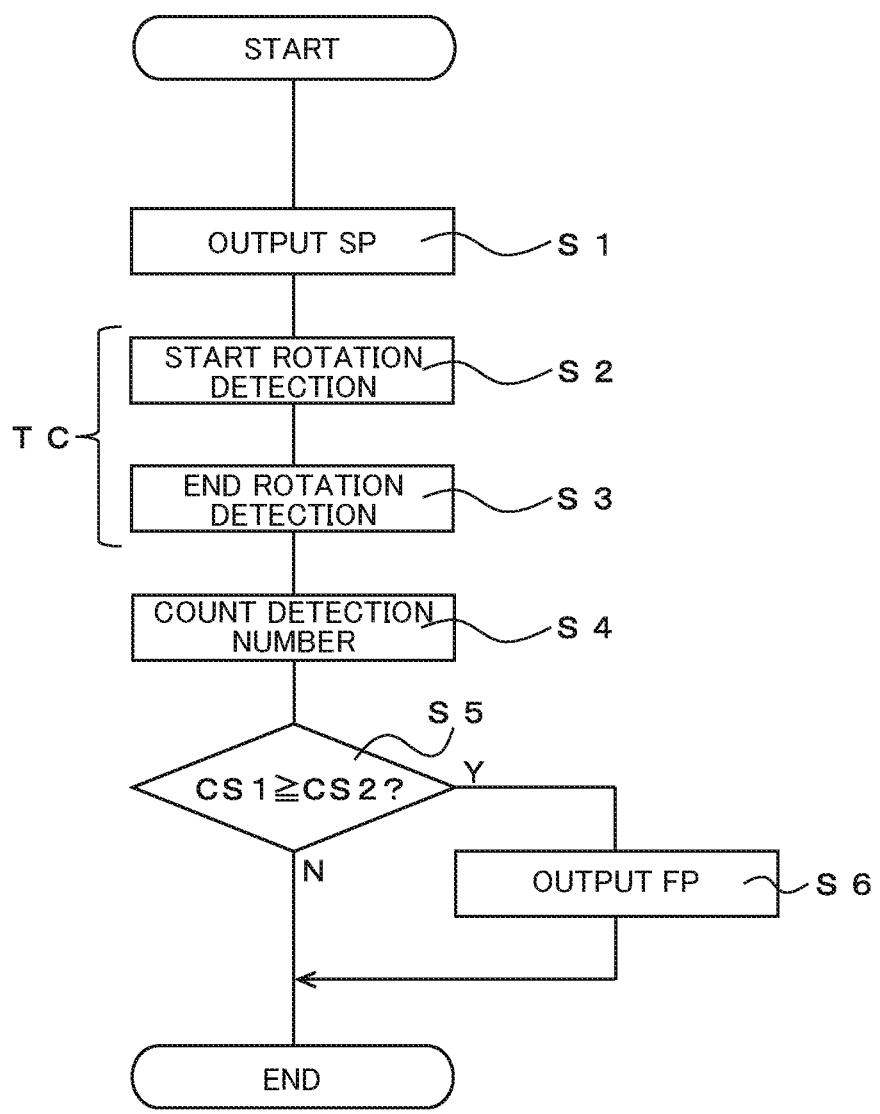
FIG. 8 is a flow chart for illustrating an operation of the drive circuit for a two-coil stepper motor according to the first embodiment of the present invention.

[Description of Rotation Detection Operation Flow of First Embodiment: FIG. 8]

Next, with reference to the flow chart of FIG. 8, the rotation detection operation flow of the first embodiment is described. FIG. 1 is referred to for the configuration of the drive circuit 10, and FIG. 4 is referred to for the circuit configuration of the drive circuit 20.

In FIG. 8, the control circuit 12 of the drive circuit 10 receives the reference signal P1 as input from the oscillation circuit 11 to execute a counting operation. As an example, when a hand movement timing of every second arrives, the control circuit 12 outputs the control signal CN1 to control the drive pulse generation circuit 13 to output the drive pulse SP to the pulse selection circuit 16. The pulse selection circuit 16 selects the input drive pulse SP to output the selected drive pulse SP as the driver control pulse DP to the driver circuit 20.

The driver circuit 20 receives the driver control pulse DP as input. As an example, the driver circuit 20 outputs the drive pulse SP to the coil terminal O4 to rotate the stepper motor 50 in the forward direction (Step S1: output SP).

Next, after the drive pulse SP is output and a predetermined time period elapses, the control circuit 12 outputs the control signal CN3 to control the detection pulse generation circuit 15 to output the detection pulse CP at a predetermined cycle to the pulse selection circuit 16. The pulse selection circuit 16 selects the input detection pulse CP to output the selected detection pulse CP as the driver control pulse DP to the driver circuit 20. The driver circuit 20 starts the rotation detection period of detecting the counter-electromotive currents generated from the coil A and the coil B due to the input detection pulse CP (Step S2: start rotation detection).

Next, the control circuit 12 controls the detection pulse generation circuit 15 by the control signal CN3 to stop the output of the detection pulse CP at a time point at which the number of detection pulses CP that are output reaches a predetermined number, and ends the rotation detection period (Step S3: end rotation detection). In this case, a period from Step S2 to Step S3 is referred to as "rotation detection period TC".

That is, the rotation detection period TC is set to a period after the drive pulse SP is output. A predetermined number of detection pulses CP are output at a predetermined cycle, and the respective counter-electromotive currents generated in the coil A and the coil B are simultaneously detected by the sampling operation. For example, the number of pulses and the cycle of the detection pulse CP in the rotation detection period TC can be set as appropriate. Further, the detection pulse CP is output at the same timing on the CP1 side and the CP2 side, but the output timings are not always required to be matched. For example, the output timings on the CP1 side and the CP2 side may be set in a nested state without departing from the present invention.

Next, after the rotation detection is ended in Step S3, the rotation detection circuit 30 counts the number of detection signals CS generated due to the detection pulse CP, and stores the number as a total detection number (Step S4: count detection number). In this case, the detection signal detected on the drive coil side (for example, the coil B) is referred to as "first detection signal CS1", and the detection signal detected in the other coil (for example, the coil A) is referred to as "second detection signal CS2". Each of the first detection signal CS1 and the second detection signal CS2 is individually counted.

Next, the rotation detection circuit 30 determines whether or not the total detection number of first detection signals CS1 (that is, the drive coil side) is equal to or larger than the total detection number of second detection signals CS2 (Step S5: CS1≥CS2?). The determination in Step S5 may be made by the control circuit 12.

In this case, when the total detection number of first detection signals CS1 is equal to or larger than the total detection number of second detection signals CS2 (determination Y), it is determined that the rotor 51 is not rotated, and the processing proceeds to Step S6. The control circuit 12 outputs the control signal CN2 so that the correction pulse generation circuit 14 outputs the correction pulse FP, and controls the pulse selection circuit 16 to output the correction pulse FP as the driver control pulse DP to the driver circuit 20. The driver circuit 20 outputs the correction pulse FP to the stepper motor 50 to rotate the rotor 51 with a large drive force (Step S6: output FP).

Further, when the total detection number of first detection signals CS1 is smaller than the total detection number of second detection signals CS2 (determination N), it is determined that the rotor 51 is rotated, and the hand movement operation of the stepper motor 50 is ended without the correction pulse FP being output.

Figure 9:
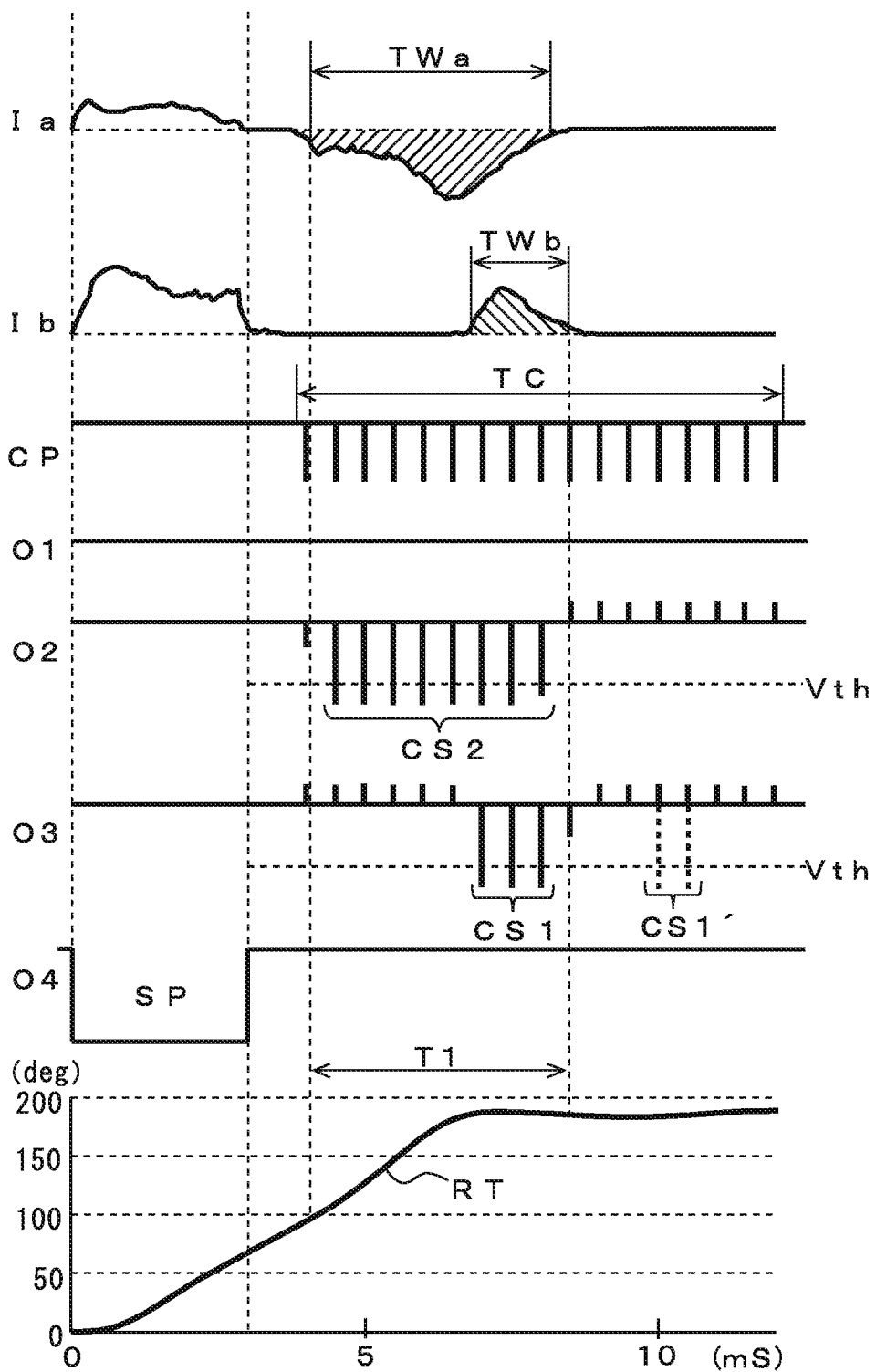
FIG. 9 is a timing chart for illustrating a detection operation performed during rotation by the drive circuit for a two-coil stepper motor according to the first embodiment of the present invention.

[Description of Detection Operation at Time when Rotor is Rotated in First Embodiment: FIG. 9]

Next, with reference to the timing chart of FIG. 9, description is given of generation of the counter-electromotive currents and the rotation detection operation at the time when the rotor 51 of the stepper motor 50 is rotated due to the output of the drive pulse SP in Step S1 illustrated in FIG. 8. As a condition of the description, there is assumed a case in which the coil B is the drive coil, and the drive pulse SP is output from the coil terminal O4.

Further, the timing charts of FIG. 9 and FIG. 10 to be referred to later represent a counter-electromotive current Ia generated in the coil A, the counter-electromotive current Ib generated in the coil B, the detection pulse CP, the drive waveforms O1, O2, O3, and O4, and a rotational angle RT of the rotor 51. The lateral axis represents an elapsed time (mS). Further, the detection signals CS1 and CS2 appearing in the drive waveforms O2 and O3 are schematically illustrated. FIG. 1 is referred to for the configuration of the drive circuit 10, and FIG. 4 is referred to for the circuit configuration of the drive circuit 20.

In FIG. 9, when the drive pulse SP is output from the coil terminal O4, the rotor 51 is rotated in the forward rotation direction. In this case, the rotational angle RT of the rotor 51 (illustrated in the lower part of FIG. 9) substantially linearly increases from the position of 0° due to the drive pulse SP to reach the position of 180° (that is, proceed by one step). This rotation of the rotor 51 causes the counter-electromotive current Ia to be generated from the coil A and the counter-electromotive current Ib to be generated from the coil B (drive coil). In this case, as described above, the stepper motor 50 has a slit angle of 75°, and there is a large difference ΔE between the peak values of the counter-electromotive voltages Ea and Eb generated in the coil A and the coil B (see FIG. 3(b)). Therefore, each of the waveforms of the counter-electromotive currents Ia and Ib has a large difference with respect to the time axis.

That is, as illustrated in FIG. 9, after the drive pulse SP is output, first, the counter-electromotive current Ia of the coil A is generated for a long period in the negative direction (as shown by hatching), and thereafter the counter-electromotive current Ib of the coil B is generated for a short period in the positive direction (as shown by hatching).

In this case, the counter-electromotive current Ia is generated in a substantially convex shape in the negative direction, and a period from the rising to the falling of the convex portion is referred to as "waveform length TWa". Further, the counter-electromotive current Ib is generated in a substantially convex shape in the positive direction, and a period from the rising to the falling of the convex portion is referred to as "waveform length TWb". Those definitions of the waveform lengths TWa and TWb are applied to all of the waveforms of the counter-electromotive currents Ia and Ib described later. The waveform lengths TWa and TWb may be defined with a predetermined current value or less being ignored in order to eliminate the influence of noise or the like.

The waveforms of the counter-electromotive currents Ia and Ib can be described with reference to the graph of the counter-electromotive voltage E (FIG. 3(b)) with respect to the rotational angle of the rotor 51 described above. In FIG. 9, a period in which the counter-electromotive currents Ia and Ib are generated corresponds to a period from when the rotational angle RT of the rotor 51 is in the vicinity of 100° to when the rotational angle RT of the rotor 51 exceeds 180°. When this period is applied to the graph of FIG. 3(b) as a counter-electromotive current generation period T1, the following is found. During the counter-electromotive current generation period T1, first, the counter-electromotive voltage Ea reaches a peak on the negative side, and thereafter the counter-electromotive voltage Eb increases in the positive direction but does not reach a peak (indicated by T1 in FIG. 3(b)).

The counter-electromotive current Ia depends on the polarity and the magnitude of the counter-electromotive voltage Ea, and hence, in accordance with the change in counter-electromotive voltage Ea, a large counter-electromotive current Ia is generated for a relatively long period in the negative direction from when the rotational angle RT of the rotor 51 passes the vicinity of 100°.

Further, the counter-electromotive current Ib depends on the polarity and the magnitude of the counter-electromotive voltage Eb, and hence, in accordance with the change in counter-electromotive voltage Eb, the counter-electromotive current Ib also increases with a delay in the positive direction, but the peak of the counter-electromotive voltage Eb is obtained when the rotational angle RT of the rotor 51 is in the vicinity of 220°. The rotor 51 is not rotated until the peak, and the rotational angle RT stops at 180°. Therefore, the counter-electromotive current Ib is generated for a relatively short period.

As described above, the waveforms of the counter-electromotive currents Ia and Ib generated from the coil A and the coil B when the rotor 51 is rotated due to the drive pulse SP can be known from the counter-electromotive voltages Ea and Eb of FIG. 3(b). Further, as described above, the counter-electromotive voltages Ea and Eb have a large difference ΔE between the peak values, and hence the waveforms of the counter-electromotive currents Ia and Ib have a large difference in magnitude (waveform length) and generation period. The difference between the waveforms of the counter-electromotive currents Ia and Ib refers to the difference in magnitude (waveform length) of the waveforms, the difference in generation period of the waveforms, or both of them.

Meanwhile, the rotation detection period TC is obtained after the drive pulse SP is output. During this period, the driver circuit 20 samples the counter-electromotive currents Ia and Ib at predetermined cycles based on the detection pulse CP to output the result of the sampling as the detection signal CS. The rotation detection circuit 30 receives the detection signal CS as input to count the detection signal CS exceeding the predetermined threshold value Vth, and determines the success/failure of the rotation of the rotor 51.

In this case, the first detection signal CS1 generated due to the first detection pulse CP1 output to the coil B being the drive coil appears in the drive waveform O3 (coil terminal O3 of the coil B), and the second detection signal CS2 generated due to the second detection pulse CP2 output to the coil A not being the drive coil appears in the drive waveform O2 (coil terminal O2 of the coil A).

In this case, as illustrated in FIG. 9, the number of first detection signals CS1 exceeding Vth of the rotation detection circuit 30 is 3 as an example because, as described above, the waveform length TWb of the counter-electromotive current Ib is short. The number of second detection signals CS2 is 8 as an example because the waveform length TWa of the counter-electromotive current Ia is long. That is, the total detection number of first detection signals CS1 represents the waveform length TWb of the counter-electromotive current Ib on the drive coil side, and the total detection number of second detection signals CS2 represents the waveform length TWa of the counter-electromotive current Ia.

Then, in Step S5 of FIG. 8 described above, when it is determined whether or not the total detection number of first detection signals CS1 (drive coil side) is equal to or larger than the total detection number of second detection signals CS2, the total detection number of first detection signals CS1 is 3 and the total detection number of second detection signals CS2 is 8, and hence the determination N is made. Thus, it is determined that the rotor 51 is rotated, and a correct rotation detection operation is executed.

[Description of Detection Operation at Time when Rotor is not Rotated in First Embodiment: FIG. 10]

Figure 10:
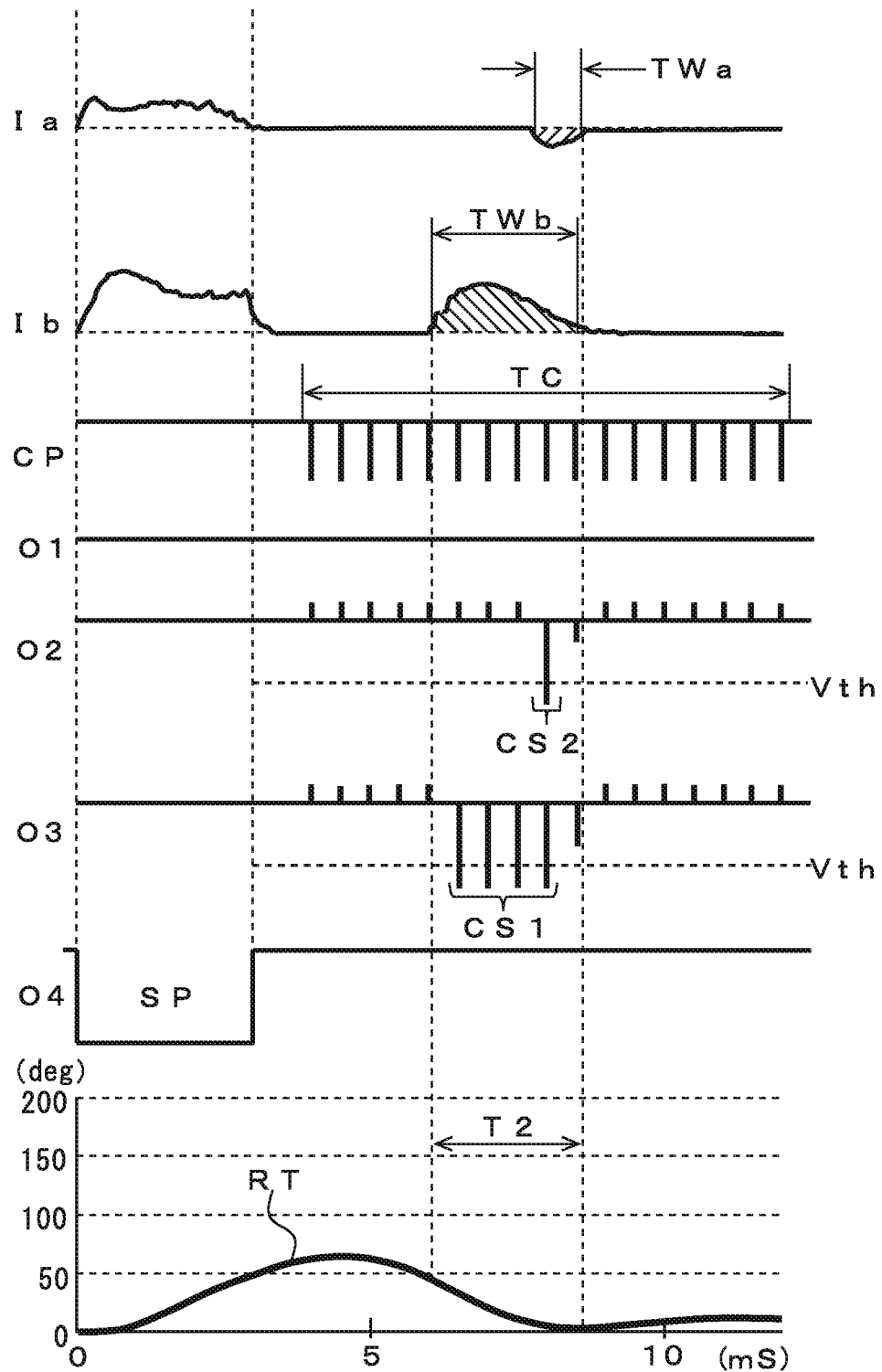
FIG. 10 is a timing chart for illustrating a detection operation performed during non-rotation by the drive circuit for a two-coil stepper motor according to the first embodiment of the present invention.

Next, with reference to the timing chart of FIG. 10, description is given of generation of the counter-electromotive currents and the rotation detection operation at a time when the drive pulse SP is output in Step S1 of FIG. 8 but the rotor 51 of the stepper motor 50 is not rotated (non-rotation) for the reason of load variation or the like. As a condition of the description, there is assumed a case in which the coil B is the drive coil, and the drive pulse SP is output from the coil terminal O4.

In FIG. 10, when the drive pulse SP is output from the coil terminal O4, the rotor 51 is intended to be rotated, but is not rotated for the reason of load variation or the like. In this case, the rotational angle RT of the rotor 51 (illustrated in the lower part of FIG. 10) increases from 0° to reach the vicinity of 60° in the forward rotation direction, but the rotor 51 cannot be rotated any more, and hence returns from the vicinity of 60° toward 0° (that is, rotates and returns in the reverse rotation direction).

This rotation of the rotor 51 causes the counter-electromotive currents Ia and Ib to be generated from the coil A and the coil B. That is, as illustrated in FIG. 10, after the drive pulse SP is output, first, the counter-electromotive current Ib of the coil B is generated for a relatively long period in the positive direction (as shown by hatching), and then the counter-electromotive current Ia of the coil A is generated for only a short period in the negative direction (as shown by hatching).

In this case, the waveforms of the counter-electromotive currents Ia and Ib at the time when the rotor 51 is not rotated can be described with reference to the graph of the counter-electromotive voltage E (FIG. 3(b)) similarly to the case in which the rotor 51 is rotated.

In FIG. 10, a period in which the counter-electromotive currents Ia and Ib are generated corresponds to a period in which the rotor 51 rotates in the reverse rotation direction from the vicinity of 50° to return to 0°. This period is applied to the graph of FIG. 3(b) as a counter-electromotive current generation period T2.

In this case, FIG. 3(b) is an illustration of a waveform of the counter-electromotive voltage E at the time when the rotor 51 is rotated in the forward rotation direction, but when the rotor 51 is not rotated, as described above, the rotor 51 is reversely rotated to return to 0°, and hence the values of the counter-electromotive voltages Ea and Eb obtained when the rotor 51 is reversely rotated may be applied. That is, although not shown, when the rotor is reversely rotated, the directions of the magnetic fluxes Φa and Φb illustrated in FIG. 3(a) are reversed, and hence values obtained by reversing the polarities of the counter-electromotive voltages Ea and Eb illustrated in FIG. 3(b) are applied.

Therefore, the counter-electromotive current generation period T2 (period in which the rotor 51 rotates from the vicinity of 50° to return to 0°) in FIG. 3(b) corresponds to a period in which the counter-electromotive voltage Ea decreases to the negative side from zero and a period in which the counter-electromotive voltage Eb is in the vicinity of the peak on the positive side (shown as T2 in FIG. 3(b)).

The counter-electromotive current Ia depends on the polarity and the magnitude of the counter-electromotive voltage Ea, and hence a small counter-electromotive current Ia is generated for only a short period in the negative direction around when the rotor 51 is reversely rotated so that the rotational angle RT returns to 0° (that is, the waveform length TWa is short). Further, the counter-electromotive current Ib depends on the polarity and the magnitude of the counter-electromotive voltage Ea, and hence the counter-electromotive current Ib is generated for a relatively long period in the positive direction earlier than the counter-electromotive current Ia, that is, in synchronization with a timing at which the rotor 51 is reversely rotated and returned (waveform length TWb is long).

As described above, even when the rotor 51 is not rotated, the waveforms of the counter-electromotive currents Ia and Ib generated from the coil A and the coil B can be known from the values obtained by reversing the polarities of the counter-electromotive voltages Ea and Eb of FIG. 3(b). Further, as described above, the counter-electromotive voltages Ea and Eb have a large difference ΔE between the peak values, and hence even when the rotor 51 is not rotated, the waveforms of the counter-electromotive currents Ia and Ib have a large difference in magnitude (waveform length TW) and generation time period.

In this case, similarly to the case in which the rotor 51 is rotated, during the rotation detection period TC, the driver circuit 20 samples the counter-electromotive currents Ia and Ib at predetermined cycles based on the detection pulse CP to output the result as the detection signal CS. The rotation detection circuit 30 receives the detection signal CS as input to count the detection signal CS exceeding the predetermined threshold value Vth, and determines the success/failure of the rotation of the rotor 51.

In this case, similarly to FIG. 9, the first detection signal CS1 generated due to the first detection pulse CP1 output to the coil B being the drive coil appears in the drive waveform O3 (coil terminal O3 of the coil B), and the second detection signal CS2 generated due to the second detection pulse CP2 output to the coil A not being the drive coil appears in the drive waveform O2 (coil terminal O2 of the coil A).

In this case, as illustrated in FIG. 10, the number of first detection signals CS1 exceeding Vth of the rotation detection circuit 30 is 4 as an example because the waveform length TWb is relatively long. The number of second detection signals CS2 is 1 as an example because the waveform length TWa is short.

Then, in Step S5 of FIG. 8 described above, when it is determined whether or not the total detection number of first detection signals CS1 (that is, drive coil side) is equal to or larger than the total detection number of second detection signals CS2, the total detection number of first detection signals CS1 is 4 and the total detection number of second detection signals CS2 is 1, and hence the determination Y is made. Thus, it is determined that the rotor 51 is not rotated, and a correct rotation detection operation is executed.

In FIG. 9 and FIG. 10, in the drive waveform O2 (coil terminal O2) and the drive waveform O3 (coil terminal O3), during a period in which the counter-electromotive currents Ia and Ib are not generated (that is, straight line periods of the counter-electromotive currents), pulses slightly extending to the positive side are illustrated in synchronization with the detection pulse CP, but those pulses are illustrated for representing the timing of the detection pulse CP, and the polarity and the magnitude of the pulses have no meaning. However, even in the period in which the counter-electromotive currents Ia and Ib are not generated, a small positive or negative pulse may be generated at the coil terminals O1 to O4 in synchronization with the detection pulse CP due to the influence of the current noise or the like.

As described above, in the first embodiment, the success/failure of the rotation of the rotor 51 is determined based on the comparison between the total detection number of first detection signals CS1 and the total detection number of second detection signals CS2 during the rotation detection period TC having a predetermined length. Therefore, even when some counting mistakes occur during the counting of the first detection signal CS1 or the second detection signal CS2 due to the influence of the external noise or the like, the possibility of falsely determining the success/failure of the rotation is extremely low.

For example, even when two false detection signals CS1' (indicated by the dotted-line pulses) are added due to noise to the first detection signals CS1 (coil terminal O3) illustrated in FIG. 9, the number of first detection signals CS1 is counted as 5, and the number of second detection signals CS2 is counted as 8. Therefore, the determination N (rotated) is made in Step S5, and thus correct determination is made.

As described above, according to the first embodiment, it is possible to provide the drive circuit for a two-coil stepper motor configured to simultaneously detect, based on the detection pulses CP1 and CP2, the counter-electromotive currents Ia and Ib generated from the two coils A and B of the stepper motor 50, and compare the total detection numbers of two detection signals CS1 and CS2 generated due to the detection pulses CP1 and CP2, thereby being capable of detecting the success/failure of the rotation of the rotor 51 with high accuracy.

Further, the success/failure of the rotation of the rotor 51 is determined based on the difference between the total detection numbers of first and second detection signals CS1 and CS2 generated during the rotation detection period TC having a predetermined length. Therefore, it is possible to achieve the drive circuit for a two-coil stepper motor capable of reducing the influence of external noise or the like and having a highly-reliable rotation detection function that is excellent in noise resistance characteristics.

When the drive circuit for a two-coil stepper motor capable of detecting the success/failure of the rotation of the stepper motor with high accuracy is used, the drive is normally performed while the drive force of the drive pulse SP is decreased as much as possible, and when the rotor 51 is not rotated due to the load variation or the like, the non-rotation is detected so that a correction pulse with a large drive force is output. Thus, the rotation of the rotor 51 can be kept normal. As a result, it is possible to provide the high-performance electronic watch achieving extremely low power consumption and less false rotation of the stepper motor, and supporting high-speed bi-directional rotation drive to be performed by the two-coil stepper motor.

Figure 11:
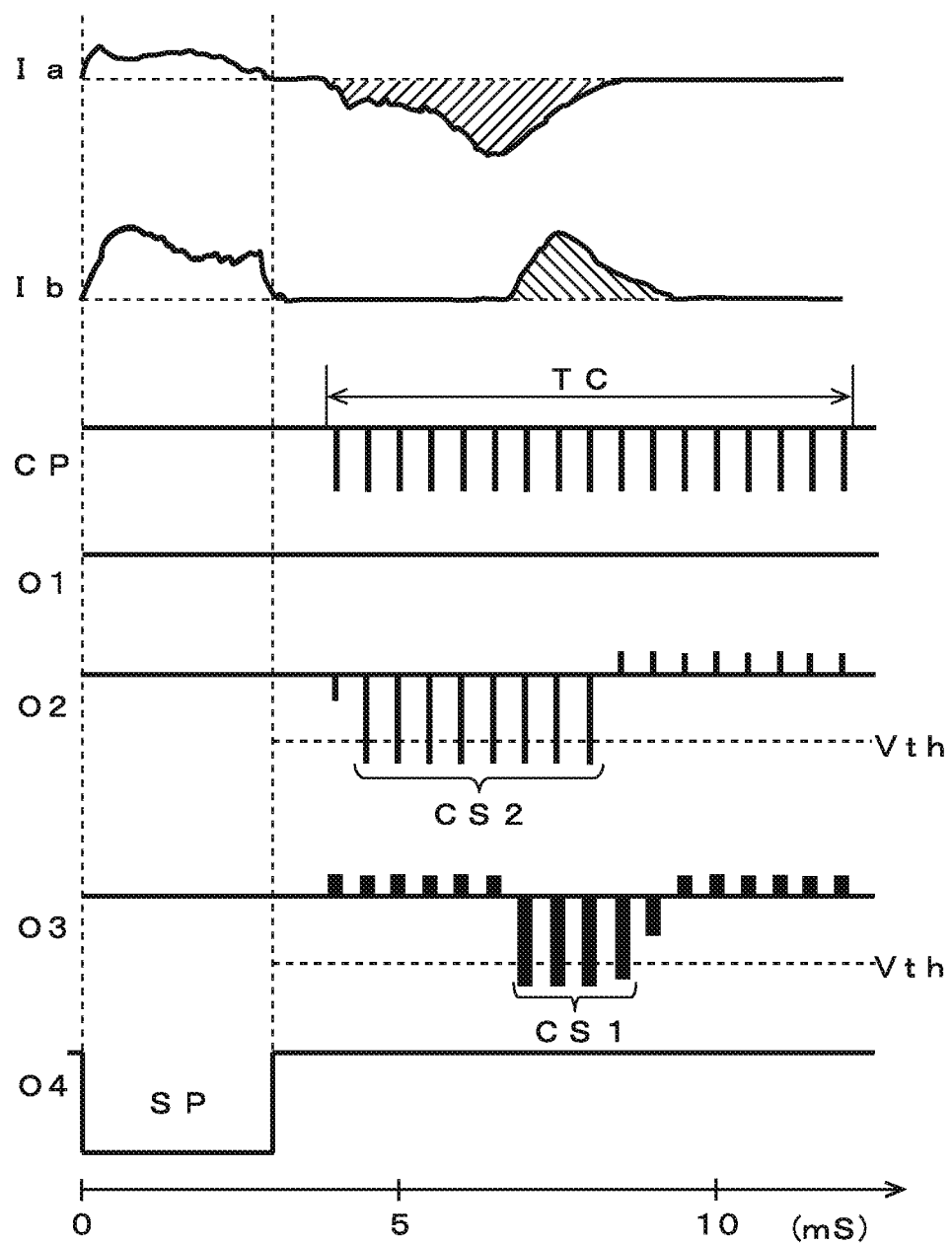
FIG. 11 is a timing chart for illustrating a detection operation performed during rotation by a drive circuit for a two-coil stepper motor according to Modification Example 1 of the first embodiment of the present invention.
Figure 12:
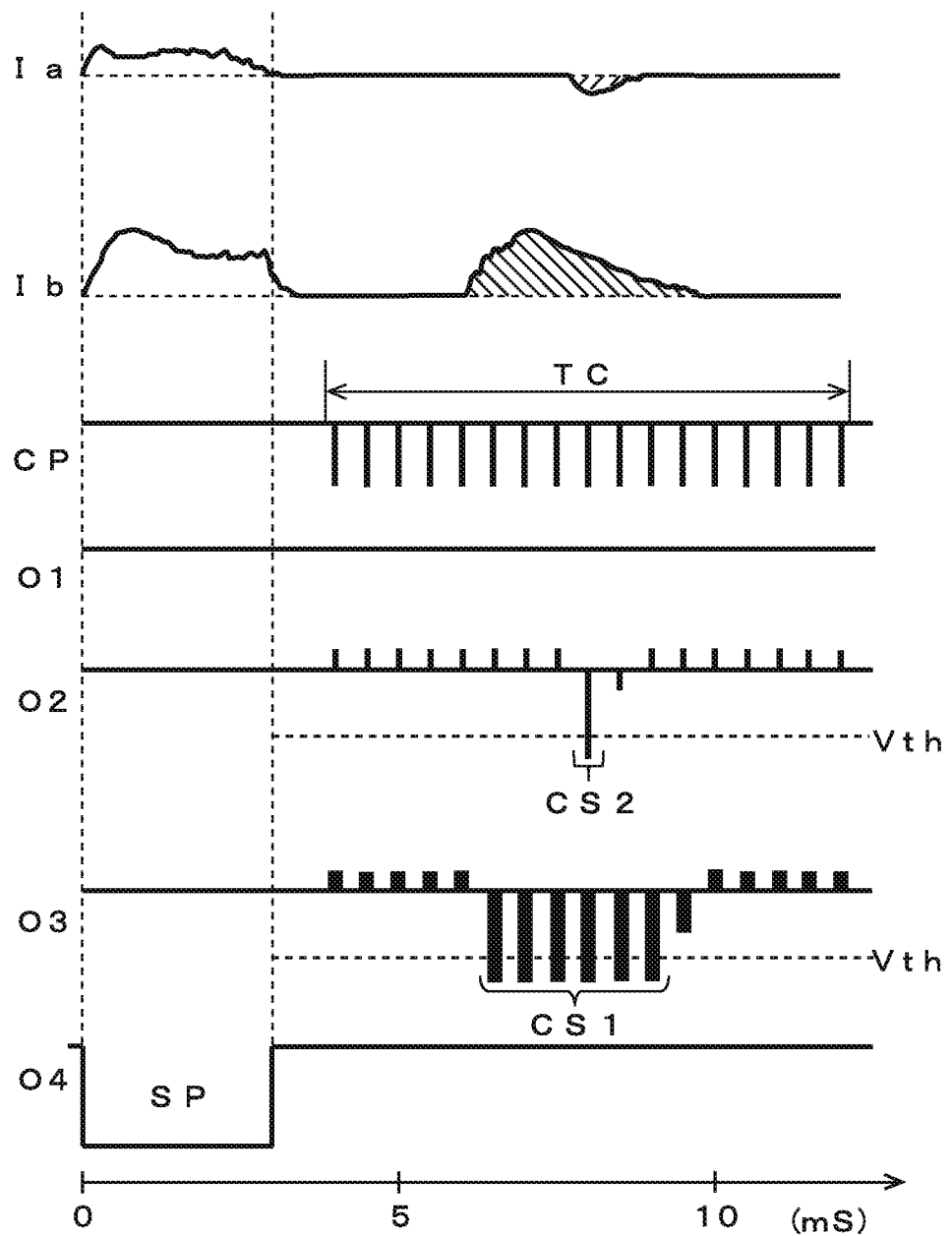
FIG. 12 is a timing chart for illustrating a detection operation performed during non-rotation by the drive circuit for a two-coil stepper motor according to Modification Example 1 of the first embodiment of the present invention.

[Description of Rotation Detection Operation of Modification Example 1 of First Embodiment: FIG. 11 and FIG. 12]

Next, with reference to the timing charts of FIG. 11 and FIG. 12, description is given of a rotation detection operation of a drive circuit for a two-coil stepper motor according to Modification Example 1 of the first embodiment. Modification Example 1 of the first embodiment has a feature in that the pulse width of the detection pulse on the drive coil side is increased so that the detection sensitivity with respect to the counter-electromotive current generated in the drive coil is increased. Thus, the frequency of occurrence of false detection of non-rotation is decreased.

In this case, during a period in which the detection pulse CP becomes active, the detection resistors are connected to the coil A and the coil B so that a state close to an open state is obtained. Therefore, the effect of the electromagnetic brake with respect to the rotor is reduced, and thus a large counter-electromotive current is generated. Therefore, when the pulse width of the detection pulse CP is increased (that is, the period in which the detection resistor is connected is increased), a large counter-electromotive current is generated. As a result, the detection sensitivity with respect to the counter-electromotive current can be increased.

FIG. 11 is an example of a timing chart of a case in which the rotor 51 is rotated, and FIG. 12 is an example of a timing chart of a case in which the rotor 51 is not rotated. In this case, the timing charts including those of FIG. 13 and FIG. 14 to be referred to later represent the counter-electromotive current Ia generated in the coil A, the counter-electromotive current Ib generated in the coil B, the detection pulse CP, and the drive waveforms O1, O2, O3, and O4. FIG. 1 is referred to for the configuration of the drive circuit 10, and FIG. 4 is referred to for the circuit configuration of the drive circuit 20. Further, the stepper motor 50 has a slit angle of 75° similarly to the first embodiment.

First, description is given of the rotation detection operation of Modification Example 1 at the time when the rotor 51 is rotated. In FIG. 11, when the rotor 51 is rotated due to the output of the drive pulse SP from the coil terminal O4, the counter-electromotive current Ia is generated from the coil A, and the counter-electromotive current Ib is generated from the coil B (drive coil). In this case, as described above, the stepper motor 50 has a slit angle of 75°, and there is a large difference ΔE between the peak values of the counter-electromotive voltages E. Therefore, each of the counter-electromotive currents Ia and Ib is generated with a large difference with respect to the time axis.

That is, after the drive pulse SP is output, first, the counter-electromotive current Ia is generated for a long period in the negative direction (as shown by hatching), and thereafter the counter-electromotive current Ib is generated for a relatively short period in the positive direction (as shown by hatching).

During the rotation detection period TC, the drive circuit 20 samples the counter-electromotive currents Ia and Ib based on the detection pulse CP that is periodically output, to thereby output the result as the detection signals CS1 and CS2. The rotation detection circuit 30 receives the detection signals CS1 and CS2 as input, and counts the detection signals CS1 and CS2 exceeding the predetermined threshold value Vth to determine the success/failure of the rotation of the rotor 51.

In this case, in Modification Example 1, the pulse width of the first detection pulse CP1 output to the coil B being the drive coil is set to be larger than the pulse width of the second detection pulse CP2 output to the coil A not being the drive coil (the first detection signal CS1 generated due to the first detection pulse CP1 is illustrated thick). With this, the counter-electromotive current Ib generated in the coil B being the drive coil is increased, and thus the detection sensitivity with respect to the counter-electromotive current Ib can be increased.

Then, the first detection signal CS1 generated due to the first detection pulse CP1 output to the coil B being the drive coil appears in the drive waveform O3 (coil terminal O3) similarly to the first embodiment, and the second detection signal CS2 generated due to the second detection pulse CP2 output to the coil A not being the drive coil appears in the drive waveform O2 (coil terminal O2). The rotation detection circuit 30 counts the detection signals exceeding the threshold value Vth. The total detection number of first detection signals CS1 is 4 as an example, and the total detection number of second detection signals CS2 is 8 as an example.

In the first embodiment, the total detection number of first detection signals CS1 at the time when the rotor 51 is rotated is 3 as an example (see FIG. 9), but in Modification Example 1, the detection sensitivity with respect to the counter-electromotive current Ib generated in the coil B is increased, and hence the total detection number of first detection signals CS1 is 4, which is increased by 1.

Next, description is given of the rotation detection operation at the time when the rotor 51 is not rotated. In FIG. 12, when the drive pulse SP is output from the coil terminal O4 but the rotor 51 is not rotated due to load variation or the like, the generation timings and magnitudes of the counter-electromotive currents Ia and Ib generated in the coil A and the coil B greatly differ from those obtained when the rotor 51 is rotated. That is, after the drive pulse SP is output, first, the counter-electromotive current Ib of the coil B is generated for a relatively long period in the positive direction (as shown by hatching), and thereafter the counter-electromotive current Ia of the coil A is generated for only a short period in the negative direction (as shown by hatching).

In this case, similarly to the case of FIG. 11, during the rotation detection period TC, the drive circuit 20 samples the counter-electromotive currents Ia and Ib based on the detection pulse CP. As a result, the detection signals CS1 and CS2 are generated to be input to the rotation detection circuit 30, and the detection signals CS1 and CS2 exceeding the predetermined threshold value Vth are counted so that the success/failure of the rotation of the rotor 51 is determined.

In this case, in Modification Example 1, as described above, the pulse width of the first detection pulse CP1 supplied to the coil B being the drive coil is set to be larger than the pulse width of the second detection pulse CP2 supplied to the coil A not being the drive coil (the first detection signal CS1 generated due to the first detection pulse CP1 is illustrated thick). With this, the counter-electromotive current Ib generated in the coil B being the drive coil is increased, and thus the detection sensitivity with respect to the counter-electromotive current Ib can be increased.

Then, similarly to FIG. 11, the first detection signal CS1 appears in the drive waveform O3 (coil terminal O3), and the second detection signal CS2 appears in the drive waveform O2 (coil terminal O2). The rotation detection circuit 30 counts the detection signals exceeding the threshold value Vth. The total detection number of first detection signals CS1 is 6 as an example, and the total detection number of second detection signals CS2 is 1 as an example.

In the first embodiment, the total detection number of first detection signals CS1 at the time when the rotor 51 is not rotated is 4 as an example (see FIG. 10), but in Modification Example 1, the detection sensitivity with respect to the counter-electromotive current Ib generated in the coil B is increased, and hence the total detection number of first detection signals CS1 is 6, which is increased by 2.

As described above, according to Modification Example 1 of the first embodiment, the pulse width of the first detection pulse CP1 output to the drive coil is increased so that the detection sensitivity with respect to the counter-electromotive current generated in the drive coil is increased. With this, the first detection signal CS1 on the drive coil side easily exceeds Vth of the rotation detection circuit 30, and the total detection number of first detection signals CS1 is increased. As a result, Step S5 of the flow (see FIG. 8) of the first embodiment is likely to have the determination Y (large detection number in drive coil: non-rotation). When whether the rotor 51 is rotated or not is unclear, it is determined that the rotor 51 is not rotated, and Step S6 is executed so that the correction pulse FP is output.

In this case, when it is falsely determined that the rotor 51 is rotated even though the rotor 51 is not rotated, the correction pulse FP is not output, and hence the hands get out of order. However, when the detection sensitivity with respect to the counter-electromotive current on the drive coil side is increased as in Modification Example 1, the frequency of occurrence of false detection of non-rotation is decreased. As a result, the frequency at which the hands get out of order due to false detection can be decreased, and thus it is possible to provide the drive circuit for a two-coil stepper motor having high reliability in time indication and the electronic watch using the drive circuit.

When the coil A is the drive coil, the pulse width of the first detection pulse CP1 output to the coil A is set to be increased so that the detection sensitivity with respect to the counter-electromotive current Ia generated in the coil A is increased. Further, the ratio of increasing the pulse width of the first detection pulse CP1 is not limited.

Figure 13:
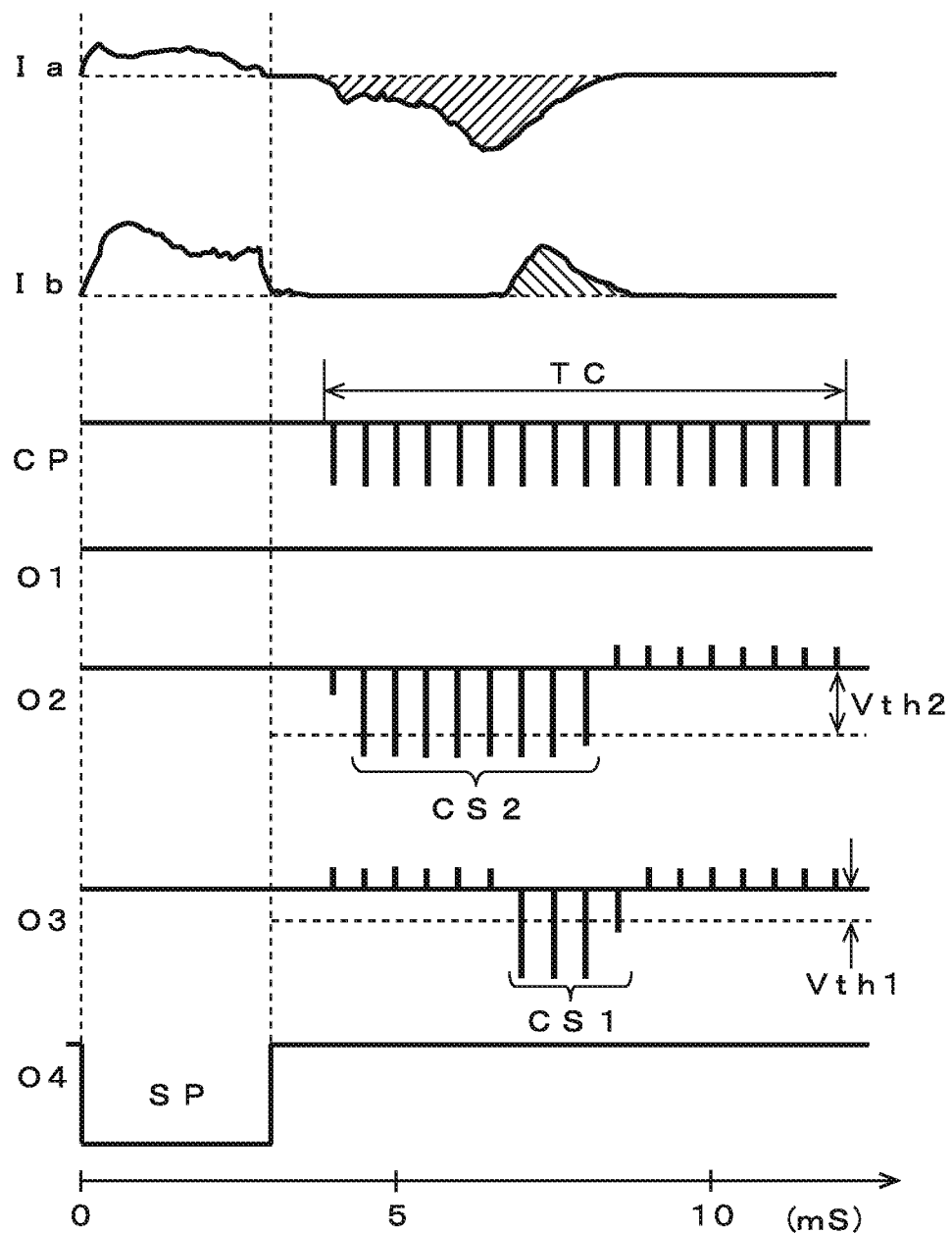
FIG. 13 is a timing chart for illustrating a detection operation performed during rotation by a drive circuit for a two-coil stepper motor according to Modification Example 2 of the first embodiment of the present invention.
Figure 14:
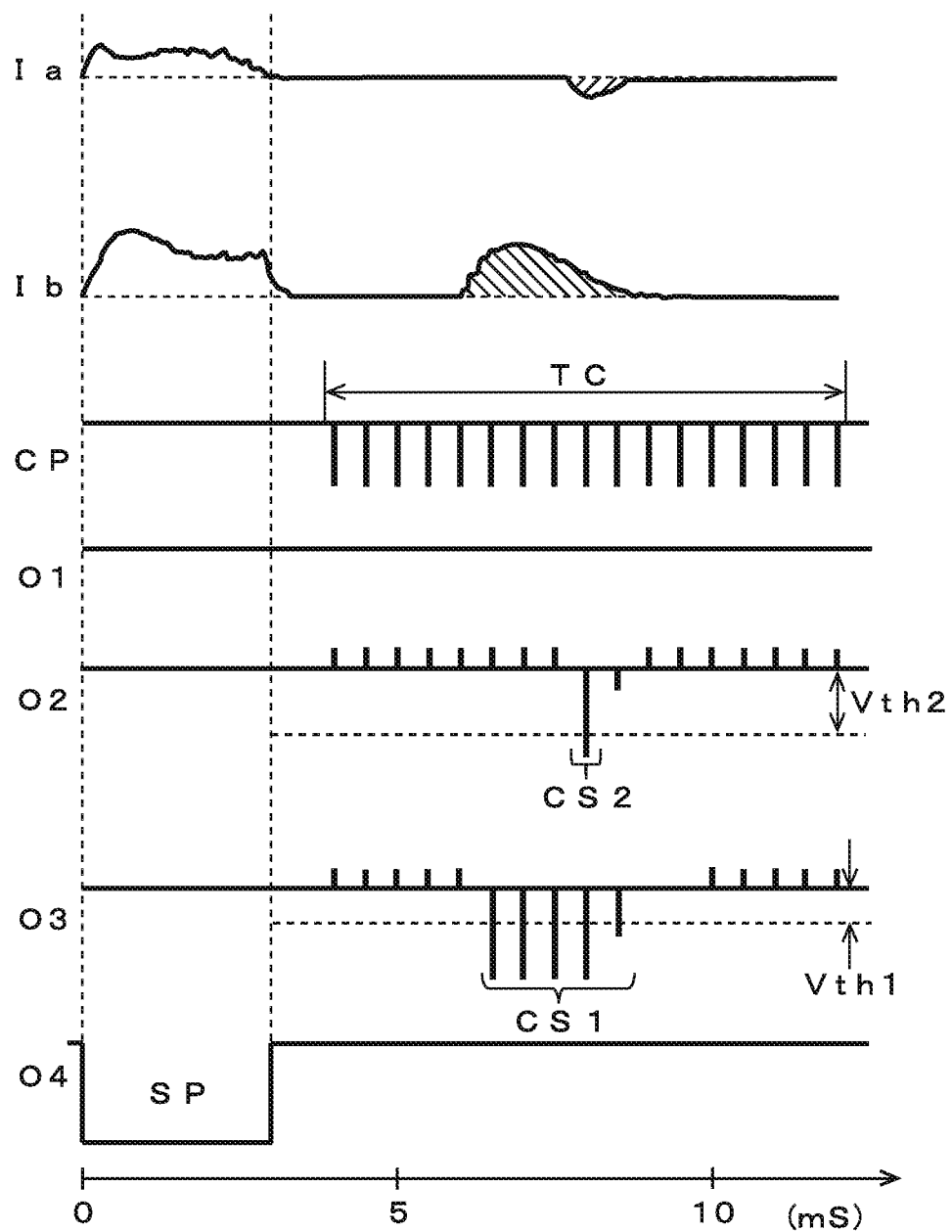
FIG. 14 is a timing chart for illustrating a detection operation performed during non-rotation by the drive circuit for a two-coil stepper motor according to Modification Example 2 of the first embodiment of the present invention.

[Description of Rotation Detection Operation of Modification Example 2 of First Embodiment: FIG. 13 and FIG. 14]

Next, with reference to the timing charts of FIG. 13 and FIG. 14, description is given of a rotation detection operation of a drive circuit for a two-coil stepper motor according to Modification Example 2 of the first embodiment. Modification Example 2 of the first embodiment has a feature in that the threshold value of the rotation detection circuit for determining whether or not to adopt the detection signal generated in the drive coil is decreased so that the detection sensitivity with respect to the counter-electromotive current generated in the drive coil is increased. Thus, the frequency of occurrence of false detection of non-rotation is decreased.

FIG. 13 is an example of a timing chart of a case in which the rotor 51 is rotated, and FIG. 14 is an example of a timing chart of a case in which the rotor 51 is not rotated. FIG. 1 is referred to for the configuration of the drive circuit 10, and FIG. 4 is referred to for the circuit configuration of the drive circuit 20. Further, the stepper motor 50 has a slit angle of 75° similarly to the first embodiment.

First, description is given of the rotation detection operation of Modification Example 2 at the time when the rotor 51 is rotated. In FIG. 13, when the rotor 51 is rotated due to the output of the drive pulse SP from the coil terminal O4, the counter-electromotive current Ia is generated from the coil A, and the counter-electromotive current Ib is generated from the coil B (drive coil). In this case, as described above, the stepper motor 50 has a slit angle of 75°, and therefore each of the counter-electromotive currents Ia and Ib is generated with a large difference with respect to the time axis.

That is, after the drive pulse SP is output, first, the counter-electromotive current Ia is generated for a long period in the negative direction (as shown by hatching), and thereafter the counter-electromotive current Ib is generated for a relatively short period in the positive direction (as shown by hatching).

During the rotation detection period TC, the drive circuit 20 samples the counter-electromotive currents Ia and Ib based on the detection pulse CP that is periodically output, to thereby output the result as the detection signals CS1 and CS2. The rotation detection circuit 30 receives the detection signals CS1 and CS2 as input, and counts the detection signals CS1 and CS2 exceeding the predetermined threshold value Vth to determine the success/failure of the rotation of the rotor 51.

In this case, in Modification Example 2, a threshold value Vth1 of the rotation detection circuit 30 with respect to the first detection signal CS1 generated in the coil B being the drive coil is set to be lower than a threshold value Vth2 with respect to the second detection signal CS2 generated in the coil A not being the drive coil. With this, the detection sensitivity with respect to the counter-electromotive current Ib generated in the coil B being the drive coil can be increased. The threshold value Vth1 can be changed by providing a threshold value changing function to the rotation detection circuit 30.

Then, the first detection signal CS1 generated in the coil B being the drive coil appears in the drive waveform O3 (coil terminal O3) similarly to the first embodiment, and the second detection signal CS2 generated in the coil A not being the drive coil appears in the drive waveform O2 (coil terminal O2). The rotation detection circuit 30 counts the detection signals exceeding the threshold values Vth1 and Vth2. The total detection number of first detection signals CS1 is 4 as an example, and the total detection number of second detection signals CS2 is 8 as an example.

In the first embodiment, the total detection number of first detection signals CS1 at the time when the rotor 51 is rotated is 3 as an example (see FIG. 9), but in Modification Example 2, the threshold value Vth1 with respect to the first detection signal CS1 is decreased, and hence the total detection number of first detection signals CS1 is 4, which is increased by 1.

Next, description is given of the rotation detection operation at the time when the rotor 51 is not rotated. In FIG. 14, when the drive pulse SP is output from the coil terminal O4 but the rotor 51 is not rotated due to load variation or the like, the generation timings and magnitudes of the counter-electromotive currents Ia and Ib generated in the coil A and the coil B greatly differ from those obtained when the rotor 51 is rotated. That is, after the drive pulse SP is output, first, the counter-electromotive current Ib of the coil B is generated for a relatively long period in the positive direction (as shown by hatching), and thereafter the counter-electromotive current Ia of the coil A is generated for only a short period in the negative direction (as shown by hatching).

In this case, similarly to the case of FIG. 13, during the rotation detection period TC, the drive circuit 20 samples the counter-electromotive currents Ia and Ib based on the detection pulse CP. As a result, the detection signals CS1 and CS2 are generated to be input to the rotation detection circuit 30, and the detection signals CS1 and CS2 exceeding the predetermined threshold values Vth are counted so that the success/failure of the rotation of the rotor 51 is determined.

In this case, in Modification Example 2, as described above, the threshold value Vth1 of the rotation detection circuit 30 with respect to the first detection signal CS1 generated in the coil B being the drive coil is set to be lower than the threshold value Vth2 with respect to the second detection signal CS2 generated in the coil A not being the drive coil. With this, the detection sensitivity with respect to the counter-electromotive current Ib generated in the coil B being the drive coil can be increased.

Then, the first detection signal CS1 generated in the coil B being the drive coil appears in the drive waveform O3 (coil terminal O3) similarly to the first embodiment, and the second detection signal CS2 generated in the coil A not being the drive coil appears in the drive waveform O2 (coil terminal O2). The rotation detection circuit 30 counts the detection signals exceeding the threshold values Vth1 and Vth2. The total detection number of first detection signals CS1 is 5 as an example, and the total detection number of second detection signals CS2 is 1 as an example.

In the first embodiment, the total detection number of first detection signals CS1 at the time when the rotor 51 is not rotated is 4 as an example (see FIG. 10), but in Modification Example 2, the threshold value Vth1 with respect to the first detection signal CS1 is decreased, and hence the total detection number of first detection signals CS1 is 5, which is increased by 1.

As described above, according to Modification Example 2 of the first embodiment, the threshold value Vth1 for determining whether or not to adopt the first detection signal CS1 generated in the drive coil is decreased so that the detection sensitivity with respect to the counter-electromotive current generated in the drive coil is increased. With this, the first detection signal CS1 on the drive coil side easily exceeds the threshold value Vth1 of the rotation detection circuit 30, and the total detection number of first detection signals CS1 is increased. As a result, Step S5 of the flow (see FIG. 8) of the first embodiment is likely to have the determination Y (large detection number in drive coil: non-rotation). When whether the rotor 51 is rotated or not is unclear, it is determined that the rotor 51 is not rotated, and Step S6 is executed so that the correction pulse FP is output.

As described above, when the threshold value Vth1 on the drive coil side is changed, the frequency of occurrence of false detection of non-rotation is decreased. As a result, the frequency at which the hands get out of order due to false detection can be decreased, and thus it is possible to provide the drive circuit for a two-coil stepper motor having high reliability in time indication and the electronic watch using the drive circuit. When the coil A is the drive coil, the threshold value Vth1 of the rotation detection circuit 30 with respect to the first detection signal CS1 generated in the coil A is decreased so that the detection sensitivity with respect to the counter-electromotive current Ia generated in the coil A is increased. Further, the width of decreasing the threshold value Vth1 is not limited.

[Description of Rotation Detection Operation of Modification Example 3 of First Embodiment: FIG. 4]

Next, with reference to FIG. 4, description is given of a rotation detection operation of a drive circuit for a two-coil stepper motor according to Modification Example 3 of the first embodiment. Modification Example 3 of the first embodiment has a feature in that the resistance value of the detection resistor connected to the drive coil in which the first detection signal CS1 is generated is increased so that the detection sensitivity with respect to the counter-electromotive current generated in the drive coil is increased. Thus, the frequency of occurrence of false detection of non-rotation is decreased.

In FIG. 4, when the drive pulse SP is output from the coil terminal O4 with the coil B serving as the drive coil, for example, the resistance value of the detection resistor R3 connected to the coil terminal O3 of the coil B to which the first detection pulse CP1 is output is switched by any means (not shown) so that the resistance value becomes larger than that of the detection resistor R2 connected to the coil terminal O2 of the coil A to which the second detection pulse CP2 is output.

Further, when the drive pulse SP is output to the coil terminal O3 with the coil B serving as the drive coil, for example, the resistance value of the detection resistor R4 connected to the coil terminal O4 of the coil B to which the first detection pulse CP1 is output is switched by any means (not shown) so that the resistance value becomes larger than that of the detection resistor R1 connected to the coil terminal O1 of the coil A to which the second detection pulse CP2 is output.

Similarly, when the first detection pulse CP1 is output to the coil terminal O2 of the coil A with the coil A serving as the drive coil, the resistance value of the detection resistor R2 is increased. Further, when the first detection pulse CP1 is output to the coil terminal O1 of the coil A with the coil A serving as the drive coil, the resistance value of the detection resistor R1 is increased.

In this manner, the resistance value of the detection resistor connected to the coil terminal of the drive coil to which the first detection pulse CP1 is output is increased so that the crest value of the first detection signal CS1 generated due to the voltage drop of the counter-electromotive current flowing through the detection resistor can be increased. As a result, the detection sensitivity with respect to the counter-electromotive current generated in the drive coil can be increased. The ratio of change of the detection resistor is not limited.

As described above, according to Modification Example 3 of the first embodiment, the resistance value of the detection resistor connected to the terminal of the drive coil to which the first detection pulse CP1 is output is increased so that the detection sensitivity to the counter-electromotive current generated in the drive coil is increased. With this, the first detection signal CS1 generated in the drive coil easily exceeds Vth of the rotation detection circuit 30, and the total detection number of first detection signals CS1 is increased. As a result, Step S5 of the flow (see FIG. 8) of the first embodiment is likely to have the determination Y (large detection number in drive coil: non-rotation). When whether the rotor 51 is rotated or not is unclear, it is determined that the rotor 51 is not rotated, and Step S6 is executed so that the correction pulse FP is output.

As described above, when the resistance value of the detection resistor in which the first detection signal CS1 is generated is changed, the frequency of occurrence of false detection of non-rotation can be decreased, and hence the frequency at which the hands get out of order due to false detection can be decreased. Thus, it is possible to provide the drive circuit for a two-coil stepper motor having high reliability in time indication and the electronic watch using the drive circuit. Modification Examples 1 to 3 of the first embodiment may be individually implemented or may be combined as appropriate. For example, Modification Example 1 and Modification Example 2 of the first embodiment may be combined to employ a configuration in which the detection sensitivity with respect to the counter-electromotive current of the drive coil is further increased.

Second Embodiment

Figure 15:
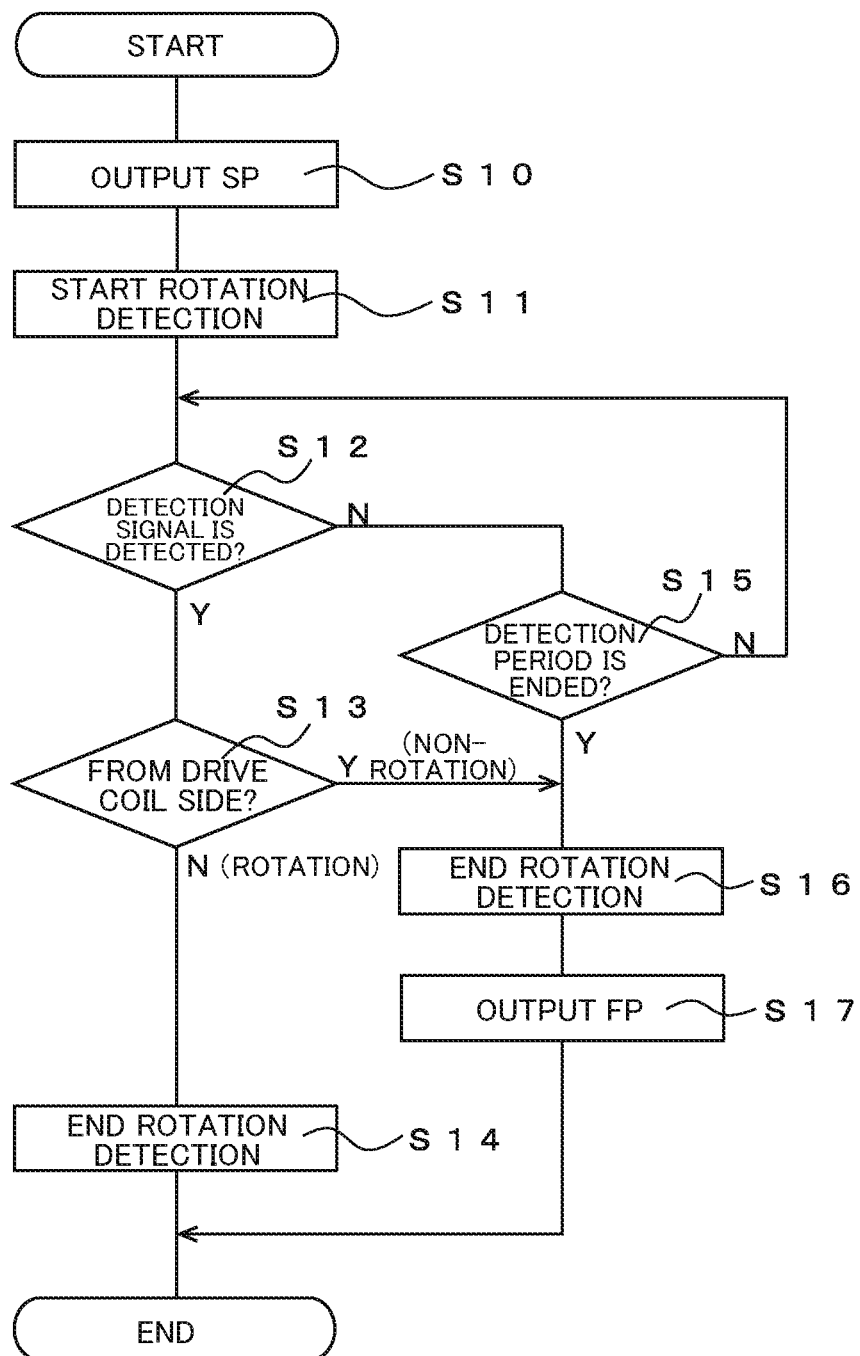
FIG. 15 is a flow chart for illustrating an operation of the drive circuit for a two-coil stepper motor according to the second embodiment of the present invention.

[Description of Rotation Detection Operation Flow of Second Embodiment: FIG. 15]

Next, with reference to the flow chart of FIG. 15, the rotation detection operation flow of the second embodiment is described. The second embodiment has a feature in that the success/failure of the rotation of the rotor is determined based on the speeds of the detection signals arriving from the two coils. The configuration of the drive circuit 10 is similar to that of the first embodiment (see FIG. 1 and FIG. 4), and the stepper motor to be used is the stepper motor 50 having a slit angle of 75° (see FIG. 2) similarly to the first embodiment.

In FIG. 15, as an example, the control circuit 12 of the drive circuit 10 controls the drive pulse generation circuit 13 based on a hand movement timing of every second, and outputs the drive pulse SP to the pulse selection circuit 16.

The driver circuit 20 receives the driver control pulse DP as input from the pulse selection circuit 16. As an example, the driver circuit 20 outputs the drive pulse SP to the coil terminal O4 to rotate the stepper motor 50 in the forward direction (Step S10: output SP).

Next, after the drive pulse SP is output and a predetermined time period elapses, the control circuit 12 outputs the detection pulse CP from the detection pulse generation circuit 15, and outputs the detection pulse CP to the driver circuit 20 via the pulse selection circuit 16. The driver circuit 20 starts the rotation detection period of detecting the counter-electromotive currents generated from the coil A and the coil B due to the input detection pulse CP (Step S11: start rotation detection).

Next, the rotation detection circuit 30 determines whether or not the detection signal CS from the driver circuit 20 exceeds the threshold value Vth in the rotation detection circuit 30 (Step S12: detection signal is detected?). In this case, when the detection signal CS exceeds Vth of the rotation detection circuit 30 (determination Y), the processing proceeds to Step S13, and when the detection signal CS does not exceed Vth (determination N), the processing proceeds to Step S15.

Next, when the determination Y is made in Step S12, the rotation detection circuit 30 determines whether or not the detection signal CS is generated from the drive coil side (Step S13: from drive coil side?). In this case, when the detection signal CS is generated from the drive coil side, the determination Y (non-rotation) is made, and the processing proceeds to Step S16. When the detection signal CS is not generated from the drive coil side, the determination N (rotation) is made, and the processing proceeds to Step S14. When the two detection signals (that is, CS1 and CS2) are simultaneously generated, the determination Y (non-rotation) is made.

Next, when the determination N (rotation) is made in Step S13, the control circuit 12 ends the rotation detection period to stop the output of the detection pulse CP, and thus ends the rotation detection operation (Step S14).

Further, when the determination Y (non-rotation) is made in Step S13, the control circuit 12 ends the rotation detection period to stop the output of the detection pulse CP (Step S16). Further, the control circuit 12 controls the correction pulse generation circuit 14 to output the correction pulse FP so that the driver circuit 20 supplies the correction pulse FP to the drive coil side. Thus, the control circuit 12 rotates the rotor 51 with a large drive force (Step S17: output FP), and ends the rotation detection.

Further, when the determination N is made in Step S12, the control circuit 12 determines whether or not the rotation detection period is ended (Step S15: detection period is ended?). In this case, when the rotation detection period is not ended (determination N), the processing returns to Step S12 so that the rotation detection operation of periodically outputting the detection pulse CP is continued. Further, when a predetermined time period elapses and the rotation detection period is ended (determination Y), the detection signal CS is not detected, and hence it is determined that the rotor 51 is not rotated. Thus, the processing proceeds to Steps S16 and S17 described above so that the correction pulse FP is output, and the processing is ended.

Figure 16:
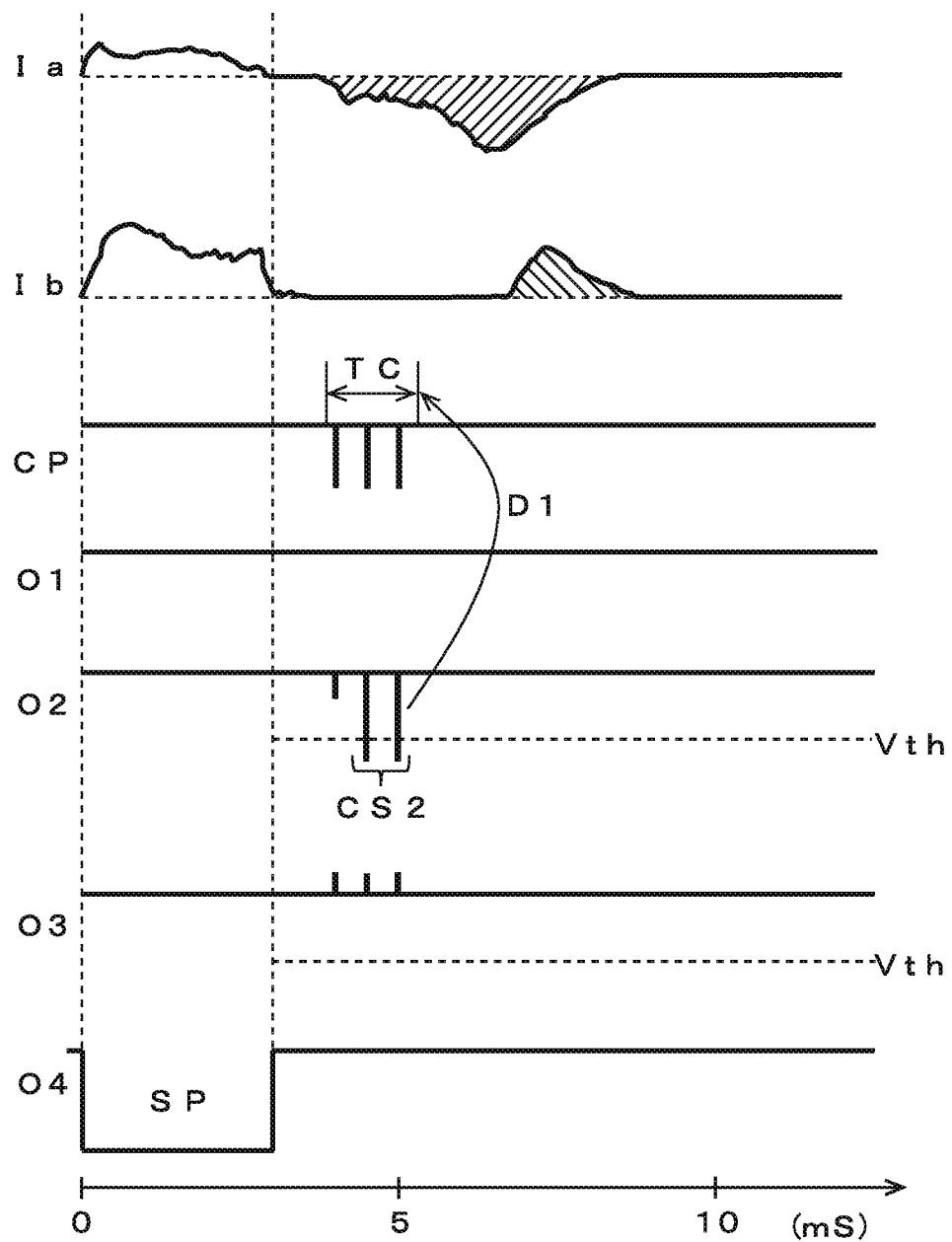
FIG. 16 is a timing chart for illustrating a detection operation performed during rotation by the drive circuit for a two-coil stepper motor according to the second embodiment of the present invention.

[Description of Detection Operation at Time when Rotor is Rotated in Second Embodiment: FIG. 16]

Next, with reference to the timing chart of FIG. 16, description is given of generation of the counter-electromotive currents and the rotation detection operation at the time when the rotor 51 of the stepper motor 50 is rotated due to the output of the drive pulse SP in Step S10 illustrated in FIG. 15. As a condition of the description, there is assumed a case in which the coil B is the drive coil, and the drive pulse SP is output from the coil terminal O4. Further, the timing charts of FIG. 16 and FIG. 17 to be referred to later represent the counter-electromotive current Ia generated in the coil A, the counter-electromotive current Ib generated in the coil B, the detection pulse CP, and the drive waveforms O1, O2, O3, and O4. The rotational angle RT of the rotor 51 is similar to that of the first embodiment (see FIG. 9 and FIG. 10), and hence illustration thereof is omitted.

In FIG. 16, when the rotor 51 is rotated due to the output of the drive pulse SP, the counter-electromotive current Ia is generated from the coil A, and the counter-electromotive current Ib is generated from the coil B (drive coil). In this case, as described above, the stepper motor 50 has a slit angle of 75°, and there is a large difference $\Delta E$ between the peak values of the counter-electromotive voltages E generated in the coil A and the coil B (see FIG. 3(b)). Therefore, each of the counter-electromotive currents Ia and Ib is generated with a large difference with respect to the time axis.

That is, as illustrated in FIG. 16, after the drive pulse SP is output, first, the counter-electromotive current Ia of the coil A is generated for a long period in the negative direction (as shown by hatching), and thereafter the counter-electromotive current Ib of the coil B (drive coil) is generated for a relatively short period in the positive direction (as shown by hatching).

During the rotation detection period TC, the driver circuit 20 samples the counter-electromotive currents Ia and Ib based on the detection pulse CP to output the result as the detection signal CS. The rotation detection circuit 30 receives the detection signal CS as input to detect the presence/absence of the detection signal CS exceeding the predetermined threshold value Vth, to thereby determine the success/failure of the rotation of the rotor 51.

In this case, the first detection signal CS1 generated due to the first detection pulse CP1 output to the coil B being the drive coil appears in the drive waveform O3 (coil terminal O3), and the second detection signal CS2 generated due to the second detection pulse CP2 output to the coil A not being the drive coil appears in the drive waveform O2 (coil terminal O2).

Then, as described above, after the drive pulse SP is ended, the counter-electromotive current Ia of the coil A is generated at an earlier timing, and hence the second detection signal CS2 generated due to the second detection pulse CP2 output to the coil A not being the drive coil is detected as exceeding the threshold value Vth of the rotation detection circuit 30.

When a predetermined number of second detection signals CS2 (in FIG. 16, as an example, two second detection signals CS2) are detected, the determination Y is made in Step S12 of the operation flow illustrated in FIG. 15, and further the determination N is made in Step S13 so that it is determined that the rotor 51 is rotated. Thus, in Step S14, the rotation detection period TC is ended and the detection pulse CP is stopped. In FIG. 16, an arrow D1 represents that the rotation detection period TC is ended at a time point at which two second detection signals CS2 exceed the threshold value Vth.

As described above, in the second embodiment, when the second detection signal CS2 generated from the coil on the side not being the drive coil side is detected earlier than the first detection signal CS1 generated from the drive coil side, it is immediately determined that the rotor 51 is rotated, and hence the rotation detection can be determined at high speed.

Figure 17:
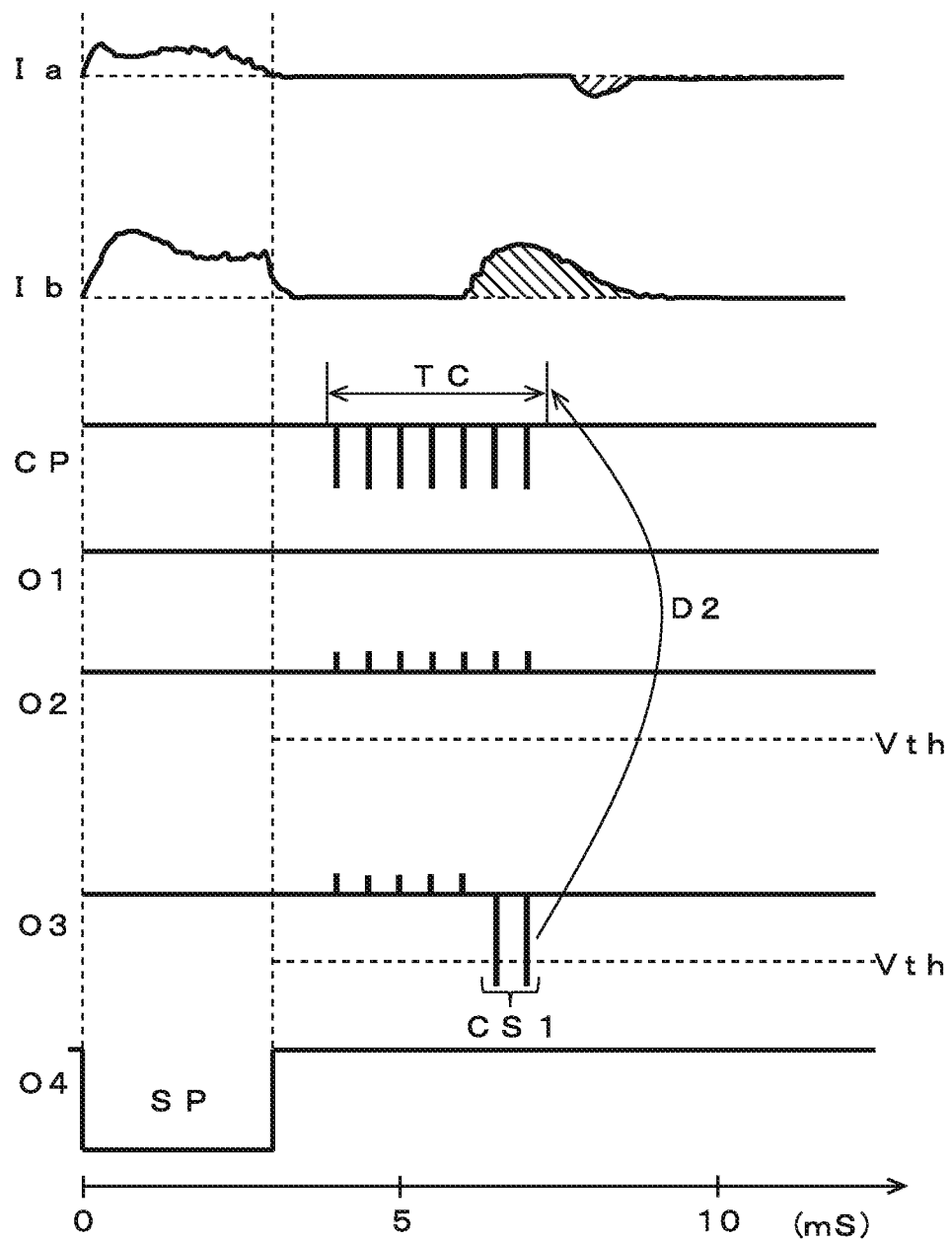
FIG. 17 is a timing chart for illustrating a detection operation performed during non-rotation by the drive circuit for a two-coil stepper motor according to the second embodiment of the present invention.

[Description of Rotation Detection Operation at Time when Rotor is not Rotated in Second Embodiment: FIG. 17]

Next, with reference to the timing chart of FIG. 17, description is given of generation of the counter-electromotive currents and the rotation detection operation at the time when the rotor 51 of the stepper motor 50 is not rotated for the reason of load variation or the like due to the output of the drive pulse SP in Step S1 illustrated in FIG. 15. As a condition of the description, there is assumed a case in which the coil B is the drive coil, and the drive pulse SP is output from the coil terminal O4.

In FIG. 17, when the rotor 51 is intended to be rotated due to the output of the drive pulse SP but the rotor 51 is not rotated due to load variation or the like, the generation timings and magnitudes of the counter-electromotive currents Ia and Ib generated in the coil A and the coil B greatly differ from those obtained when the rotor 51 is rotated. That is, after the drive pulse SP is output, first, the counter-electromotive current Ib of the coil B is generated for a relatively long period in the positive direction (as shown by hatching), and thereafter the counter-electromotive current Ia of the coil A is generated for only a short period in the negative direction (as shown by hatching).

Meanwhile, the operations of the driver circuit 20 and the rotation detection circuit 30 during the rotation detection period TC are similar to the operations obtained when the rotor 51 is rotated as described above (see FIG. 16). Further, the drive waveforms in which the first detection signal CS1 and the second detection signal CS2 appear are similar to those in FIG. 16.

Then, as described above, after the drive pulse SP is ended, the counter-electromotive current Ib of the coil B is generated at an earlier timing, and hence the first detection signal CS1 generated in the coil B being the drive coil is detected as exceeding Vth of the rotation detection circuit 30. When a predetermined number of first detection signals CS1 (in FIG. 17, as an example, two first detection signals CS1) are detected, the determination Y is made in Step S12 of the operation flow illustrated in FIG. 15, and further the determination Y is made in Step S13 so that it is determined that the rotor 51 is not rotated. Thus, in Step S16, the rotation detection period is ended.

Still further, although not shown in FIG. 17, the correction pulse FP is output in Step S17 so that the rotor 51 is rotated due to a large drive force of the correction pulse FP. Thus, the hands can be prevented from getting out of order. In FIG. 17, an arrow D2 represents that the rotation detection period TC is ended at a time point at which two first detection signals CS1 exceed the threshold value Vth.

As described above, in the second embodiment, when the first detection signal CS1 generated from the drive coil side is detected earlier than the second detection signal CS2 generated from the coil on the side not being the drive coil side, it is immediately determined that the rotor 51 is not rotated, and the correction pulse FP is output. Therefore, rotation detection can be determined at high speed. The predetermined number of detection signals CS is not limited, and the rotation/non-rotation may be determined with detection of one detection signal CS. Further, the predetermined number may be further increased in consideration of influence of noise or the like.

As described above, according to the second embodiment, the first detection signal CS1 generated from the drive coil and the second detection signal CS2 generated from the other coil are compared so that the rotation/non-rotation of the rotor 51 is determined depending on which of the detection signals is detected earlier. With this, the success/failure of the rotation of the rotor is determined based on a temporal speed at which the detection signal arrives from each of the two coils. Thus, the success/failure of the rotation of the rotor can be determined with a short period of time. As a result, it is possible to provide the drive circuit for a two-coil stepper motor capable of achieving rotation detection supporting the high-speed drive of the stepper motor, and the electronic watch using the drive circuit.

Further, the second embodiment and the above-mentioned first embodiment may be combined. That is, the timing at which the detection signal CS can be detected is held in the rotation detection circuit 30 (second embodiment), and the detection is continued and the total detection number is counted (first embodiment). Thus, the determination accuracy of the success/failure of the rotation is improved. When this combination method is employed and the determination results of the second embodiment and the first embodiment differ from each other, non-rotation determination may be made.

Third Embodiment

[Description of Slit Angle of Stepper Motor of Third Embodiment: FIG. 2]

Next, with reference to FIG. 2, description is given of the slit angle of the stepper motor of the third embodiment. The third embodiment has a feature in a stepper motor in which a slit angle range of the stepper motor is optimally selected so that the waveforms of the counter-electromotive currents generated from the two coils greatly differ depending on the success/failure of the rotation of the rotor, in order to increase the detection accuracy of rotation of the stepper motor.

In FIG. 2, as described above, in the stepper motor 50, the flow of the magnetic fluxes formed between the stator 52 and the rotor 51 is changed depending on the difference in slit angle, and there is a difference between the waveforms of the counter-electromotive currents generated in the coil A and the coil B depending on whether or not the rotor 51 is rotated due to the drive pulse SP.

In this case, the stepper motor 50 illustrated in FIG. 2 is a stepper motor including the stator 52 having a slit angle of 75°, which causes a large difference between the waveforms of the counter-electromotive currents. When this stepper motor 50 is used to detect the counter-electromotive currents generated from the coil A and the coil B, as described in the first and second embodiments, it is possible to provide the drive circuit for a two-coil stepper motor capable of achieving rotation detection with high accuracy and the electronic watch using the drive circuit.

[Description of Stepper Motors Having Different Slit Angles: FIGS. 18]

Next, with reference to FIG. 18, description is given of configurations of stepper motors having different slit angles. FIG. 18(a) is an example of a stepper motor 60 having a slit angle of 20°. The stepper motor 60 is a two-coil stepper motor that has the same basic configuration as that of the stepper motor 50 (see FIG. 2) described above, but differs in the structure of a stator 62.

That is, a slit 64a (indicated by a small dotted-line circle) for magnetically separating a first magnetic-pole portion 62a and a third magnetic-pole portion 62c from each other and a slit 64b (indicated by a small dotted-line circle) for magnetically separating a second magnetic-pole portion 62b and the third magnetic-pole portion 62c from each other have a slit angle of 20°, which is formed between a line connecting a center of a rotor 61 to each of the slits 64a and 64b and a center line of the third magnetic-pole portion 62c, which passes through the center of the rotor 61. Thus, the stepper motor 60 is an example of a stepper motor having a small slit angle.

Next, FIG. 18(b) is an example of a stepper motor 70 having a slit angle of 120°. The stepper motor 70 is a two-coil stepper motor that has the same basic configuration as that of the stepper motor 50 (see FIG. 2) described above, but differs in the structure of a stator 72.

That is, a slit 74a (indicated by a small dotted-line circle) for magnetically separating a first magnetic-pole portion 72a and a third magnetic-pole portion 72c from each other and a slit 74b (indicated by a small dotted-line circle) for magnetically separating a second magnetic-pole portion 72b and the third magnetic-pole portion 72c from each other have a slit angle of 120°, which is formed between a line connecting a center of a rotor 71 to each of the slits 74a and 74b and a center line of the third magnetic-pole portion 72c, which passes through the center of the rotor 71. Thus, the stepper motor 70 is an example of a stepper motor having a large slit angle.

A stator having a slit angle of 90° or more is difficult to form, and hence, in the stepper motor 70, notches 73a and 73b and the slits 74a and 74b are formed at the same angle positions. Further, in the stepper motors 60 and 70, the widths of notches 63a and 63b and the widths of the notches 73a and 73b are changed so that the rotors 61 and 71 have the same holding torque as that in the stepper motor 50 having a slit angle of 75° (see FIG. 2). The widths are changed so that the magnitude of the counter-electromotive current described later is prevented from being changed due to the difference in holding torque.

Figure 19:
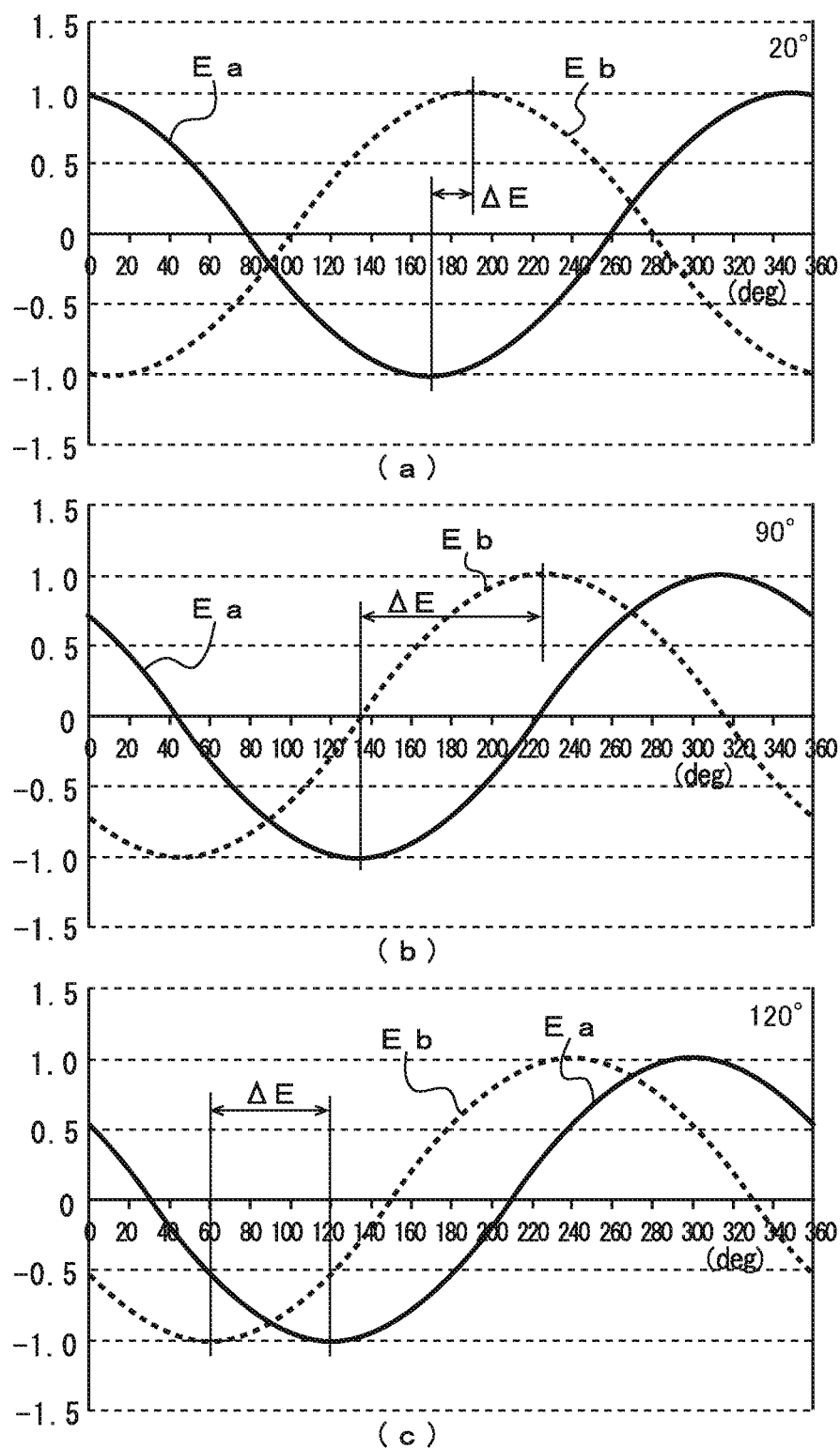
FIG. 19 are graphs for showing change in counter-electromotive voltages with respect to a rotational angle of a rotor when the slit angles are 20°, 90°, and 120° in the two-coil stepper motor according to the third embodiment of the present invention.

[Description of Change in Counter-Electromotive Voltages of Stepper Motors Having Different Slit Angles: FIGS. 19]

Next, with reference to FIG. 19, description is given of the change in counter-electromotive voltages Ea and Eb generated in the coil A and the coil B due to the rotation of the rotor in each of the stepper motors having slit angles of 20°, 90°, and 120°. The stepper motors having slit angles of 20° and 120° are the stepper motors 60 and 70 illustrated in FIG. 18, respectively. Although the stepper motor having a slit angle of 90° is not shown, its slit position is located in substantially the middle of an interval between that of the stepper motor 50 illustrated in FIG. 2 and that of the stepper motor 70 illustrated in FIG. 18(b).

Further, similarly to FIG. 3(b) referred to above, in FIG. 19(a) to FIG. 19(c), the lateral axis represents the rotational angle ranging from 0° to 360° of the rotor rotated in the forward rotation direction (counterclockwise direction), and the vertical axis represents the counter-electromotive voltages E. Peaks of the counter-electromotive voltages E are shown to range from +1.0 to −1.0. Further, the counter-electromotive voltage Ea is generated from the coil A, and the counter-electromotive voltage Eb is generated from the coil B. Further, as described above, the difference ΔE between the peak values of the counter-electromotive voltages Ea and Eb is important for rotation detection of the rotor.

FIG. 19(a) is a graph for showing the change in counter-electromotive voltages E of the stepper motor 60 having a slit angle of 20°. In FIG. 19(a), the difference between the counter-electromotive voltages, that is, the difference ΔE between the peak values, is (peak of counter-electromotive voltage Eb (about 190°))−(valley of counter-electromotive voltage Ea (about 170°))=(about 20°). It can be understood that this difference ΔE between the peak values is significantly smaller than about 80° of the stepper motor 50 having a slit angle of 75° described above.

FIG. 19(b) is a graph for showing the change in counter-electromotive voltages E of the stepper motor having a slit angle of 90°. In FIG. 19(b), the difference ΔE between the peak values is (peak of counter-electromotive voltage Eb (about 225°))−(valley of counter-electromotive voltage Ea (about 135°))=(about 90°). This difference ΔE between the peak values is, although slightly, even larger than about 80° of the stepper motor 50 having a slit angle of 75° described above.

FIG. 19(c) is a graph for showing the change in counter-electromotive voltages E of the stepper motor 70 having a slit angle of 120°. In FIG. 19(c), the difference ΔE between the peak values is (valley of counter-electromotive voltage Ea (about 120°))−(valley of counter-electromotive voltage Eb (about 60°))=(about 60°). This difference GE between the peak values is smaller than about 80° of the stepper motor 50 having a slit angle of 75° described above.

As described above, depending on the difference in slit angle of the stepper motor, there is a difference between the waveforms of the counter-electromotive voltages Ea and Eb generated from the coil A and the coil B due to the rotation of the rotor, and the difference GE between the peak values appears as the difference between the waveforms of the counter-electromotive currents Ia and Ib. Thus, with use of a stepper motor having an optimal slit angle, the success/failure of the rotation of the rotor can be determined with high accuracy.

In this case, the difference ΔE between the peak values of the stepper motor having a slit angle of 90° is about 90°, which is the largest among those of the stepper motors having other slit angles. Therefore, it can be said that the stepper motor having a slit angle of 90° is a stepper motor that has the largest difference between the waveforms of the counter-electromotive currents and is suitable for rotation detection.

In actuality, however, the counter-electromotive currents Ia and Ib are affected by the drive force due to the drive pulse SP, the holding torque of the rotor, load variation with respect to the rotation, time for the slit part to reach magnetic flux saturation, and the like. Therefore, there is a difference between the waveforms of the counter-electromotive voltages Ea and Eb shown in FIG. 19 and the actual waveforms of the counter-electromotive currents Ia and Ib. The waveforms of the counter-electromotive currents Ia and Ib change due to various factors, and hence there is some margin in a slit angle optimal for rotation detection.

[Description of Rotation Detection Operations of Stepper Motors Having Different Slit Angles: FIG. 20 to FIG. 23]

Next, with reference to the timing charts of FIG. 20 to FIG. 23, description is given of the rotation detection operations of the stepper motors having different slit angles. As a condition for the description, there is assumed a case in which the coil B is the drive coil and the drive pulse SP is output from the coil terminal O4. Further, FIG. 20 to FIG. 23 are timing charts for illustrating the counter-electromotive current Ia generated in the coil A, the counter-electromotive current Ib generated in the coil B, the detection pulse CP, and the drive waveforms O1, O2, O3, and O4. Further, it is assumed that the rotation detection operation is executed based on the algorithm of the first embodiment (determination based on the total detection number).

Figure 20:
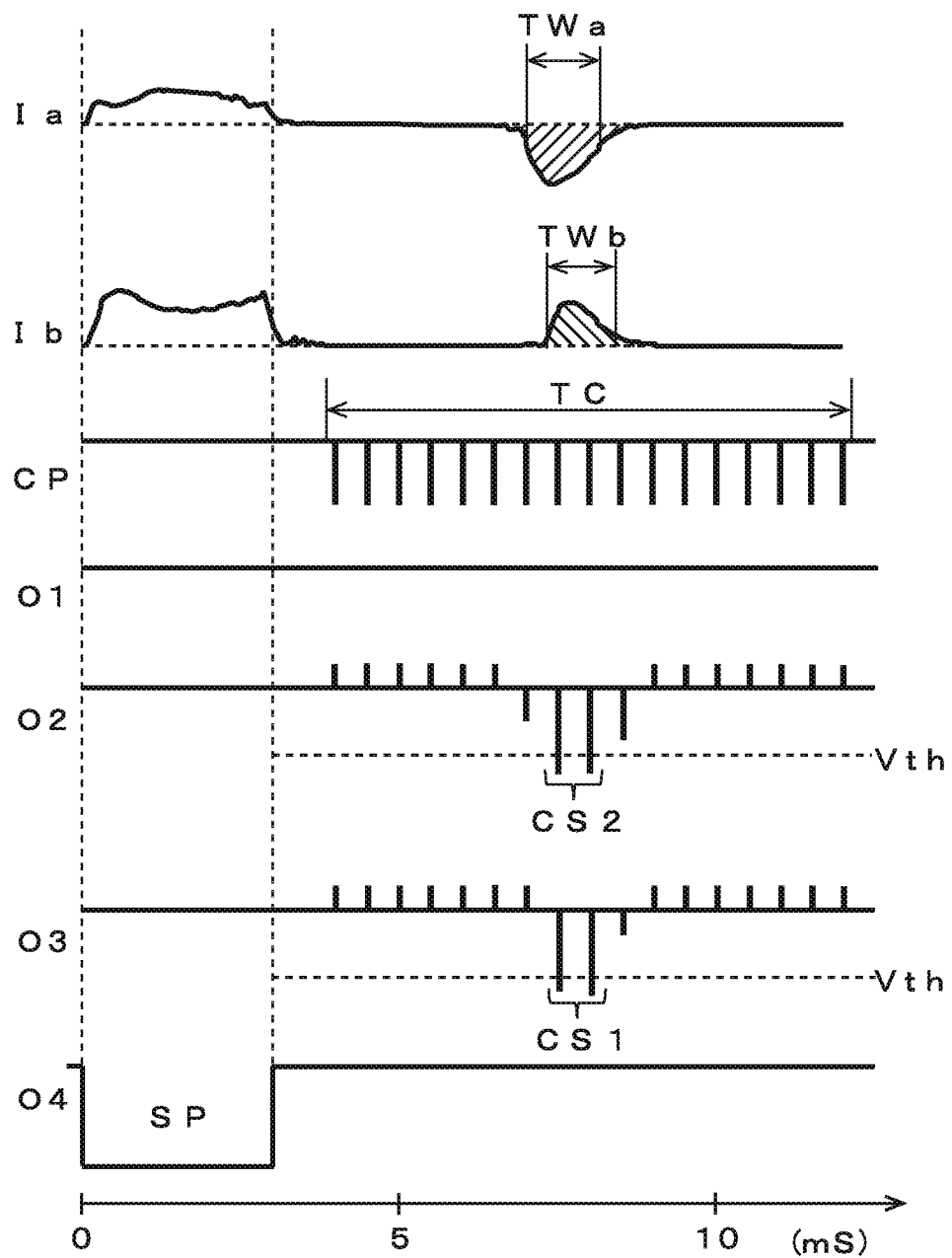
FIG. 20 is a timing chart for illustrating a detection operation performed during rotation by the two-coil stepper motor having a slit angle of 20° according to the third embodiment of the present invention.

First, with reference to FIG. 20, description is given of generation of the counter-electromotive currents and the rotation detection operation at a time when the drive pulse SP is supplied to the stepper motor 60 having a slit angle of 20° (see FIG. 18(a)) and the rotor 61 of the stepper motor 60 is rotated.

In FIG. 20, when the rotor 61 is rotated in the forward rotation direction due to the output of the drive pulse SP, the counter-electromotive current Ia is generated from the coil A, and the counter-electromotive current Ib is generated from the coil B (drive coil). In this case, the stepper motor 60 has a slit angle of 20°, and the counter-electromotive voltages Ea and Eb generated in the coil A and the coil B have a significantly small difference GE between the peak values as described above (see FIG. 19(a)). Thus, it can be understood that the counter-electromotive currents Ia and Ib are generated at very close timings and the waveform lengths TWa and TWb are also similar.

That is, as illustrated in FIG. 20, after the drive pulse SP is output, the counter-electromotive current Ia of the coil A is generated in the negative direction (as shown by hatching). Further, the counter-electromotive current Ib of the coil B (drive coil) is generated in the positive direction at a close timing and with a similar waveform length to those of the counter-electromotive current Ia (as shown by hatching).

During the rotation detection period TC, the detection pulse CP is output at a predetermined cycle so that the counter-electromotive currents Ia and Ib are sampled. The rotation detection circuit 30 counts the detection signal CS exceeding the predetermined threshold value Vth.

In this case, the first detection signal CS1 generated in the coil B being the drive coil appears in the drive waveform O3 (coil terminal O3). Further, the second detection signal CS2 generated in the coil A not being the drive coil appears in the drive waveform O2 (coil terminal O2).

Further, the counter-electromotive current Ia of the coil A and the counter-electromotive current Ib of the coil B (drive coil) are, as described above, generated at close timings, and the waveform lengths TWa and TWb are similar. Therefore, the total detection numbers of first detection signals CS1 and second detection signals CS2 exceeding Vth of the rotation detection circuit 30 are similar numbers. The total detection numbers are both two in the example of FIG. 20.

In this case, when the success/failure of the rotation is determined based on the algorithm of the first embodiment (see FIG. 8), the total detection number of first detection signals CS1 and the total detection number of second detection signals CS2 are the same, and hence the determination Y is made in Step S5, and it is determined that the rotor 61 is not rotated even though the rotor 61 is rotated. Further, the difference between the waveform lengths TWa and TWb is small, and hence the determination on rotation detection cannot be reliably made because the determination varies even with a slight change in counter-electromotive currents Ia and Ib.

Figure 21:
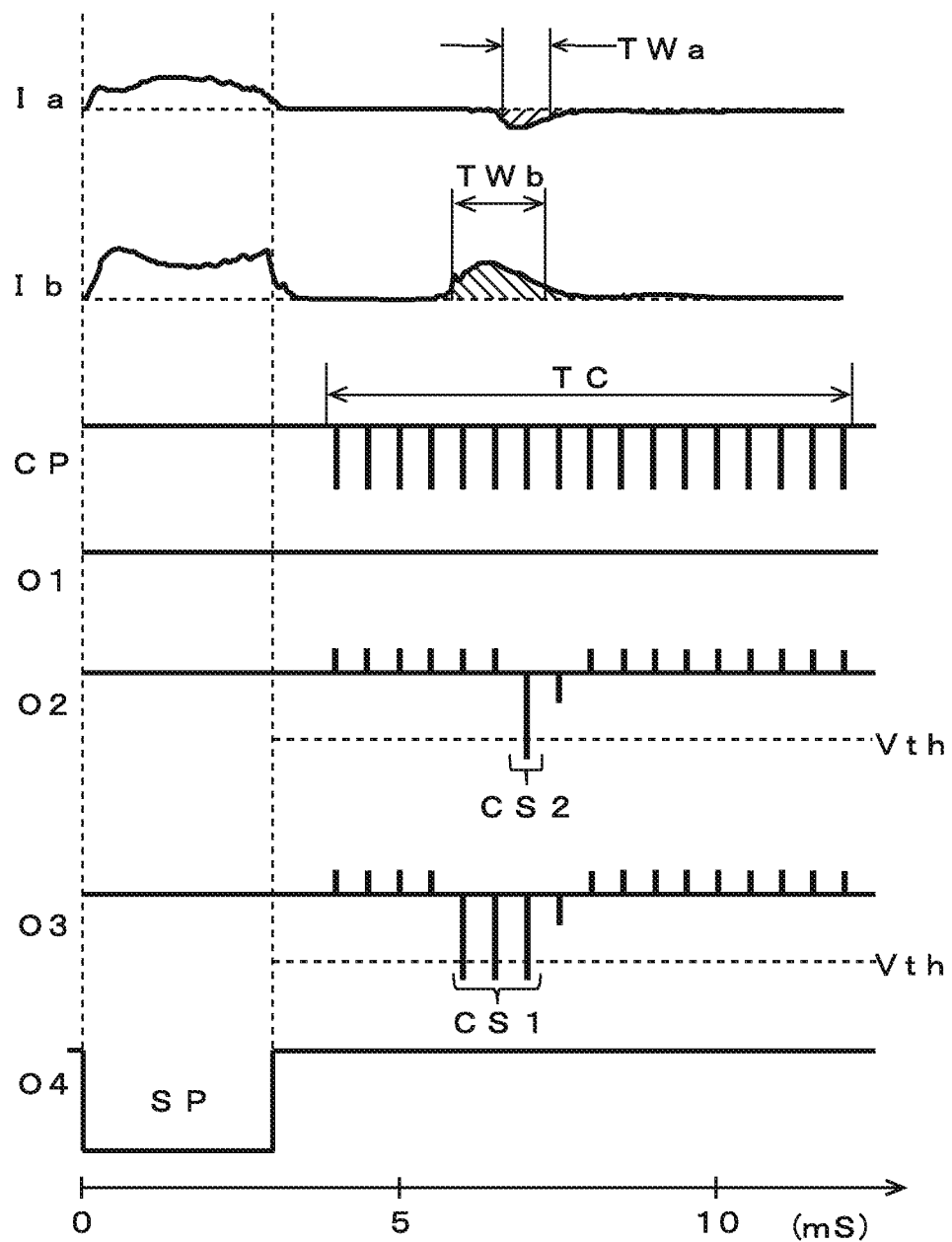
FIG. 21 is a timing chart for illustrating a detection operation performed during non-rotation by the two-coil stepper motor having a slit angle of 20° according to the third embodiment of the present invention.

Next, with reference to FIG. 21, description is given of generation of the counter-electromotive currents and the rotation detection operation at a time when the drive pulse SP is supplied to the stepper motor 60 having a slit angle of 20° (see FIG. 18(a)) but the rotor 61 of the stepper motor 60 is not rotated due to load variation or the like.

In FIG. 21, when the rotor 61 is driven in the forward rotation direction due to the output of the drive pulse SP but is not rotated, the counter-electromotive current Ia is generated from the coil A, and the counter-electromotive current Ib is generated from the coil B (drive coil). In this case, the stepper motor 60 has a slit angle of 20°, and the difference DE between the peak values of the counter-electromotive voltages Ea and Eb generated in the coil A and the coil B is very small as described above. Therefore, it can be understood that the counter-electromotive currents Ia and Ib are generated at close timings and there is not much difference between the waveform lengths TWa and TWb.

That is, as illustrated in FIG. 21, after the drive pulse SP is output, the counter-electromotive current Ib of the coil B (drive coil) is generated in the positive direction (as shown by hatching), and after a moment, the counter-electromotive current Ia of the coil A is generated in the negative direction (as shown by hatching).

During the rotation detection period TC, the detection pulse CP is output at a predetermined cycle so that the counter-electromotive currents Ia and Ib are sampled. The rotation detection circuit 30 counts the detection signal CS exceeding the predetermined threshold value Vth.

In this case, similarly to FIG. 20, the first detection signal CS1 appears in the drive waveform O3 (coil terminal O3). Further, the second detection signal CS2 appears in the drive waveform O2 (coil terminal O2).

Further, the counter-electromotive current Ia of the coil A and the counter-electromotive current Ib of the coil B (drive coil) are, as described above, generated at relatively close timings, and there is not much difference between the waveform lengths TWa and TWb. Therefore, there is not much difference between the total detection numbers of first detection signals CS1 and second detection signals CS2 exceeding Vth of the rotation detection circuit 30. In the example of FIG. 21, three first detection signals CS1 and one second detection signal CS2 are detected.

In this case, when the success/failure of the rotation is determined based on the algorithm of the first embodiment described above (see FIG. 8), the total detection number of first detection signals CS1 on the drive coil side is larger, and hence the determination Y is made in Step S5. Thus, the determination of non-rotation is correctly made. However, the difference between the waveform lengths TWa and TWb is not so large, and hence the determination on rotation detection varies even with a slight change in counter-electromotive currents. Thus, it can be said that the determination accuracy of the rotation detection is low.

As described above, the stepper motor 60 having a slit angle of 20° has a small difference between the waveforms of the counter-electromotive currents Ia and Ib generated in the coil A and the coil B, and hence it can be understood that it is difficult to determine the success/failure of the rotation detection of the rotor with high accuracy.

Further, even when the success/failure of the rotation is determined based on the algorithm of the second embodiment described above (see FIG. 15), the counter-electromotive currents Ia and Ib are generated in the coil A and the coil B at close timings and the generation periods thereof overlap each other. Therefore, it is difficult to determine which of the detection signals CS of the coil A and the coil B is generated earlier, and thus it is difficult to determine the success/failure of the rotation detection of the rotor with high accuracy even with the algorithm of the second embodiment.

Figure 22:
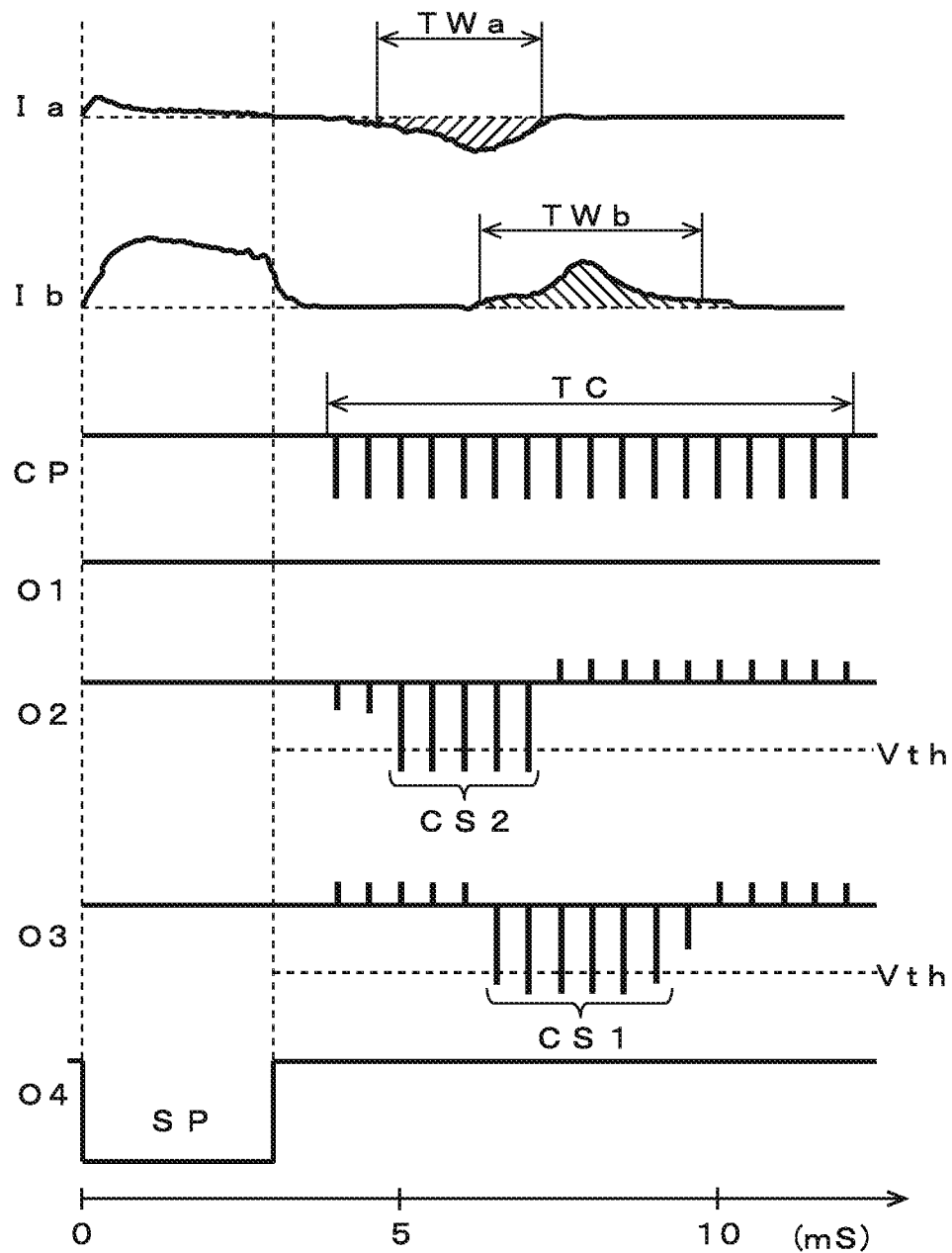
FIG. 22 is a timing chart for illustrating a detection operation performed during rotation by the two-coil stepper motor having a slit angle of 120° according to the third embodiment of the present invention.

Next, with reference to FIG. 22, description is given of generation of the counter-electromotive currents and the rotation detection operation at a time when the drive pulse SP is supplied to the stepper motor 70 having a slit angle of 120° (see FIG. 18(b)) and the rotor 71 of the stepper motor 70 is rotated.

In FIG. 22, when the rotor 71 is rotated in the forward rotation direction due to the output of the drive pulse SP, the counter-electromotive current Ia is generated from the coil A, and the counter-electromotive current Ib is generated from the coil B (drive coil). In this case, the stepper motor 70 has a slit angle of 120°, and the difference ΔE between the peak values of the counter-electromotive voltages E generated in the coil A and the coil B is not so large (see FIG. 19(c)). Therefore, it can be understood that the counter-electromotive currents Ia and Ib are generated at timings separated from each other to some extent, but the timings are not separated as much as those in the stepper motor 50 having a slit angle of 75° (see FIG. 9). It can be further understood that the waveform lengths TWa and TWb are similar.

That is, as illustrated in FIG. 22, after the drive pulse SP is output, the counter-electromotive current Ia of the coil A is generated in the negative direction (as shown by hatching). Further, the counter-electromotive current Ib of the coil B (drive coil) is generated in the positive direction at a timing separated from that of the counter-electromotive current Ia to some extent and with a similar waveform length to that of the counter-electromotive current Ia (as shown by hatching).

During the rotation detection period TC, the detection pulse CP is output at a predetermined cycle so that the counter-electromotive currents Ia and Ib are sampled. The rotation detection circuit 30 counts the detection signal CS exceeding the predetermined threshold value Vth.

In this case, similarly to FIG. 20 referred to above, the first detection signal CS1 appears in the drive waveform O3 (coil terminal O3). Further, the second detection signal CS2 appears in the drive waveform O2 (coil terminal O2).

Further, as described above, the counter-electromotive current Ia of the coil A and the counter-electromotive current Ib of the coil B (drive coil) are generated at timings separated from each other to some extent, but the waveform lengths are similar. Therefore, the total detection numbers of first detection signals CS1 and second detection signals CS2 exceeding Vth of the rotation detection circuit 30 are similar numbers. In the example of FIG. 22, six first detection signals CS1 and five second detection signals CS2 are detected.

In this case, when the success/failure of the rotation is determined based on the algorithm of the first embodiment described above (see FIG. 8), the total detection number of first detection signals CS1 is larger, and hence the determination Y is made in Step S5, and it is determined that the rotor 71 is not rotated even though the rotor 71 is rotated. Therefore, the determination on rotation detection cannot be reliably made.

Figure 23:
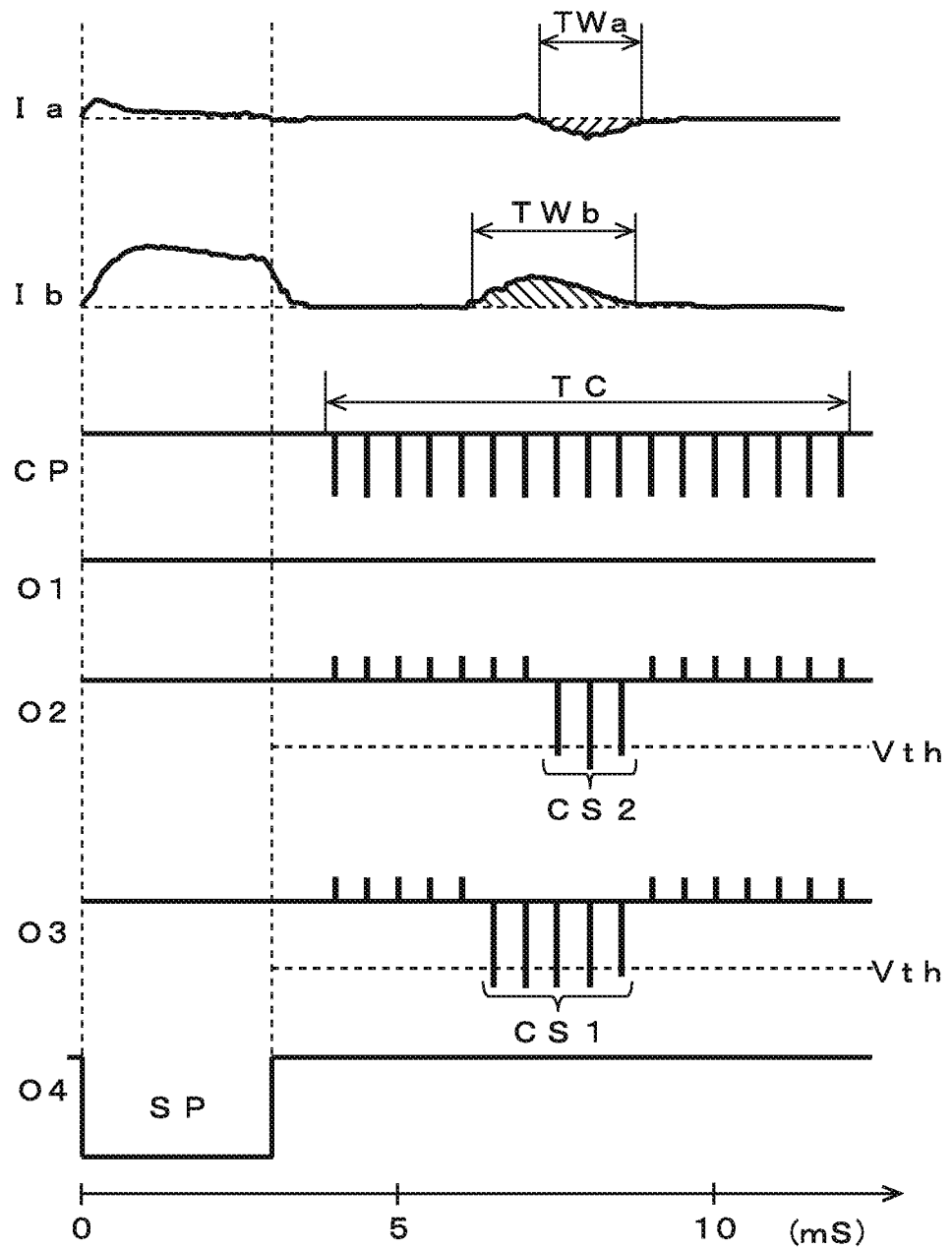
FIG. 23 is a timing chart for illustrating a detection operation performed during non-rotation by the two-coil stepper motor having a slit angle of 120° according to the third embodiment of the present invention.

Next, with reference to FIG. 23, description is given of generation of the counter-electromotive currents and the rotation detection operation at a time when the drive pulse SP is supplied to the stepper motor 70 having a slit angle of 120° (see FIG. 18(b)) but the rotor 71 of the stepper motor 70 is not rotated due to load variation or the like.

In FIG. 23, when the rotor 71 is driven in the forward rotation direction due to the output of the drive pulse SP but is not rotated, the counter-electromotive current Ia is generated from the coil A, and the counter-electromotive current Ib is generated from the coil B (drive coil). In this case, the stepper motor 60 has a slit angle of 120°, and the difference ΔE between the peak values of the counter-electromotive voltages Ea and Eb generated in the coil A and the coil B is not so large as described above. Therefore, it can be understood that the counter-electromotive currents Ia and Ib are generated at relatively close timings and there is not much difference between the waveform lengths TWa and TWb.

That is, as illustrated in FIG. 23, after the drive pulse SP is output, the counter-electromotive current Ib of the coil B (drive coil) is generated in the positive direction (as shown by hatching), and after a moment, the counter-electromotive current Ia of the coil A is generated in the negative direction (as shown by hatching).

During the rotation detection period TC, the detection pulse CP is output at a predetermined cycle so that the counter-electromotive currents Ia and Ib are sampled. The rotation detection circuit 30 counts the detection signal CS exceeding the predetermined threshold value Vth.

In this case, similarly to FIG. 22 referred to above, the first detection signal CS1 appears in the drive waveform O3 (coil terminal O3). Further, the second detection signal CS2 appears in the drive waveform O2 (coil terminal O2).

Further, the counter-electromotive current Ia of the coil A and the counter-electromotive current Ib of the coil B (drive coil) are, as described above, generated at relatively close timings, and there is not much difference between the waveform lengths TWa and TWb. Therefore, there is not much difference between the total detection numbers of first detection signals CS1 and second detection signals CS2 exceeding Vth of the rotation detection circuit 30. In the example of FIG. 23, five first detection signals CS1 and three second detection signals CS2 are detected.

In this case, when the success/failure of the rotation is determined based on the algorithm of the first embodiment described above, the total detection number of first detection signals CS1 on the drive coil side is larger, and hence the determination Y is made in Step S5. Thus, the determination of non-rotation is correctly made. However, the difference between the waveform lengths TWa and TWb is not so large, and hence the determination on rotation detection varies even with a slight change in counter-electromotive currents. Thus, it can be said that the determination accuracy of the rotation detection is low.

As described above, the stepper motor 70 having a slit angle of 120° also has a relatively small difference between the waveforms of the counter-electromotive currents Ia and Ib generated in the coil A and the coil B, and hence it can be understood that it is difficult to determine the success/failure of the rotation detection of the rotor with high accuracy.

Further, even when the success/failure of the rotation is determined based on the algorithm of the second embodiment described above (see FIG. 15), the counter-electromotive currents are generated in the coil A and the coil B at relatively close timings. Therefore, it is difficult to determine the success/failure of the rotation detection of the rotor with high accuracy even with the algorithm of the second embodiment.

As described above, the stepper motors 60 and 70 having slit angles of 20° and 120°, respectively, which provide a small difference ΔE between the peak values of the counter-electromotive voltages E, have a smaller difference between the waveforms of the counter-electromotive currents Ia and Ib generated in the coil A and the coil B as compared to the stepper motor 50 having a slit angle of 75° described above. Therefore, it is difficult for the stepper motors 60 and 70 to determine the success/failure of the rotation detection of the rotor with high accuracy. It can be said that a stepper motor having a slit angle of 75° or a slit angle close to 75° can have a large difference between the waveforms of the counter-electromotive currents Ia and Ib and thus can determine the success/failure of the rotation detection of the rotor with high accuracy.

[Description of Optimal Slit Angle of Stepper Motor: FIGS. 24]

Next, with reference to FIG. 24, description is given of the optimal slit angle range of the stepper motor for determining the success/failure of the rotation of the rotor with high accuracy. In this case, as a condition of the description of FIG. 24, counter-electromotive currents having an absolute value of 0.15 mA or less are ignored as an example in order to define the waveform lengths TWa and TWb of the counter-electromotive currents Ia and Ib, respectively.

That is, in the counter-electromotive current Ia, a time period from the rising to the falling of the convex portion that exceeds 0.15 mA in absolute value is defined as the waveform length TWa. In the counter-electromotive current Ib, similarly, a time period from the rising to the falling of the convex portion that exceeds 0.15 mA in absolute value is defined as the waveform length TWb. The reason why the counter-electromotive currents of 0.15 mA or less are ignored as an example is for eliminating the influence of noise or the like superimposed on the counter-electromotive currents.

FIG. 24(a) is a graph obtained by acquiring and plotting, for each predetermined slit angle of the stepper motor, the waveform length TWa, the waveform length TWb, and a waveform length difference TW1 (TWa−TWb) therebetween at the time when the rotor of the stepper motor is rotated due to the output of the drive pulse SP. The lateral axis represents the slit angle, and the vertical axis represents the waveform length (mS).

The slit angles are plotted as 20°, 30°, 45°, 60°, 75°, 90°, 100°, and 120°. In this case, as is clear from FIG. 24(a), the waveform length difference TW1 (indicated by "A") between the waveform length TWa and the waveform length TWb at the time when the rotor is rotated tends to be short when the slit angle is about 50° or less and about 100° or more.

Further, FIG. 24(b) is a graph obtained by acquiring and plotting, for each predetermined slit angle of the stepper motor, the waveform length TWa, the waveform length TWb, and a waveform length difference TW2 (TWa−TWb) therebetween at the time when the drive pulse SP is output but the rotor of the stepper motor is not rotated due to load variation or the like. The slit angles are the same as those in FIG. 24(a). In this case, as is clear from FIG. 24(b), the waveform length difference TW2 (indicated by "▲") between the waveform length TWa and the waveform length TWb at the time when the rotor is not rotated tends to be short in absolute value when the slit angle is about 50° or less and about 100° or more.

The reason why the waveform length TWa is 0.0 mS in all of the slit angles is because the counter-electromotive currents of 0.15 mA or less in absolute value are ignored, and hence the counter-electromotive current Ia has no waveform length TWa.

Next, FIG. 24(c) is a graph obtained by calculating and plotting, for each slit angle of the stepper motor, a waveform length difference TW12, which is a difference between the waveform length difference TW1 plotted in FIG. 24(a) and the waveform length difference TW2 plotted in FIG. 24(b), that is, a difference between the waveform length difference TW1 at the time when the rotor is rotated and the waveform length difference TW2 at the time when the rotor is not rotated. The waveform length difference TW2 has a minus sign as shown in FIG. 24(b), and hence the difference between the waveform length difference TW1 and the waveform length difference TW2 is obtained by adding the absolute values thereof.

From FIG. 24(c), it can be understood that a point at which the largest waveform length difference TW12 is obtained is in the vicinity of the slit angle of 75°, and the waveform length difference TW12 abruptly decreases when the slit angle is about 50° or less and about 100° or more.

It can be assumed from the graphs of the counter-electromotive voltages Ea and Eb (FIG. 3 and FIG. 19) referred to above that the stepper motor having a slit angle of 90° has the largest difference between the waveforms of the counter-electromotive currents, but the counter-electromotive currents Ia and Ib are affected by various factors as described above. Therefore, it can be understood from FIG. 24(c) that the stepper motor having a slit angle in the vicinity of 75° actually has the largest difference between the waveforms of the counter-electromotive currents Ia and Ib (that is, the largest waveform length difference TW12).

In this case, as is clear from FIG. 9 referred to above, for example, the waveform length TWa and the waveform length TWb of the counter-electromotive currents are values corresponding to the total detection numbers of detection signals CS. That is, in FIG. 9, the total detection number of second detection signals CS2 in the counter-electromotive current Ia having the long waveform length TWa is 8, and the total detection number of first detection signals CS1 in the counter-electromotive current Ib having the short waveform length TWb is 3. In view of this, it can be said that the waveform length differences TW1 and TW2, which are each a difference between the waveform length TWa and the waveform length TWb, are values corresponding to the easiness (detection accuracy) of the rotation detection of the rotor, and the waveform length difference TW12 is a factor for clarifying the rotation/non-rotation of the rotor.

Therefore, a large waveform length difference TW12 means a large difference between the waveforms of the counter-electromotive currents Ia and Ib at the time when the rotor is rotated and also a large difference between the waveforms of the counter-electromotive currents Ia and Ib at the time when the rotor is not rotated. Therefore, as the waveform length difference TW12 is increased, the success/failure of the rotation of the rotor can be detected and determined more clearly.

From the above description, as is clear from FIG. 24(c), the stepper motor is configured to have a slit angle in a range of 50° or more and 100° or less, which is centered on a slit angle in the vicinity of 75° at which the largest waveform length difference TW12 is obtained. In this manner, it is possible to obtain the stepper motor capable of determining the success/failure of the rotation of the rotor with high accuracy. The stepper motor having a slit angle in a range of 50° or more and 100° or less, which is centered on a slit angle in the vicinity of 75°, is the stepper motor of the third embodiment.

As described above, the stepper motor of the third embodiment has a large difference (waveform length difference TW1) between the waveforms of the counter-electromotive currents Ia and Ib at the time when the rotor is rotated and also a large difference (waveform length difference TW2) between the waveforms of the counter-electromotive currents Ia and Ib at the time when the rotor is not rotated. Therefore, it is possible to provide the stepper motor capable of determining the success/failure of the rotation of the rotor with high accuracy by detecting the counter-electromotive currents Ia and Ib. As a result, with use of the drive circuit for a two-coil stepper motor according to the first or second embodiment and the stepper motor of the third embodiment, it is possible to provide the high-performance electronic watch achieving rotation detection of the rotor with high accuracy, low power consumption responding to load variation, less false rotation, and excellent reliability in time indication by the hands.

Fourth Embodiment

[Description of Flow of Rotation Detection of Fourth Embodiment: FIG. 25]

Next, with reference to the flow chart of FIG. 25, the flow of the rotation detection of the fourth embodiment is described. The fourth embodiment has a feature in that the success/failure of the rotation of the rotor 51 is determined based on the detection signal from one of the two coils, and a rank of the drive pulse SP (strength of the drive pulse) is adjusted as appropriate so that the rotor 51 is determined to be certainly rotated. The configuration of the drive circuit 10 and the stepper motor to be used are similar to those of the first embodiment (see FIG. 1, FIG. 2, and FIG. 4) as in the embodiments so far.

In this case, the rank of the drive pulse SP is indicated by a ratio of a time period in which the drive pulse SP is actually output with respect to a time period that is allocated as a period in which the drive pulse SP is output, and is indicated by 18/24, for example. This indication means that there are 18 units of time periods in which the drive pulse SP is actually output during a 24-unit time period corresponding to the period in which the drive pulse SP is output. Regarding the rank of the drive pulse SP, the rank obtained by raising 18/24 by one rank is 19/24, and the rank obtained by lowering 18/24 by one rank is 17/24. As the rank of the drive pulse SP is raised, the rotational force of the rotor 51 is increased, and the rotor 51 is likely to rotate normally, but the power consumption is also increased. Meanwhile, as the rank of the drive pulse SP is lowered, the power consumption is decreased, but the rotational force of the rotor 51 is decreased, and the rotation fails at higher possibility.

In FIG. 25, the control circuit 12 of the drive circuit 10 controls the drive pulse generation circuit 13 at the hand movement timing to output the drive pulse SP (Step S20: output SP). The drive pulse SP is input to the driver circuit 20 via the pulse selection circuit 16, and is output to the appropriate coil terminal, for example, to the coil terminal O4.

Next, the control circuit 12 causes the detection pulse generation circuit 15 to output the detection pulse CP, which is output to the driver circuit 20 via the pulse selection circuit 16. The driver circuit 20 starts the rotation detection period of detecting the counter-electromotive currents generated from the coil A and the coil B due to the input detection pulse CP (Step S21: start rotation detection). At this time, in the fourth embodiment, the detection pulse CP is output to the coil that is different from the coil to which the drive pulse SP is output. Further, the timing to output the detection pulse CP is described later.

The rotation detection circuit 30 determines the detection signal CS output from the driver circuit 20 to determine whether or not the rotor 51 of the stepper motor 50 is rotated (Step S22: stop determination is made?). This determination is made based on whether the detection result is stop determination or not. In this case, the reverse determination of the stop determination is rotation determination, which is determination representing that the rotor 51 is certainly rotated. In contrast, the stop determination is determination representing that there is a possibility that the rotation of the rotor 51 has failed. The stop determination is certainly made when the rotation of the rotor has failed, but the stop determination may be made even when the rotor is rotated. Details of the stop determination are also described later.

In this case, when the stop determination is made (determination Y), there is a possibility that the rotation of the rotor 51 has failed, and hence the correction pulse FP is output so that the rotor 51 is certainly rotated, and processing of raising the rank of the drive pulse SP (Step S23: FP-rank raising) is executed so that the rotor is rotated at the next hand movement. On the other hand, when the stop determination is not made (determination N), the determination means that the drive pulse SP has enough drive force to rotate the rotor 51, and hence processing of lowering the rank of the drive pulse SP (Step S24: rank lowering) is executed.

In the processing of raising the rank of the drive pulse SP, first, the control circuit 12 causes the correction pulse generation circuit 14 to output the correction pulse FP at a predetermined timing (Step S30: output FP), and the correction pulse FP is input to the driver circuit 20 via the pulse selection circuit 16. The correction pulse FP is output to the same coil terminal as the terminal to which the drive pulse SP is output, and thus the rotor 51 of the stepper motor 50 is certainly rotated.

Then, the control circuit 12 determines whether or not the current rank of the drive pulse SP is the maximum rank (Step S31: maximum rank is obtained?). In this case, when the current rank is the maximum rank (determination N), the rank of the drive pulse SP is raised by one rank (Step S32: raise rank by one rank). On the other hand, when the drive pulse SP already has the maximum rank (determination Y), the rank of the drive pulse SP is set to the minimum rank (Step S33: set to minimum rank). This control is performed in order to avoid such a trouble that the rank of the drive pulse cannot be lowered to an appropriate value when the above-mentioned stop determination is made because the rank of the drive pulse SP is too high for some reasons.

Meanwhile, in the processing of lowering the rank of the drive pulse SP, first, the control circuit 12 counts the number of times at which the rotation determination is made in the current rank of the drive pulse SP, and determines whether or not a movement determination number, which corresponds to the number of times at which the rotation determination is made, reaches a predetermined number, for example, 256 (Step S40). The rotation determination represents a case in which the stop determination is not made as described above, and specifically represents a case in which the determination Y is made in Step S22. Then, when the movement determination number reaches 256 (determination Y), the rank of the drive pulse SP is lowered by one rank (Step S41). When the movement determination number does not reach 256 (determination N), the current rank is maintained without the rank of the drive pulse SP being lowered.

With the above-mentioned control, when the stop determination is made, that is, when there is a possibility that the rotation of the rotor 51 of the stepper motor 50 has failed, the correction pulse FP is output so that the rotor 51 is certainly rotated, and the rank of the drive pulse SP is raised so that the rank of the drive pulse SP is adjusted to a level that enables the rotor 51 to be certainly rotated. With this, failure of hand movement and occurrence of a time difference are prevented. Meanwhile, when the rotation determination is made, that is, when the rotor 51 of the stepper motor 50 is certainly rotated, in a case where the movement determination number reaches the predetermined number and the rank of the drive pulse SP is considered to be high enough to rotate the rotor 51, the rank of the drive pulse SP is lowered so that the rank of the drive pulse SP is adjusted so as not to be higher than necessary. As a result, the rank of the drive pulse SP is maintained to a level that enables the rotor 51 to be certainly rotated and is not higher than necessary. Therefore, reliable operation of the stepper motor 50 and power saving are both obtained.

Subsequently, with reference to the timing charts of FIG. 26 to FIG. 28, the rotation detection method of the fourth embodiment is described.

[Description of Rotation Detection Operation of Fourth Embodiment: FIG. 26 to FIG. 28]

Figure 26:
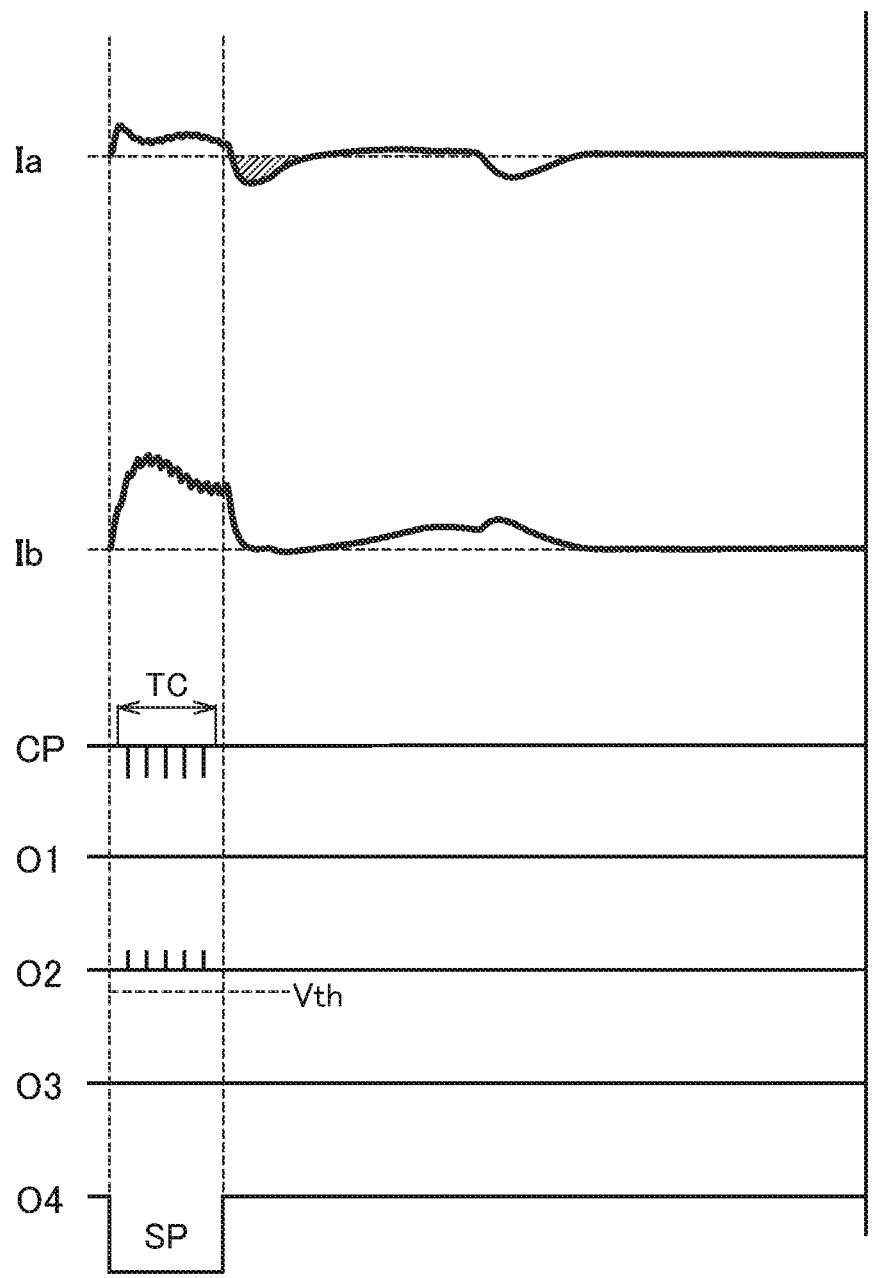
FIG. 26 is a timing chart for illustrating a detection operation performed during non-rotation by the drive circuit for a two-coil stepper motor according to the fourth embodiment of the present invention.

FIG. 26 is a timing chart for illustrating, with an elapsed time (mS) taken on the lateral axis, counter-electromotive forces Ia and Ib generated in the coil A and the coil B, respectively, the detection pulse CP, and the drive waveforms at the respective terminals O1, O2, O3, and O4, and is a chart for illustrating a case in which the rank of the drive pulse SP is insufficient and thus the rotor 51 of the stepper motor 50 is not rotated.

In FIG. 26, when the drive pulse is output from the coil terminal O4, the rotor 51 is rotated in the forward rotation direction. At this time, the counter-electromotive force Ia is generated not only in the coil B to which the drive pulse SP is output but also on the coil A side to which the drive pulse SP is not output.

At this time, the counter-electromotive force Ia on the coil A side is generated in the positive direction during the period in which the drive pulse SP is output, and then is immediately changed to the negative direction (as shown by hatching). The counter-electromotive force Ia in the negative direction is not so large because the rotor 51 is not rotated in the example shown here, and is generated at a timing after the period in which the drive pulse SP is output is ended. Further, the period in which the counter-electromotive force Ia is generated in the negative direction is also short.

Figure 27:
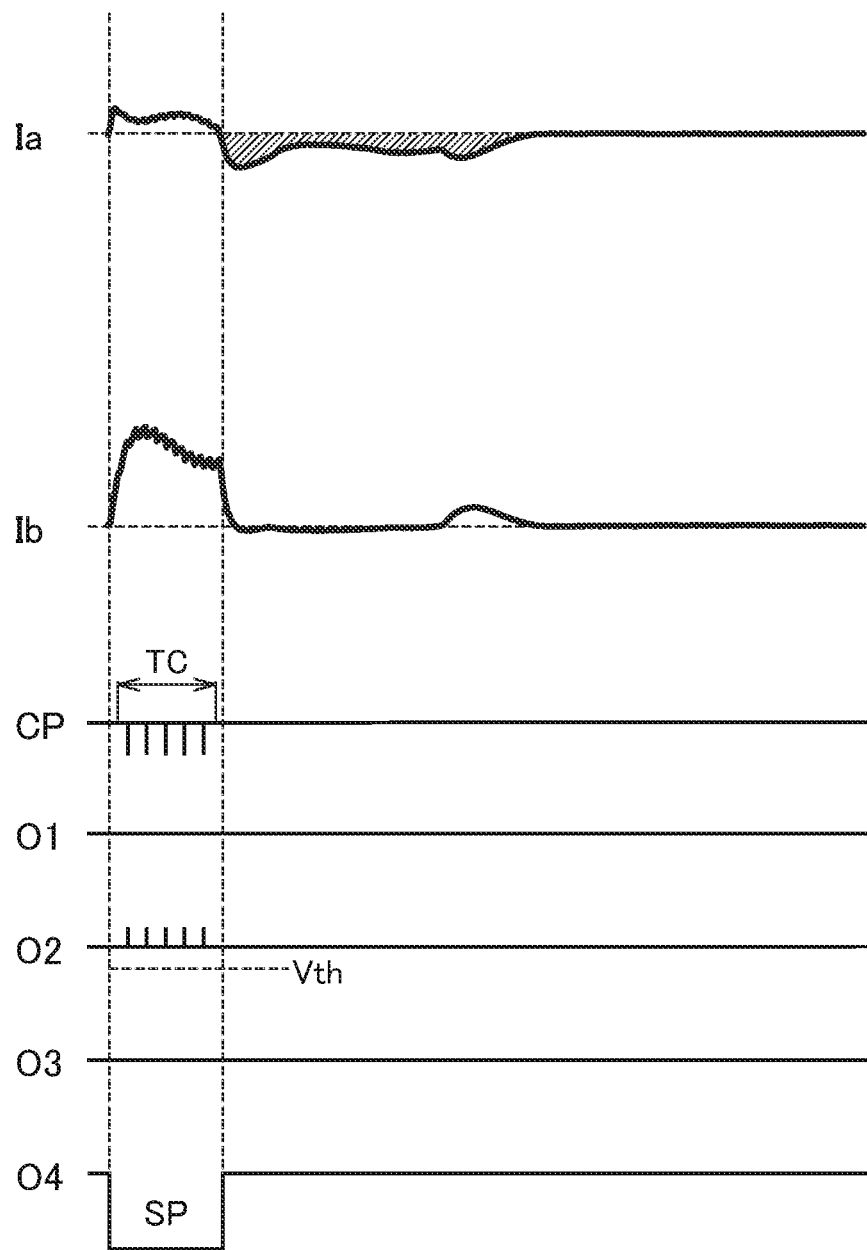
FIG. 27 is a timing chart for illustrating a detection operation performed during rotation by the drive circuit for a two-coil stepper motor according to the fourth embodiment of the present invention.

In contrast, FIG. 27 is a timing chart for illustrating a case in which the rank of the drive pulse SP is raised and thus the rotor 51 of the stepper motor 50 is rotated.

As illustrated in FIG. 27, the rotor 51 is rotated in the example shown here, and hence, on the coil A side, the counter-electromotive force Ia generated in the negative direction subsequently to the counter-electromotive force Ia generated in the positive direction along with the output of the drive pulse SP has a strength that is slightly larger than that in the case of non-rotation illustrated in FIG. 26, and the period thereof is also increased. However, in the case of the current rank of the drive pulse SP, the timing at which the counter-electromotive force I is generated in the negative direction is still after the period in which the drive pulse SP is output is ended.

Figure 28:
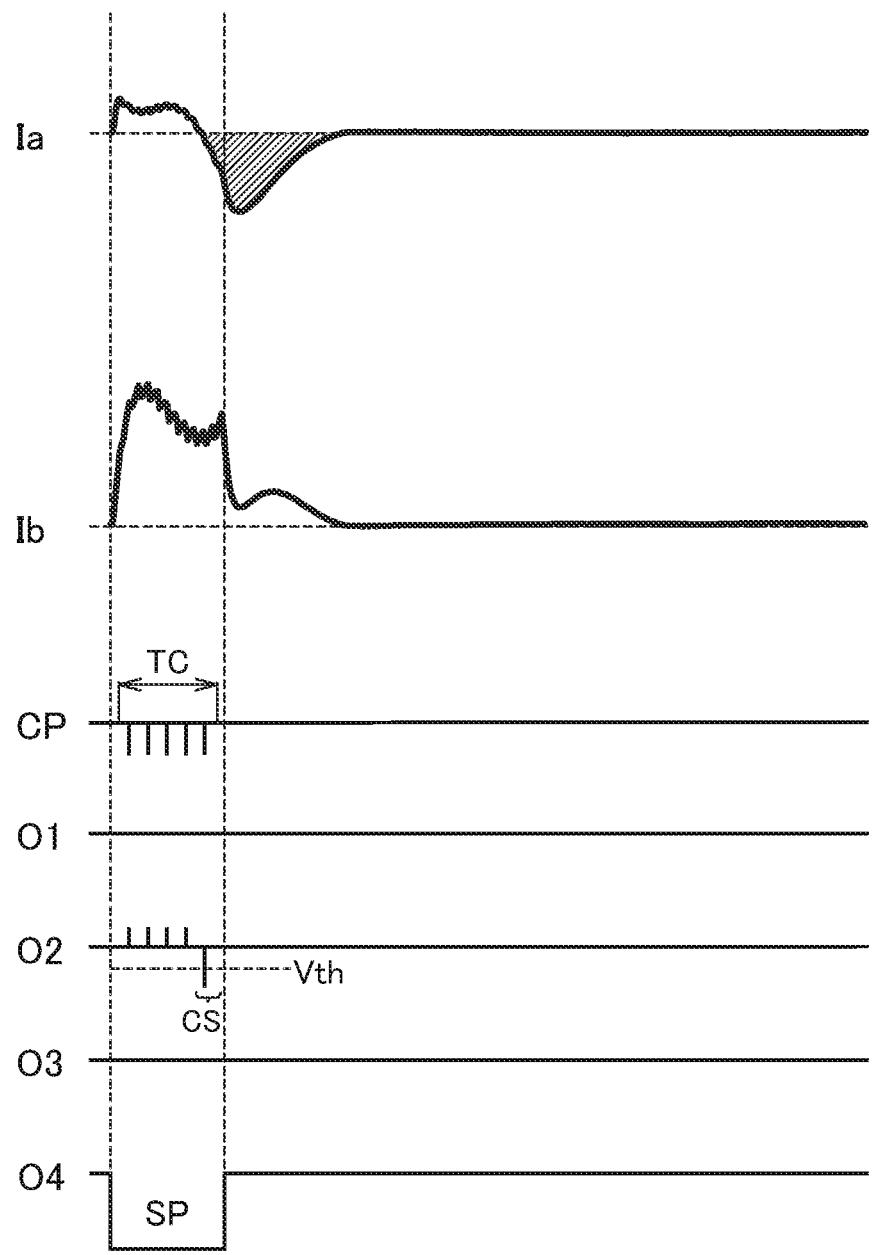
FIG. 28 is a timing chart for illustrating a detection operation performed during rotation by the drive circuit for a two-coil stepper motor according to the fourth embodiment of the present invention.

When the rank of the drive pulse SP is further raised, waveforms as those illustrated in the timing chart of FIG. 28 are obtained. FIG. 28 is a timing chart for illustrating a case in which the rank of the drive pulse SP is further raised and thus the rotor 51 of the stepper motor 50 is rotated.

As illustrated in FIG. 28, the rotor 51 is rotated in the example shown here, and hence, on the coil A side, the counter-electromotive force Ia generated in the negative direction subsequently to the counter-electromotive force Ia generated in the positive direction along with the output of the drive pulse SP has a strength that is even larger than that in the case illustrated in FIG. 27. Further, along therewith, the timing at which the counter-electromotive force Ia is generated in the negative direction becomes earlier, and the counter-electromotive force Ia in the negative direction appears before the period in which the drive pulse SP is output is ended.

The rotation detection operation of the fourth embodiment uses such change in counter-electromotive force Ia in the coil A that is different from the coil B to which the drive pulse SP is output, and the period in which the drive pulse SP is output is referred to as "rotation detection period TC". During the rotation detection period TC, the detection pulse CP is output to the terminal O2 of the coil A at an interval of 0.5 mS. The number of detection signals CS exceeding the predetermined threshold value Vth obtained as a result is counted, and thus the rotation detection operation, that is, stop determination, is performed.

Further, the stop determination in the rotation detection operation of the fourth embodiment is made when the number of detection signals CS exceeding the predetermined threshold value Vth does not reach a predetermined number. In the example here, the predetermined number is 1, and hence the stop determination is made when no detection signal CS exceeding the predetermined threshold value Vth is obtained, and otherwise, the rotation determination is made.

Description is given with reference to the examples of FIG. 26 to FIG. 28 referred to above. First, in the case illustrated in FIG. 26, no detection signal exceeding the predetermined threshold value Vth is obtained from the terminal O2 during the rotation detection period TC, and hence the stop determination is made. The case illustrated in FIG. 26 corresponds to a case in which the rotor 51 is not rotated, and hence the non-rotation of the rotor 51 is correctly determined in the stop determination in this case.

Next, in the case illustrated in FIG. 27, similarly, no detection signal exceeding the predetermined threshold value Vth is obtained from the terminal O2 during the rotation detection period TC, and hence the stop determination is made. However, the case illustrated in FIG. 27 corresponds to a case in which the rotor 51 is rotated. Therefore, in this case, the stop determination is made even though the rotor 51 is rotated.

Further, in the case illustrated in FIG. 28, the detection signal CS exceeding the predetermined threshold value Vth is obtained from the terminal O2 at the end of the rotation detection period TC. Therefore, the detection signal CS is detected, and hence the stop determination is not made. In this case, the rotation determination is made. That is, in this case, the rotation of the rotor 51 is correctly determined.

As described above, according to the fourth embodiment, the rotation detection is performed by outputting the detection pulse CP to one of the two coils. Also in this manner, the rotation detection of the stepper motor 50 is possible. Further, the case in which there is a possibility of non-rotation is detected as the stop determination so that the correction pulse FP is output. In this manner, the time difference due to the hand movement error can be prevented, and the rank of the drive pulse SP can be adjusted to an appropriate value to achieve power saving.

In the fourth embodiment, the timing to output the next drive pulse SP may be determined depending on the timing at which the detection signal CS exceeding the predetermined threshold value Vth is detected. For example, the next drive pulse SP may be output after an elapse of a predetermined time period from a time point at which the detection signal CS exceeding the predetermined threshold value Vth is detected and the rotation detection is made. In this manner, for example, when the hands are fast-forwarded, higher-speed drive is possible.

Alternatively, the timing to output the next drive pulse SP may be determined depending on the number of detection signals CS detected as exceeding the predetermined threshold value Vth. For example, when the number of detected detection signals CS is 1, the interval from the output of the drive pulse SP to the output of the next drive pulse SP may be 4.5 ms. When the number of detected detection signals CS is 2, the interval may be 4 ms, and when the number of detected detection signals CS is 3, the interval may be 3.5 ms.

[Modification Example 1 of Rotation Detection Operation of Fourth Embodiment: FIG. 29 to FIG. 33]

Various modifications can be made to the rotation detection operation of the fourth embodiment. In the example described above, the stop determination is made when the number of detection signals CS exceeding the predetermined threshold value Vth does not reach a predetermined number. In Modification Example 1 described here, however, the stop determination is made when the timing at which the detection signal CS exceeding the predetermined threshold value Vth is first detected is outside of a drive pulse output period.

Figure 29:
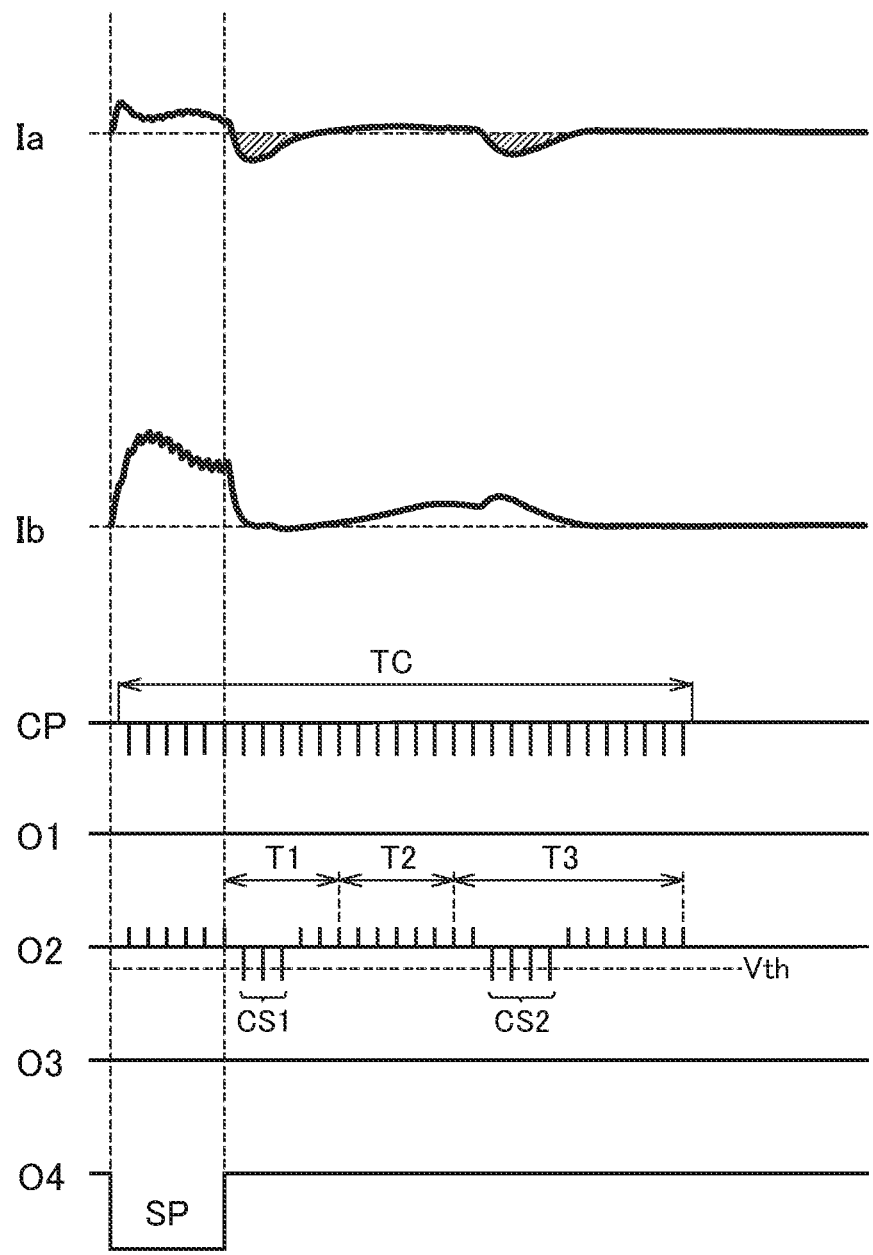
FIG. 29 is a timing chart for illustrating a detection operation performed during non-rotation by a drive circuit for a two-coil stepper motor according to Modification Example 1 of the fourth embodiment of the present invention.

FIG. 29 is a timing chart of a case in which, similarly to FIG. 26, the rank of the drive pulse SP is low and thus the rotor 51 is not rotated. As illustrated in FIG. 29, the rotation detection period TC is set to range from the beginning of the drive pulse output period to a time point at which a considerable period of time has elapsed after an elapse of the drive pulse output period. Further, in the case illustrated in FIG. 29, as the detection signals CS exceeding the predetermined threshold value Vth, two groups of detection signals CS1 and CS2 are detected from the terminal O2 of the coil A, but the detection signal CS detected first, that is, the signal detected earliest among the detection signals CS1, is a signal obtained after the drive pulse generation period is ended. Therefore, the stop determination is made in the rotation detection operation of this modification example. That is, the non-rotation of the rotor 51 is correctly detected.

Figure 30:
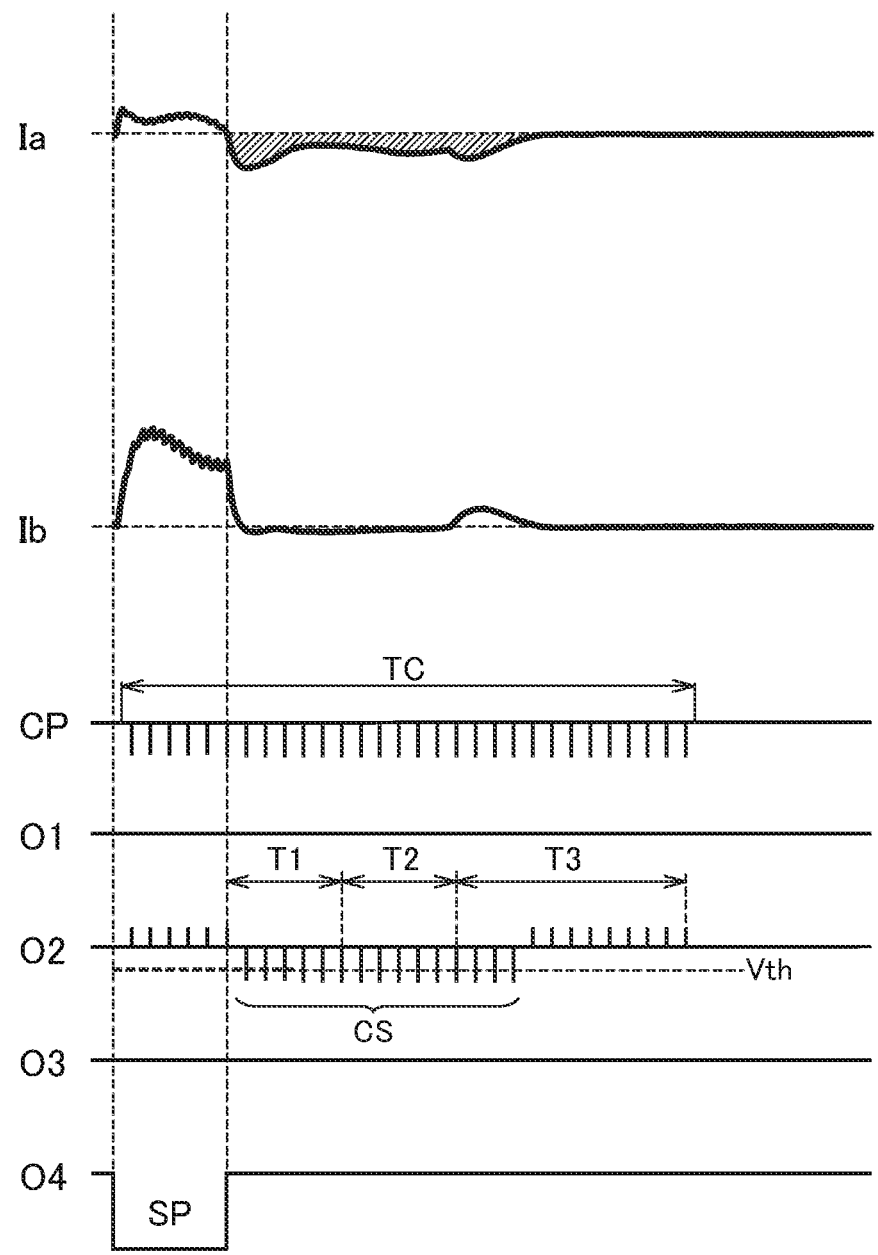
FIG. 30 is a timing chart for illustrating a detection operation performed during rotation by the drive circuit for a two-coil stepper motor according to Modification Example 1 of the fourth embodiment of the present invention.

FIG. 30 is a timing chart of a case in which, similarly to FIG. 27, the rank of the drive pulse SP is raised and thus the rotor 51 is rotated. In this case, the detection signals CS exceeding the predetermined threshold value Vth are detected as one group from the terminal O2 of the coil A, but the signal detected earliest among the detection signals CS is still a signal obtained after the drive pulse generation period is ended. Therefore, the stop determination is made in the rotation detection operation of this modification example. Therefore, also in Modification Example 1, as in the example described above, the stop determination is made even though the rotor 51 is rotated.

Figure 31:
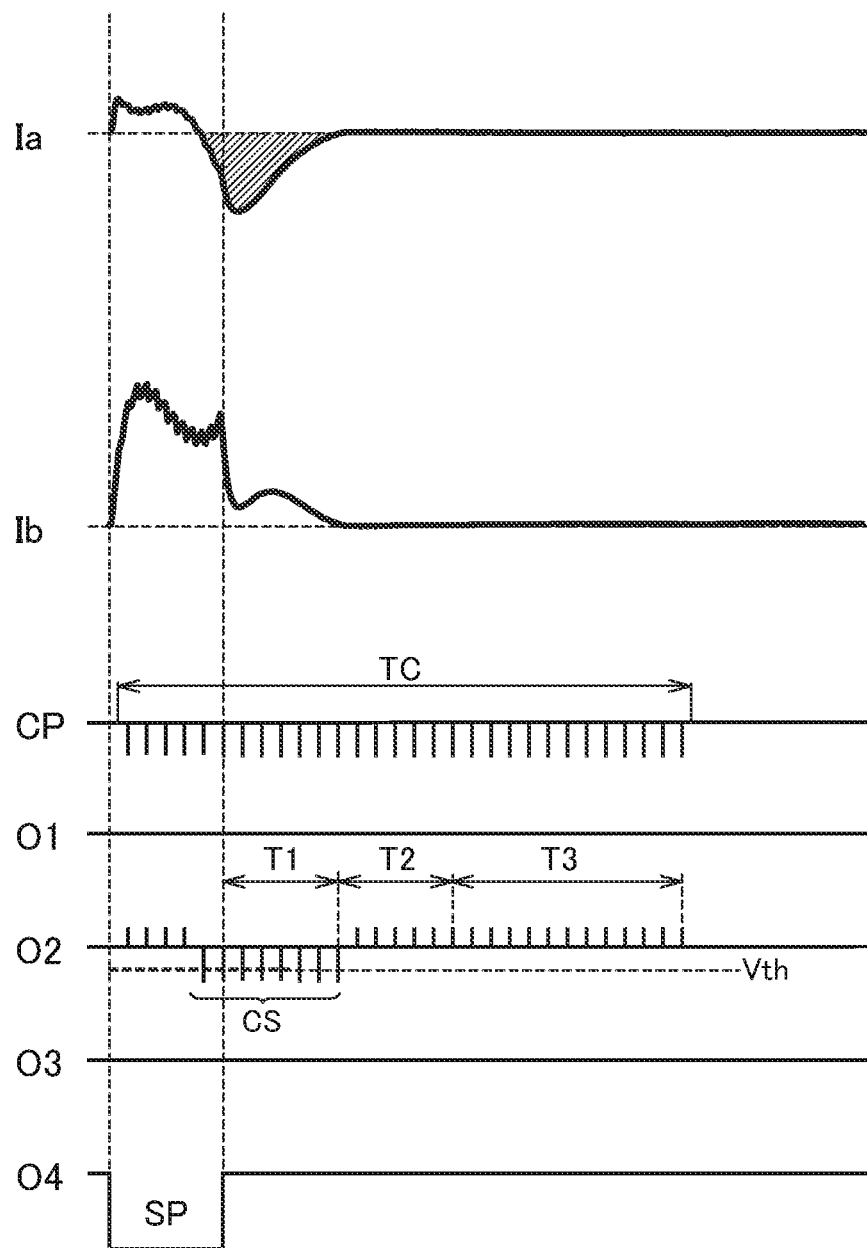
FIG. 31 is a timing chart for illustrating a detection operation performed during rotation by the drive circuit for a two-coil stepper motor according to Modification Example 1 of the fourth embodiment of the present invention.

Further, FIG. 31 is a timing chart of a case in which, similarly to FIG. 28, the rank of the drive pulse SP is further raised and thus the rotor 51 is rotated. Also in this case, the detection signals CS exceeding the predetermined threshold value Vth are detected as one group from the terminal O2 of the coil A. Then, the signal detected earliest among the detection signals CS is still a signal obtained before the drive pulse generation period is ended, and hence the rotation determination is made in this case. Therefore, in this case, the rotation of the rotor 51 is correctly determined.

The determination may be made as follows. The stop determination may be made when, among periods in which two or more detection signals CS exceeding the predetermined threshold value Vth are successively detected, a period having the largest detection number does not overlap with the drive pulse output period.

Further, the operation of the control circuit 12 in Modification Example 1 may be the same as that illustrated in FIG. 25, but the operation may be further modified. For example, Step S20 to Step S23 of the flow chart of FIG. 32 are the same as those of FIG. 25. Then, when the stop determination is not made in Step S22 (determination N), processing of changing the rank of the drive pulse SP (Step S25: rank raising/lowering) may be executed.

In the processing of changing the rank of the drive pulse SP, first, it is determined whether the number of detection signals CS detected within the period in which the drive pulse SP is detected is 1 (Step S50: detection number is 1?). When the number of detection signals CS is 1 (determination Y), although the rotor 51 is rotated, it cannot be said that the drive force is sufficient, and the drive force may be unstable. Therefore, the rank of the drive pulse SP is raised by one rank (Step S51: raise rank by one rank). When the number of detection signals CS is not 1 (determination N), it is further determined whether the number of detection signals CS is 2 (Step S52: detection number is 2?). When the number of detection signals CS is 2 (determination Y), it is determined that the drive force is appropriate, and the rank of the drive pulse SP is maintained. When the number of detection signals CS is not 2 (determination N), that is, when the number of detection signals CS detected within the period in which the drive pulse SP is detected is 3 or more, it is considered that the rank of the drive pulse SP is too high, and hence the rank of the drive pulse SP is lowered by one rank (Step S53: lower rank by one rank).

Figure 33:
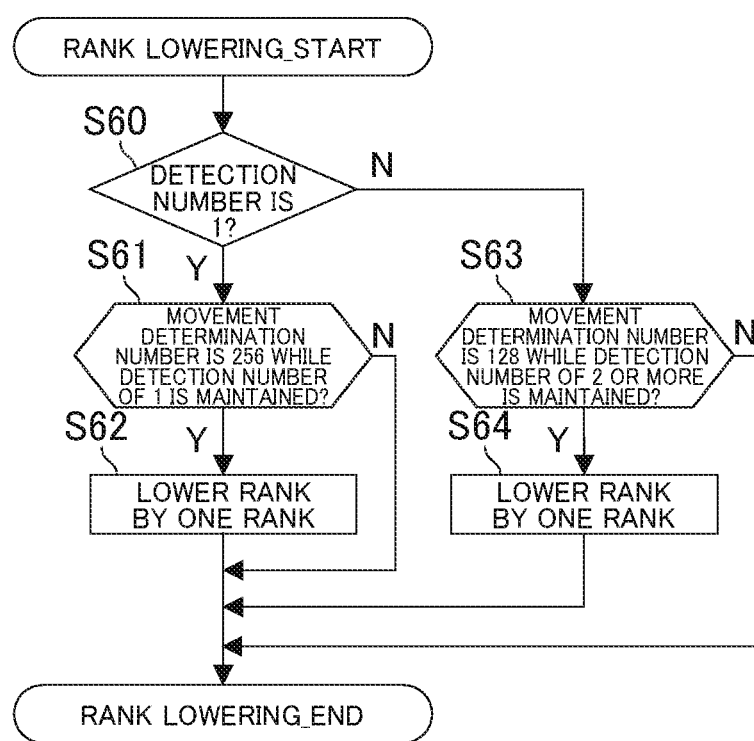
FIG. 33 is a flow chart for illustrating the operation of the drive circuit for a two-coil stepper motor according to Modification Example 1 of the fourth embodiment of the present invention.

Alternatively, as another modification, the processing of lowering the rank of the drive pulse SP (Step S24: rank lowering) in the flow chart of FIG. 25 may be changed to processing of FIG. 33.

In the processing of lowering the rank of the drive pulse SP in this modification, first, it is determined whether the number of detection signals CS detected within the period in which the drive pulse SP is output is 1 (Step S60: detection number is 1?). When the number of detection signals CS is 1 (determination Y), the rotor 51 is rotated. Therefore, in order to further determine whether or not there is a margin in the drive force, the movement determination number obtained when the number of detection signals CS is 1 is further counted so that it is determined whether or not the number reaches 256 (Step S61: movement determination number is 256 while detection number of 1 is maintained?). When the number reaches 256 (determination Y), the rank of the drive pulse SP is lowered by one rank (Step S62: lower rank by one rank), and when the number does not reach 256 (determination N), the rank of the drive pulse SP is maintained as it is.

Further, when the number of detection signals CS detected within the period in which the drive pulse SP is detected is not 1 (Step S60: determination N), the movement determination number obtained when the number of detection signals CS is 2 or more is further counted, and it is determined whether or not the number reaches 128 (Step S63: movement determination number is 128 while detection number of 2 or more is maintained?). When the number reaches 128 (determination Y), the rank of the drive pulse SP is lowered by one rank (Step S64: lower rank by one rank), and when the number does not reach 128 (determination N), the rank of the drive pulse SP is maintained as it is.

In this control, consideration is given to the rotation stability of the stepper motor 50 depending on the current rank of the drive pulse SP. When it is considered that the current rank of the drive pulse SP is basically appropriate, only when the rotation of the rotor 51 succeeds successively a sufficient number of times, the drive force is regarded to have a margin and the rank is lowered. Further, when it is considered that the current rank of the drive pulse SP is high and there is a margin in the drive force, the rank is lowered when the rotation of the rotor 51 succeeds successively a smaller number of times. In this manner, prompt reduction of power consumption is intended.

[Modification Example 2 of Rotation Detection Operation of Fourth Embodiment: FIG. 34 to FIG. 38]

As another modification example of the rotation detection operation of the fourth embodiment, the stop determination may be made based on the number of detection signals CS that are successively detected as exceeding the predetermined threshold value Vth from immediately after the end of the drive pulse output period. That is, in Modification Example 2 described here, the stop determination is made when the detection signals CS exceeding the predetermined threshold value Vth are not successively detected (that is, without fail in detection) a predetermined number of times or more from immediately after the end of the drive pulse output period.

Figure 34:
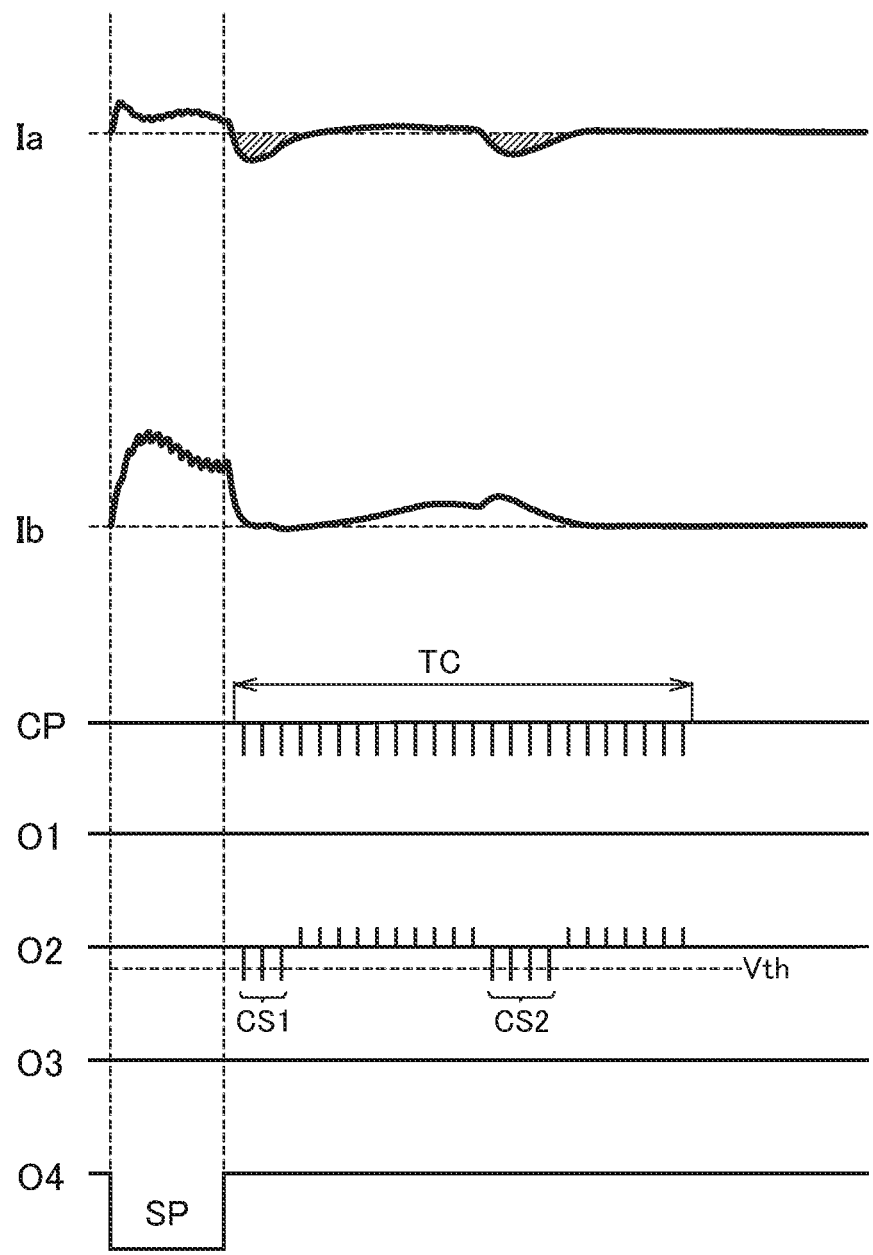
FIG. 34 is a timing chart for illustrating a detection operation performed during non-rotation by a drive circuit for a two-coil stepper motor according to Modification Example 2 of the fourth embodiment of the present invention.

FIG. 34 is a timing chart of a case in which, similarly to FIG. 26, the rank of the drive pulse SP is low and thus the rotor 51 is not rotated. As illustrated in FIG. 34, the rotation detection period TC is set to range from immediately after the end of the drive pulse output period to a time point at which a considerable period of time has elapsed thereafter. In the case illustrated in FIG. 34, as the detection signals CS exceeding the predetermined threshold value Vth, two groups of detection signals CS1 and CS2 are detected from the terminal O2 of the coil A, and the number of detection signals CS1 that are successively detected from immediately after the end of the drive pulse output period is 3. That is, as described above, when the rotor 51 is not rotated, after the drive pulse SP is output, the counter-electromotive force Ia generated in the negative direction in the coil A has a weak strength, and the period thereof is also short. Therefore, the detection signals CS1 are not successively detected any more.

In Modification Example 2, the stop determination is made unless the detection signals CS are successively detected four times from immediately after the end of the drive pulse output period. Therefore, in this example, the stop determination is made, and the non-rotation of the rotor 51 is correctly detected.

Figure 35:
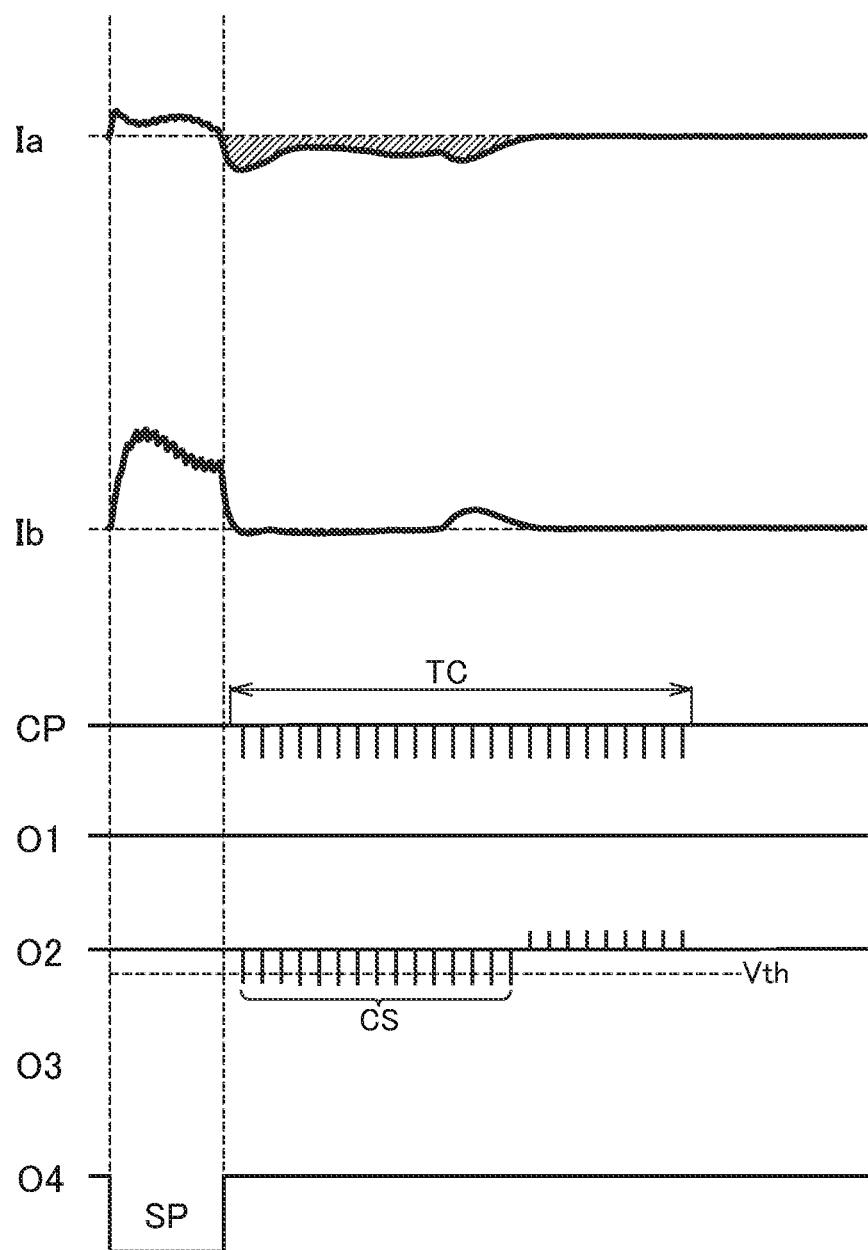
FIG. 35 is a timing chart for illustrating a detection operation performed during rotation by the drive circuit for a two-coil stepper motor according to Modification Example 2 of the fourth embodiment of the present invention.

FIG. 35 is a timing chart of a case in which, similarly to FIG. 27, the rank of the drive pulse SP is raised and thus the rotor 51 is rotated. In this case, the detection signals CS exceeding the predetermined threshold value Vth are successively detected for a long period from the terminal O2 of the coil A, and fifteen detection signals CS are detected in the illustrated example. That is, the detection signals CS are successively detected four times or more from immediately after the end of the drive pulse output period. In this case, the stop determination is not made, and the rotation determination is made. That is, in Modification Example 2, the rotation of the rotor 51 is correctly determined.

Figure 36:
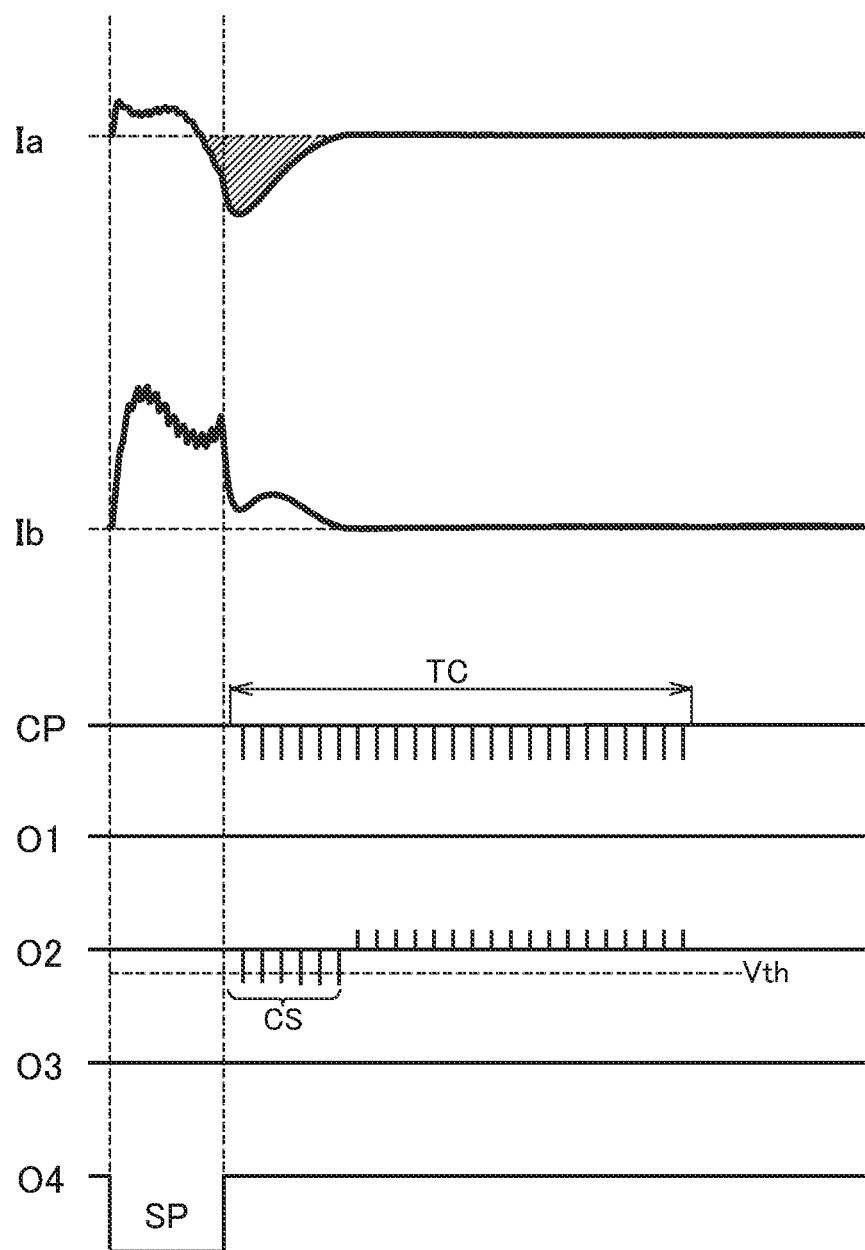
FIG. 36 is a timing chart for illustrating a detection operation performed during rotation by the drive circuit for a two-coil stepper motor according to Modification Example 2 of the fourth embodiment of the present invention.

Further, FIG. 36 is a timing chart of a case in which, similarly to FIG. 28, the rank of the drive pulse SP is further raised and thus the rotor 51 is rotated. Also in this case, the detection signals CS exceeding the predetermined threshold value Vth are successively detected for a certain period from the terminal O2 of the coil A, and five detection signals CS are detected in the illustrated example. Therefore, the rotation determination is made also in this case, and the rotation of the rotor 51 is correctly determined.

The determination may be made as follows. The stop determination may be made when, among periods in which two or more detection signals CS exceeding the predetermined threshold value Vth are successively detected, a period having the largest detection number does not overlap with the drive pulse output period. In this case, the rotation detection period TC is required to be set so as to overlap with at least the end of the drive pulse output period.

Further, the operation of the control circuit 12 in Modification Example 2 may be the same as that illustrated in FIG. 25, but the operation may be further modified. For example, Step S20 to Step S23 of the flow chart of FIG. 37 are the same as those of FIG. 25. Then, when the stop determination is not made in Step S22 (determination N), processing of changing the rank of the drive pulse SP (Step S25: rank raising/lowering) may be executed. Step S25 is the same as that described in Modification Example 1 of the fourth embodiment and illustrated in FIG. 32.

In the processing of changing the rank of the drive pulse SP of Modification Example 2, first, the number of detection signals CS that are successively detected is counted from immediately after the end of the drive pulse output period, and it is determined whether the number is 8 or more (Step S70: detection number is 8 or more?). When the number is 8 or more (determination Y), it is considered that the rank of the drive pulse SP is in a state in which the rotor 51 can be rotated but the drive force has no margin for stably rotating the rotor 51. That is, when it is considered a case in which the drive pulse SP is output to the coil B in the forward rotation direction, a state illustrated in FIG. 35 is obtained, in which the strength of the counter-electromotive force Ia generated in the coil A from immediately after the drive pulse output is not so large and the continuation period thereof is long. Therefore, in this case, the rank of the drive pulse SP is raised by one rank (Step S71: raise rank by one rank).

Meanwhile, when the number of successively detected detection signals CS is counted and the number is not 8 or more (Step S70: determination N), it is further determined whether or not the number of successively detected detection signals CS is 5 or more (Step S72: detection number is 5 or more?). When the number is 5 or more (determination Y), it is considered that the rank of the drive pulse SP is in an appropriate state, and hence the rank is maintained as it is. Meanwhile, when the number is not 5 or more (determination N), that is, when the number is 4, it is considered that the rank of the drive pulse SP is too high and false determination may be made because the drive force is too strong. Thus, the rank of the drive pulse SP is lowered by one rank (Step S73: lower rank by one rank).

Figure 38:
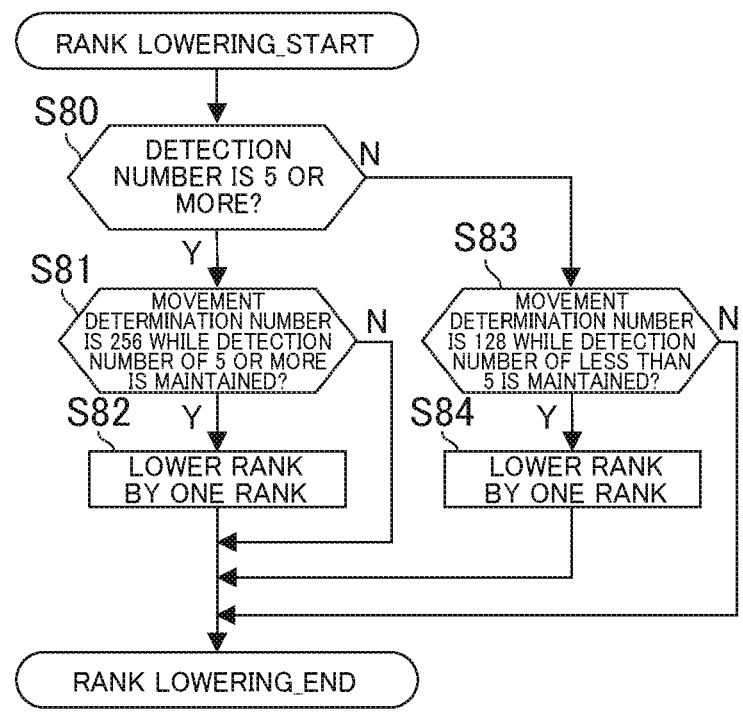
FIG. 38 is a flow chart for illustrating the operation of the drive circuit for a two-coil stepper motor according to Modification Example 2 of the fourth embodiment of the present invention.

Alternatively, as another modification, the processing of lowering the rank of the drive pulse SP (Step S24: rank lowering) in the flow chart of FIG. 25 may be changed to processing of FIG. 38.

In the processing of lowering the rank of the drive pulse SP in this modification, first, the number of detection signals CS that are successively detected is counted from immediately after the end of the drive pulse output period, and it is determined whether the number is 5 or more (Step S80: detection number is 5 or more?). When the number of detection signals CS is 5 or more (determination Y), the rotor 51 is rotated. Therefore, in order to further determine whether or not there is a margin in the drive force, the movement determination number obtained when the number of detection signals CS that are successively detected is 5 or more is further counted so that it is determined whether or not the number reaches 256 (Step S81: movement determination number is 256 while detection number of 5 or more is maintained?). When the number reaches 256 (determination Y), the rank of the drive pulse SP is lowered by one rank (Step S82: lower rank by one rank), and when the number does not reach 256 (determination N), the rank of the drive pulse SP is maintained as it is.

Further, when the number of detection signals CS that are successively detected from immediately after the end of the drive pulse output period is not 5 or more (Step S80: determination N), that is, when the number is 4, the movement determination number obtained when the number of successively detected detection signals CS is less than 5 is counted, and it is determined whether or not the number reaches 128 (Step S83: movement determination number is 128 while detection number of less than 5 is maintained?). When the number reaches 128 (determination Y), the rank of the drive pulse SP is lowered by one rank (Step S84: lower rank by one rank), and when the number does not reach 128 (determination N), the rank of the drive pulse SP is maintained as it is.

Also in this control, consideration is given to the rotation stability of the stepper motor 50 depending on the current rank of the drive pulse SP. When it is considered that the current rank of the drive pulse SP is basically appropriate, only when the rotation of the rotor 51 succeeds successively a sufficient number of times, the drive force is regarded to have a margin and the rank is lowered. Further, when it is considered that the current rank of the drive pulse SP is high and there is a margin in the drive force, the rank is lowered when the rotation of the rotor 51 succeeds successively a smaller number of times. In this manner, prompt reduction of power consumption is intended.

Figure 39:
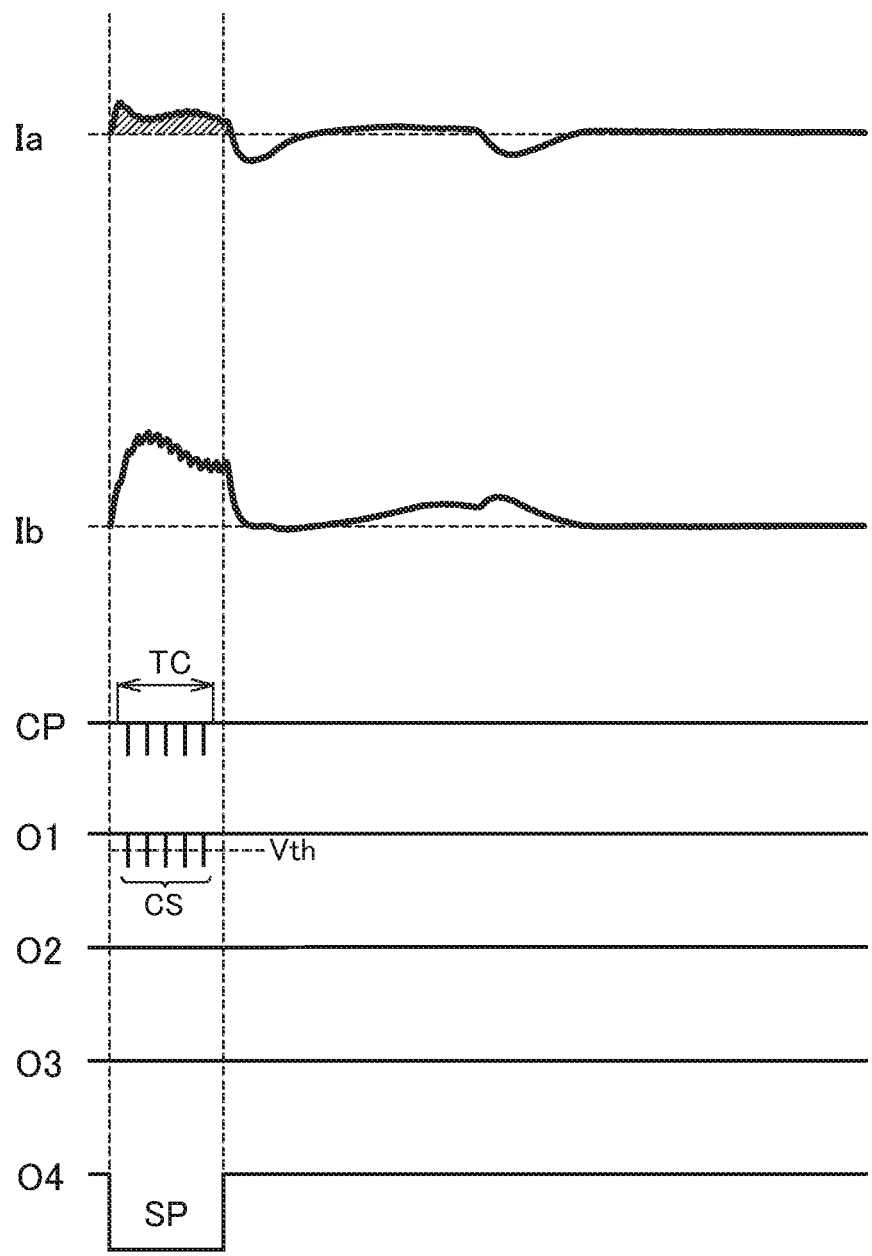
FIG. 39 is a timing chart for illustrating a detection operation performed during non-rotation by a drive circuit for a two-coil stepper motor according to Modification Example 3 of the fourth embodiment of the present invention.
Figure 40:
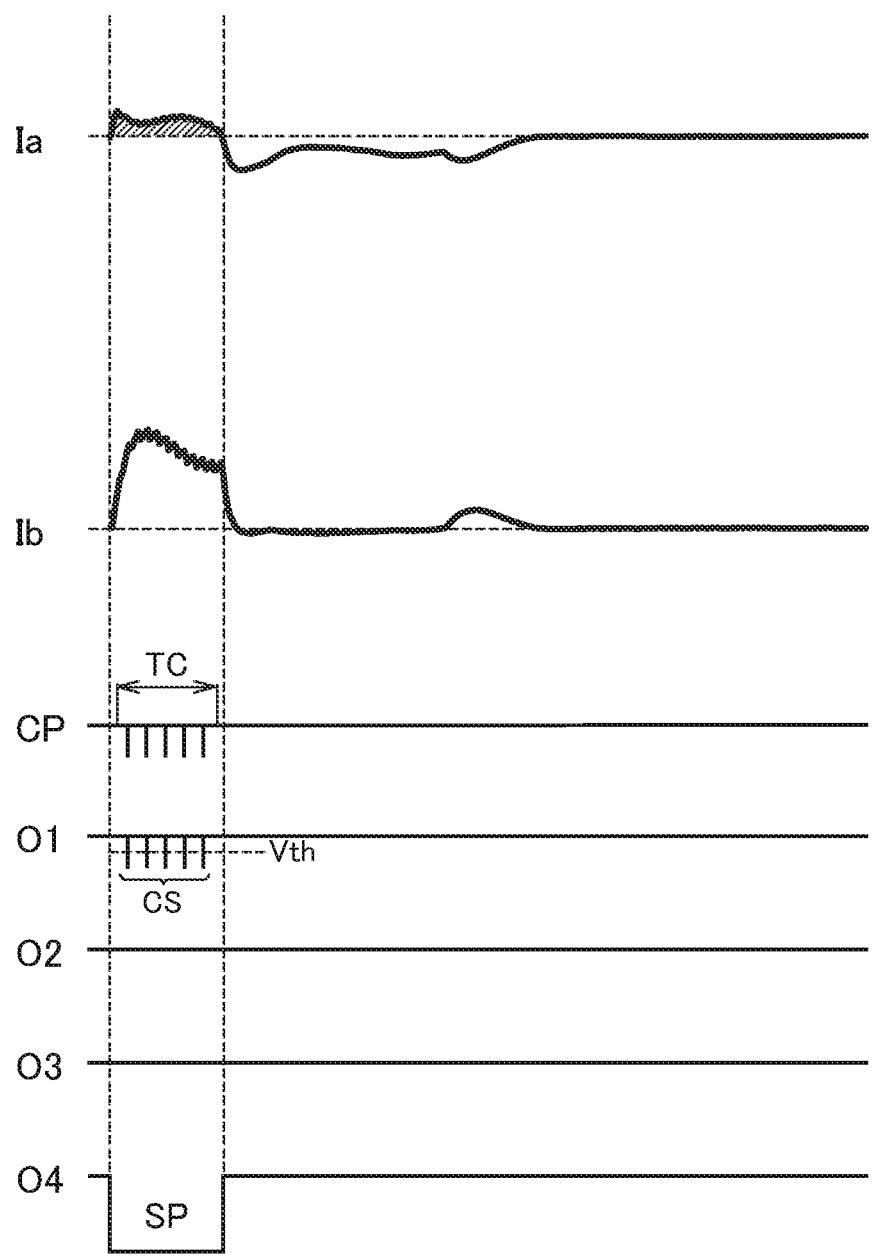
FIG. 40 is a timing chart for illustrating a detection operation performed during rotation by the drive circuit for a two-coil stepper motor according to Modification Example 3 of the fourth embodiment of the present invention.
Figure 41:
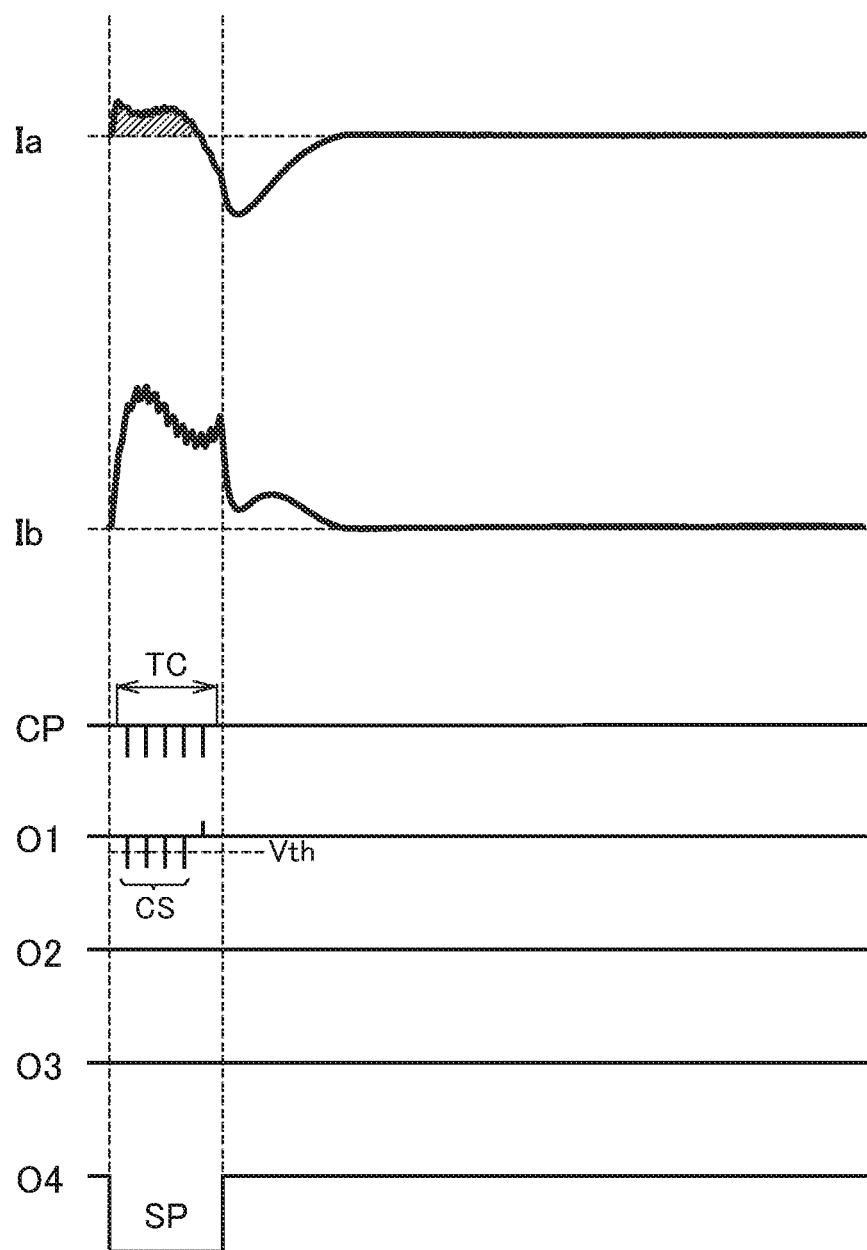
FIG. 41 is a timing chart for illustrating a detection operation performed during rotation by the drive circuit for a two-coil stepper motor according to Modification Example 3 of the fourth embodiment of the present invention.

[Modification Example 3 of Rotation Detection Operation of Fourth Embodiment: FIG. 39 to FIG. 41]

In another modification example of the rotation detection operation of the fourth embodiment, as described with reference to FIG. 26 to FIG. 28, instead of the rotation detection operation of detecting the electromotive force Ia generated in the negative direction in the coil A, an operation of detecting the electromotive force Ia generated in the positive direction in the coil A is performed (case in which the drive pulse SP is output to the coil B in the forward rotation direction).

At this time, as illustrated in FIG. 39 to FIG. 41, the electromotive force Ia (as shown by hatching) generated in the positive direction in the coil A during the drive pulse output period is detected in the negative direction at the terminal O1 of the coil A. Therefore, in Modification Example 3, the detection pulse CP is output to the terminal O1 so that the detection signal CS in the negative direction is detected. Further, the rotation detection period TC is a period equivalent to the drive pulse output period.

The rotation detection operation in Modification Example 3 is the same as the first example of the fourth embodiment in that, during the rotation detection period TC, the number of detection signals CS that are detected as exceeding the predetermined threshold value Vth is counted and the stop determination is made depending on the number, but differs from the first example of the fourth embodiment in that, in the determination, the stop determination is made when the number of detected detection signals CS is a predetermined number or more. In this example, the predetermined number is 5, and the number of detection pulses CP included in the rotation detection period TC is also 5. As a result, the stop determination is made when the detection signals CS are detected for all of the detection pulses CP included in the rotation detection period TC, and the rotation determination is made when the number of detected detection signals CS does not reach the number of detection pulses CP. The predetermined number is not necessarily required to match with the number of detection pulses CP, and may be a number smaller than the number of detection pulses CP by one or more. For example, when the predetermined number is 4, in this case, the stop determination is made when the number of detected detection signals CS is 4 or 5, and the rotation determination is made when the number is 3 or less.

As illustrated in the timing chart of FIG. 39, when the rank of the drive pulse SP is low and thus the rotor 51 is not rotated, the number of detection signals CS detected from the terminal O1 is equal to the number of detection pulses CP, which is 5. That is, in this case, the stop determination is correctly made.

As illustrated in the timing chart of FIG. 40, when the rank of the drive pulse SP is raised and thus the rotor 51 is rotated, the number of detection signals CS detected from the terminal O1 is still equal to the number of detection pulses CP, which is 5. That is, in this case, the stop determination is made even though the rotor 51 is rotated.

As illustrated in the timing chart of FIG. 41, when the rank of the drive pulse SP is further raised and thus the rotor 51 is rotated, the number of detection signals CS detected from the terminal O1 is decreased to be 4. That is, in this case, the stop determination is not made, and the rotation determination is correctly made.

In accordance with the rotation detection operation described in Modification Example 1 of the fourth embodiment, also in Modification Example 3, the stop determination may be made when the timing at which the detection of the detection signal CS exceeding the predetermined threshold value Vth is first stopped is after the drive pulse output period is ended, and the rotation determination may be made when the timing at which the detection of the detection signal CS is first stopped falls within the drive pulse output period. Further, the operation of the control circuit 12 at this time may be the same as that illustrated in FIG. 25, or may be similar to that illustrated in FIG. 32 or FIG. 33.

Figure 42:
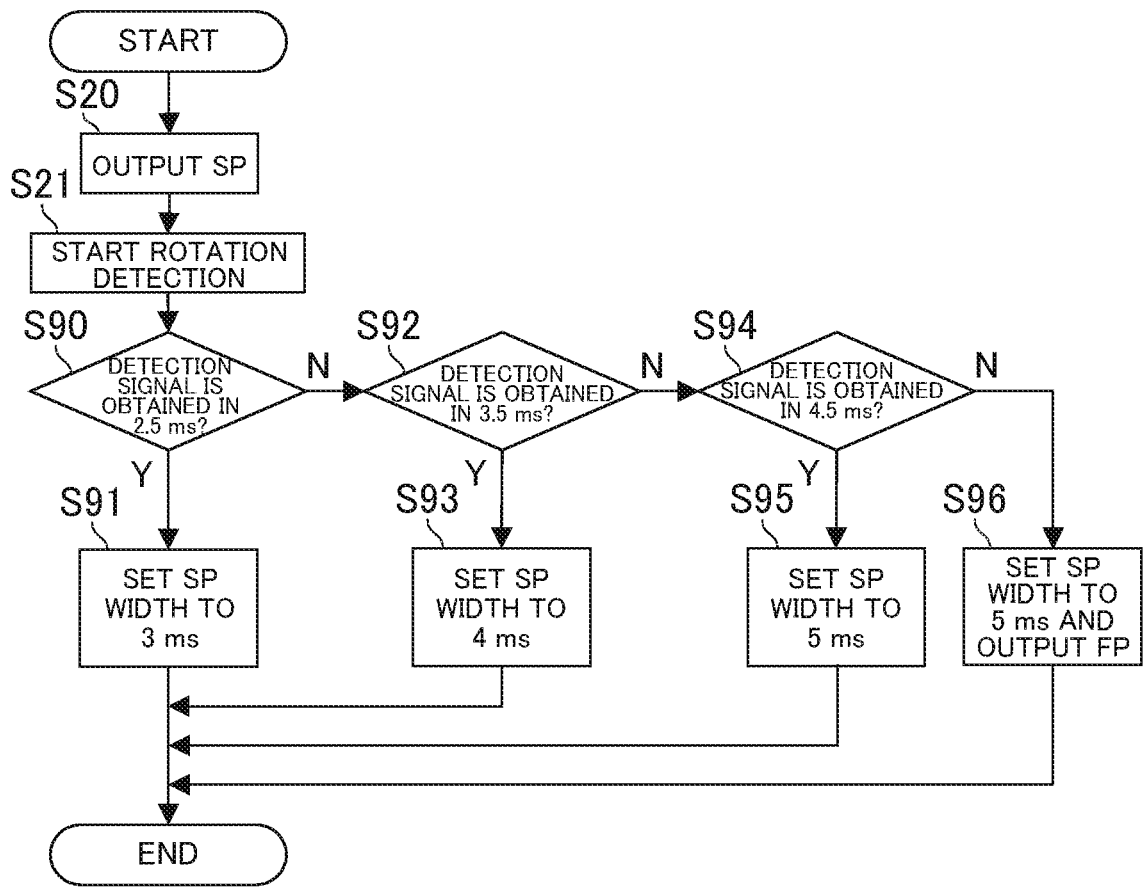
FIG. 42 is a flow chart for illustrating an operation of a drive circuit for a two-coil stepper motor according to Modification Example 4 of the fourth embodiment of the present invention.

[Modification Example 4 of Rotation Detection Operation of Fourth Embodiment: FIG. 42]

As another modification example of the rotation detection operation of the fourth embodiment, there is an example in which the adjustment of the drive force due to the drive pulse SP is performed not by adjusting the rank but by changing the time period in which the drive pulse SP is output, that is, the drive pulse output period itself. The rank of the drive pulse SP in this case may be fixed to an appropriate value, for example, 20/24, or may be adjusted as appropriate. Further, the drive pulse output period is not yet determined at a time point at which the drive pulse generation circuit 13 outputs the drive pulse SP, and the drive pulse SP is continuously output.

FIG. 42 is a flow chart for illustrating the flow of the rotation detection in Modification Example 4. Steps S20 and S21 of FIG. 42 are the same as those of FIG. 25 that have been already described above. Further, the rotation detection operation in Modification Example 4 may be that in the example described in the fourth embodiment or that of Modification Example 3 of the fourth embodiment. That is, the rotation detection period TC is equivalent to the drive pulse output period SP, and the rotation determination is made when the detection signals CS are detected a predetermined number of times or more during the rotation detection period TC (example described in the fourth embodiment), or the rotation determination is made when the number of detection signals CS detected during the rotation detection period TC does not reach a predetermined number (example described in Modification Example 3).

At this time, a timing at which the detection signal CS, that is, the detection signal CS necessary for obtaining the rotation determination, is obtained is determined. First, as illustrated in FIG. 42, after the rotation detection is started (Step S21), it is determined whether or not necessary detection signal CS is obtained in 2.5 ms (Step S90: detection signal is obtained in 2.5 ms?). When the detection signal CS is obtained and the rotation determination can be made (determination Y), it is considered that the drive force of the drive pulse SP is sufficient, and the period in which the drive pulse SP is output may be short. Therefore, the width of the drive pulse SP, that is, the drive pulse output period, is set to 3 ms (Step S91: set SP width to 3 ms). With this, the drive pulse SP is continuously output for 3 ms, and then the output is ended. Further, after the detection signal CS is obtained and the rotation determination is made, the rotation detection operation is not required to be performed, and hence the output of the detection pulse CP by the detection pulse generation circuit 15 may be stopped.

When the necessary detection signal CS is not obtained in 2.5 ms (Step S90: determination N), it is next determined whether or not the necessary detection signal CS is obtained in 3.5 ms (Step S92: detection signal is obtained in 3.5 ms?). When the detection signal CS is obtained and the rotation determination can be made (determination Y), the width of the next drive pulse SP, that is, the next drive pulse output period, is set to 4 ms (Step S93: set SP width to 4 ms). With this, the drive pulse SP is continuously output for 4 ms, and then the output is ended. Further, after the rotation determination is made, the output of the detection pulse CP may be similarly stopped.

Further, when the necessary detection signal CS is not obtained in 3.5 ms (Step S92: determination N), it is next determined whether or not the necessary detection signal CS is obtained in 4.5 ms (Step S94: detection signal is obtained in 4.5 ms?). When the detection signal CS is obtained and the rotation determination can be made (determination Y), the width of the next drive pulse SP, that is, the next drive pulse output period, is set to 5 ms (Step S95: set SP width to 5 ms). With this, the drive pulse SP is continuously output for 5 ms, and then the output is ended. Further, after the rotation determination is made, the output of the detection pulse CP may be similarly stopped.

When the necessary detection signal CS is not obtained in 4.5 ms (Step S96: determination N), it is considered that the following condition is obtained. That is, the drive force due to the drive pulse SP is small, for example, the power supply voltage is small, and the rotor 51 cannot be sufficiently rotated even when the period is extended to a predetermined upper limit value. In this case, the drive pulse output period is set to the predetermined upper limit value (in this example, 5 ms), and then the correction pulse FP is output at an appropriate timing (Step S96: set SP width to 5 ms and output FP). In this manner, the rotor 51 is certainly rotated.

In Modification Example 4, the width of the drive pulse SP, that is, the drive pulse output period, is increased so that the drive force is increased until the rotation determination on the rotor 51 is obtained. Therefore, the correction pulse FP is output only when the rotation determination cannot be obtained (that is, the stop determination is made) even when the drive pulse output period is set to the predetermined upper limit value, and the correction pulse FP is hardly output during normal hand movement. Therefore, the increase in power consumption due to unnecessary output of the correction pulse FP can be suppressed.

Figure 43:
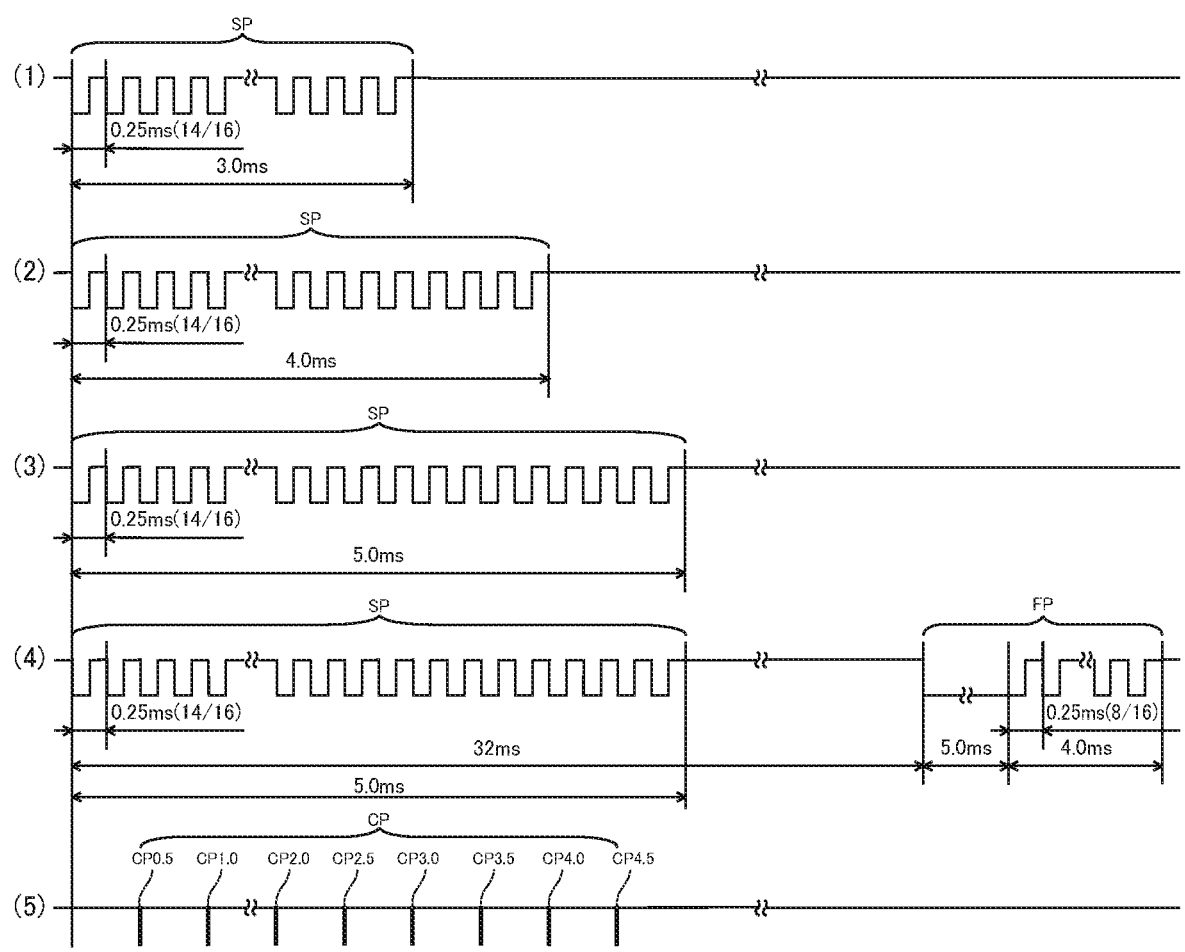
FIG. 43 is a waveform chart of pulses to be output to a coil of Modification Example 4 of the fourth embodiment of the present invention.

FIG. 43 is a waveform chart of pulses to be output to the coil in Modification Example 4. The waveforms (1) to (4) illustrated in FIG. 43 show patterns of pulses to be output to the coil on the side on which the drive pulse SP is output, and CP represents the timing at which the detection pulse CP is output.

The waveform (1) represents a case in which the detection signal CS is obtained in 2.5 ms and the rotation determination is made (FIG. 42: Step S90 and Step S91).

Now, the detailed structure of the drive pulse SP is described. The drive pulse SP has a structure in which a large number of chopper pulses are continuously output in a shorter period. Further, the chopper pulse is a single square wave that is switched from a signal output state to a signal stop state (or vice versa) within a predetermined period width. In this example, the width of the chopper pulse is 0.25 ms. Further, the ratio of the signal output time period to this period width corresponds to the rank of the drive pulse SP. In the drive pulse SP illustrated in FIG. 43, the rank is 14/16. Therefore, the signal output period is 0.21875 ms and the signal stop period is 0.03125 ms in one chopper pulse.

Then, the chopper pulse is continuously output during the width of the drive pulse SP, that is, the drive pulse output period. In the waveform (1), the drive pulse SP is continuously output for 3.0 ms, and then the output is stopped.

The waveform (2) represents a case in which the detection signal CS is obtained in 3.5 ms and the rotation determination is made (FIG. 42: Step S92 and Step S93). In this waveform, the drive pulse SP is continuously output for 4.0 ms, and then the output is stopped.

The waveform (3) represents a case in which the detection signal CS is obtained in 3.5 ms and the rotation determination is made (FIG. 42: Step S94 and Step S95). In this waveform, the drive pulse SP is continuously output for 5.0 ms, and then the output is stopped.

The waveform (4) represents a case in which the detection signal CS is not obtained in 3.5 ms and the stop determination is made (FIG. 42: Step S96). In this waveform, the drive pulse SP is continuously output for 5.0 ms, which is the upper limit value, and then the output is stopped. Then, the correction pulse FP is further output after an elapse of 32 ms from the start of the output of the drive pulse SP. In the correction pulse FP, a continuous signal having a width of 5.0 ms is output, and then a chopper pulse having a rank of 8/16 is continuously output for 4.0 ms. However, the specific structure of the correction pulse FP is not particularly limited.

The detection pulse CP represents a timing to output the detection pulse CP from the start of the output to the time point of 5.0 ms, which is the upper limit value of the drive pulse output period. In the illustrated example, the detection pulse CP is output for each 0.5 ms, and hence nine detection pulses are output at the maximum.

Figure 44:
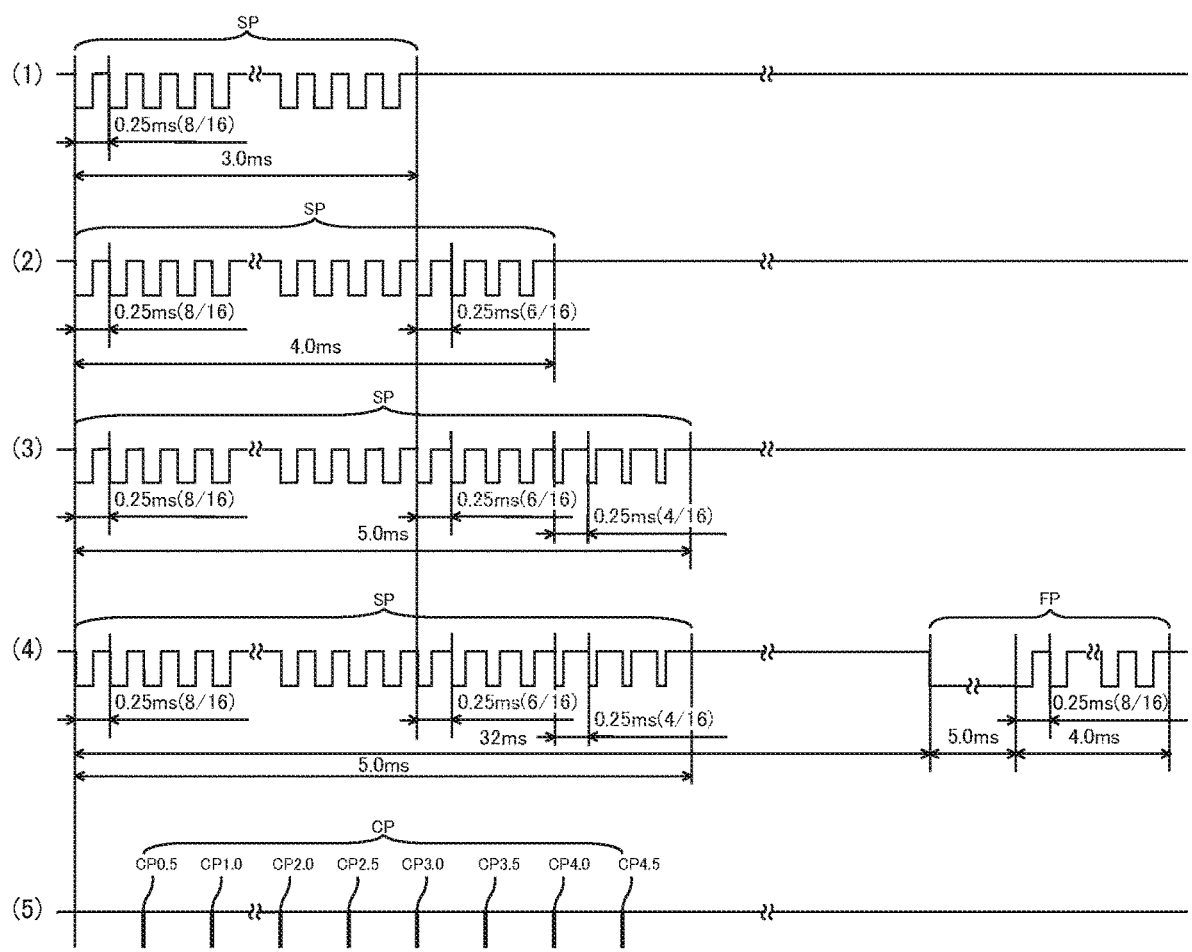
FIG. 44 is another example of the waveform chart of pulses to be output to the coil of Modification Example 4 of the fourth embodiment of the present invention.

FIG. 44 is a chart for illustrating another example of the drive pulse SP to be output in this modification. In the another example, as the period in which the drive pulse SP is output is increased, the rank of the chopper pulse to be used as the drive pulse SP is changed to be lowered. That is, the rank of the chopper pulse forming the drive pulse SP is changed as the time elapses. Specifically, the rank is lowered as the time elapses.

In the drive pulse SP having a width of 3.0 ms of the waveform (1), the rank of the chopper pulse is not changed, and the rank of the chopper pulse forming the drive pulse SP is 8/16 throughout the whole period.

In the drive pulse SP having a width of 4.0 ms of the waveform (2), the rank of the chopper pulse output after exceeding the time point of 3.0 ms is lowered to 6/16. Therefore, the drive pulse SP has a rank of 8/16 from 0 ms to 3.0 ms, and a rank of 6/16 from 3.0 ms to 4.0 ms. Thus, the rank is lowered as the time elapses.

In the drive pulse SP having a width of 5.0 ms of the waveform (3), the rank of the chopper pulse output after exceeding the time point of 3.0 ms is lowered to 6/16, and further the rank of the chopper pulse output after exceeding the time point of 4.0 ms is lowered to 4/16. In this case, the drive pulse SP has a rank of 8/16 from 0 ms to 3.0 ms, a rank of 6/16 from 3.0 ms to 4.0 ms, and a rank of 4/16 from 4.0 ms to 5.0 ms.

The drive pulse SP having a width of 5.0 ms of the waveform (4) is the same as that of the waveform (3), and the correction pulse FP output after an elapse of 32 ms from the start of the output of the drive pulse SP is also the same as that of the example described above.

As described above, the rank of the chopper pulse forming the drive pulse SP is changed so as to be lowered as the time elapses. In this manner, an abrupt change of power consumption, which may occur when the drive pulse SP is output for a long period, can be suppressed. Further, the torque change amount of the stepper motor 50 generated when the period in which the drive pulse SP is output is changed can be reduced, and hence the change in behavior of the hands during hand movement can be reduced.

Figure 45:
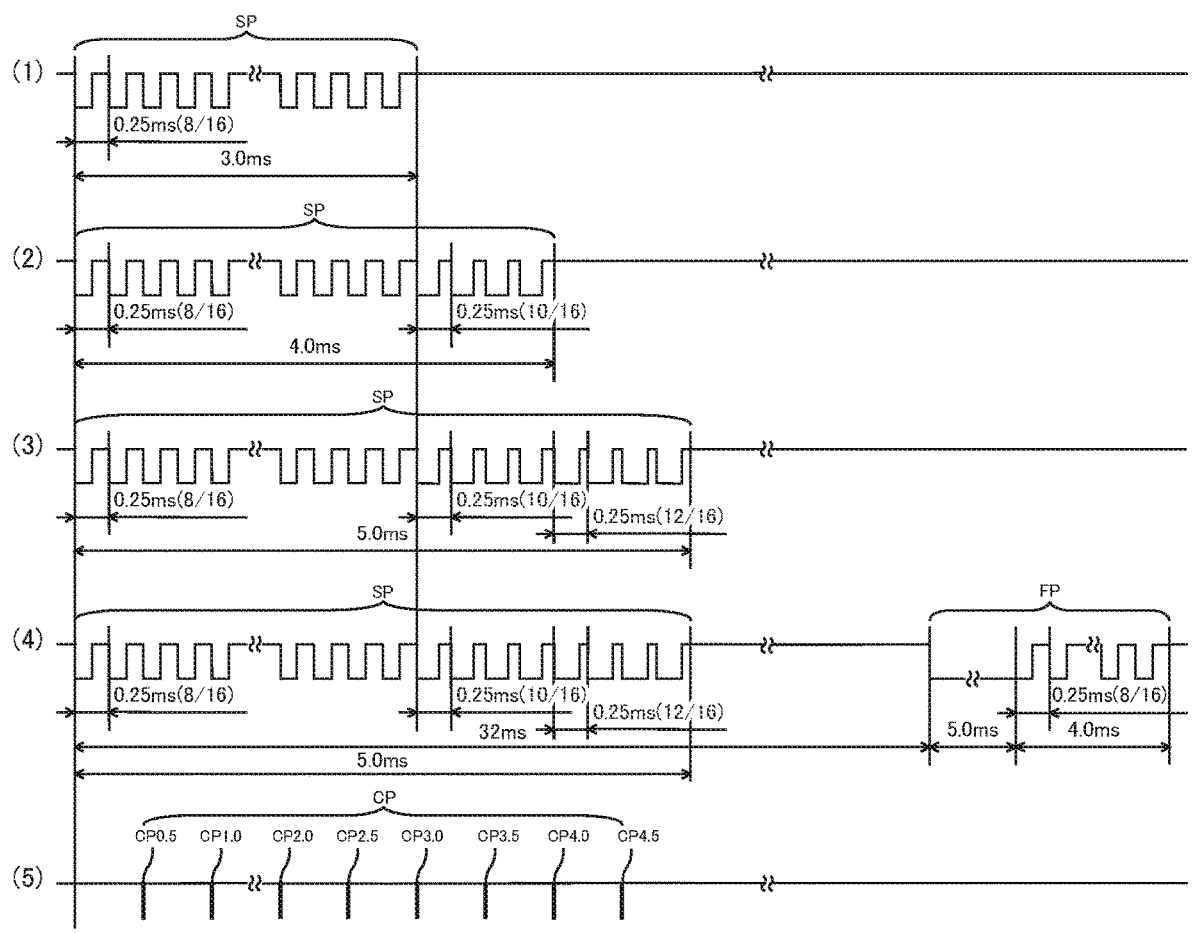
FIG. 45 is further another example of the waveform chart of pulses to be output to the coil of Modification Example 4 of the fourth embodiment of the present invention.

FIG. 45 is a chart for illustrating further another example of the drive pulse SP to be output in this modification. In this example, as the period in which the drive pulse SP is output is increased, the rank of the chopper pulse to be used as the drive pulse SP is changed to be raised. That is, the rank of the chopper pulse forming the drive pulse SP is changed as the time elapses. Specifically, the rank is raised as the time elapses.

In the drive pulse SP having a width of 3.0 ms of the waveform (1), the rank of the chopper pulse forming the drive pulse SP is 8/16 throughout the whole width.

In the drive pulse SP having a width of 4.0 ms of the waveform (2), the rank of the chopper pulse output after exceeding the time point of 3.0 ms is raised to 10/16. Therefore, the drive pulse SP has a rank of 8/16 from 0 ms to 3.0 ms, and a rank of 10/16 from 3.0 ms to 4.0 ms. Thus, the rank is raised as the time elapses.

In the drive pulse SP having a width of 5.0 ms of the waveform (3), the rank of the chopper pulse output after exceeding the time point of 3.0 ms is raised to 10/16, and further the rank of the chopper pulse output after exceeding the time point of 4.0 ms is raised to 12/16. In this case, the drive pulse SP has a rank of 8/16 from 0 ms to 3.0 ms, a rank of 10/16 from 3.0 ms to 4.0 ms, and a rank of 12/16 from 4.0 ms to 5.0 ms.

The drive pulse SP having a width of 5.0 ms of the waveform (4) is the same as that of the waveform (3), and the correction pulse FP output after an elapse of 32 ms from the start of the output of the drive pulse SP is also the same as that of the example described above.

As described above, the rank of the chopper pulse forming the drive pulse SP is changed to be raised as the time elapses. In this manner, the torque change amount of the stepper motor 50 at the time when the drive pulse SP is output for a long period can be increased, and hence the rotor 51 can be easily rotated due to the normal drive pulse SP without the need of the correction pulse FP. Therefore, the rotation determination can be easily obtained with an elapse of a short time period from the start of the output of the drive pulse SP. Thus, this modification is suitable for high-speed rotation of the rotor 51, for example, fast-forwarding of the hands.

[Modification Example 5 of Rotation Detection Operation of Fourth Embodiment: FIG. 29 to FIG. 31, FIG. 46, and FIG. 47]

As another modification example of the rotation detection operation of the fourth embodiment, the stop determination may be made based on the number of regions in which one or more detection signals CS exceeding the predetermined threshold value Vth are successively detected after the drive pulse SP is output. In Modification Example 5 described here, the detection pulse CP is continuously output after the drive pulse SP is output. The stop determination is made when the number of groups of the detection signals CS that are successively detected as exceeding the predetermined threshold value Vth is 0 or 2 or more, and the rotation determination is made when the number is 1.

The timing charts of Modification Example 5 are similar to those of Modification Example 1 of the fourth embodiment, and hence FIG. 29 to FIG. 31 are referred to again. That is, the rotation detection period TC is set to a period from the beginning of the drive pulse output period to a time point at which a considerable period of time has elapsed after an elapse of the drive pulse output period.

At this time, as illustrated in FIG. 29, when the rank of the drive pulse SP is low and thus the rotor 51 is not rotated, as the detection signals CS exceeding the predetermined threshold value Vth, two groups of detection signals CS1 and CS2 are detected from the terminal O2 of the coil A. The detection signals CS1 and the detection signals CS2 each form a group that includes at least one detection signal CS and is formed of successively detected signals. The group of the detection signals may be formed of a single detection signal CS. Then, the stop determination is made when the number of groups of the detection signals CS is 0 (no group is detected) or two or more groups are detected. In this case, the non-rotation of the rotor 51 is correctly detected.

When the rank of the drive pulse SP is raised and thus the rotor 51 is rotated as illustrated in FIG. 30, parts of the waveform of the counter-electromotive force Ia that have been separately generated in the case of FIG. 29 approach each other to be connected, and hence only one group of detection signals CS is detected. That is, the stop determination is not made in this case, and the rotation determination is made. Therefore, the rotation of the rotor 51 is correctly detected.

When the rank of the drive pulse SP is further raised and thus the rotor 51 is rotated as illustrated in FIG. 31, the parts of the waveform of the counter-electromotive force Ia that have been separately generated in the case of FIG. 29 further approach each other as if one mountain is formed, and hence only one group of detection signals CS is detected also in this case. Therefore, the stop determination is not made also in this case, and the rotation determination is made. Therefore, the rotation of the rotor 51 is correctly detected.

Further, the operation of the control circuit 12 in Modification Example 5 may be the same as that illustrated in FIG. 25, or may be that illustrated in FIG. 37 or FIG. 38, which is described in Modification Example 2 of the fourth embodiment.

Further, as a condition for making the rotation determination in Modification Example 5, there may be further added a condition in which the number of detection signals CS included in one group of detection signals is a predetermined number or more. Further, the rotation detection period TC may be started after the drive pulse output period is ended instead of from the time point at which the drive pulse output period is started.

Figure 46:
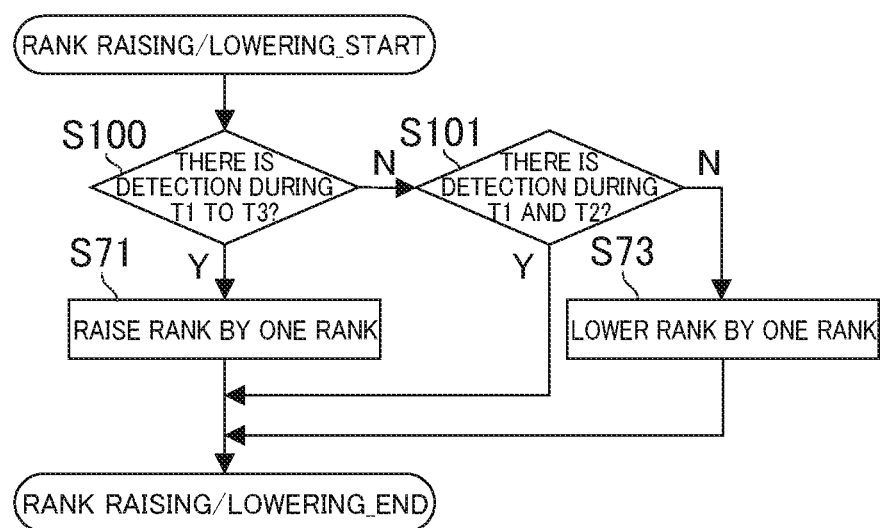
FIG. 46 is a flow chart for illustrating an operation of a drive circuit for a two-coil stepper motor according to Modification Example 5 of the fourth embodiment of the present invention.
Figure 47:
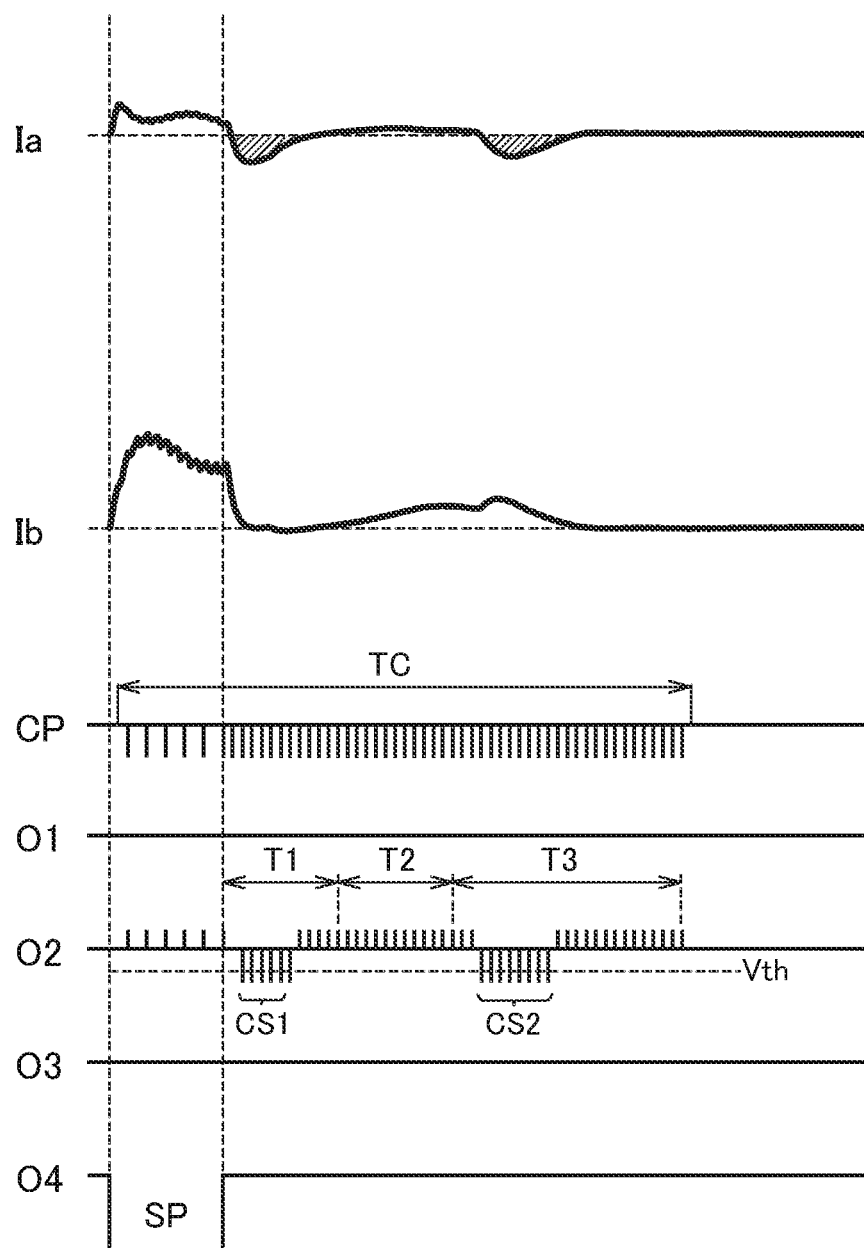
FIG. 47 is a timing chart for illustrating a detection operation performed during non-rotation by the drive circuit for a two-coil stepper motor according to Modification Example 5 of the fourth embodiment of the present invention.
Figure 48:
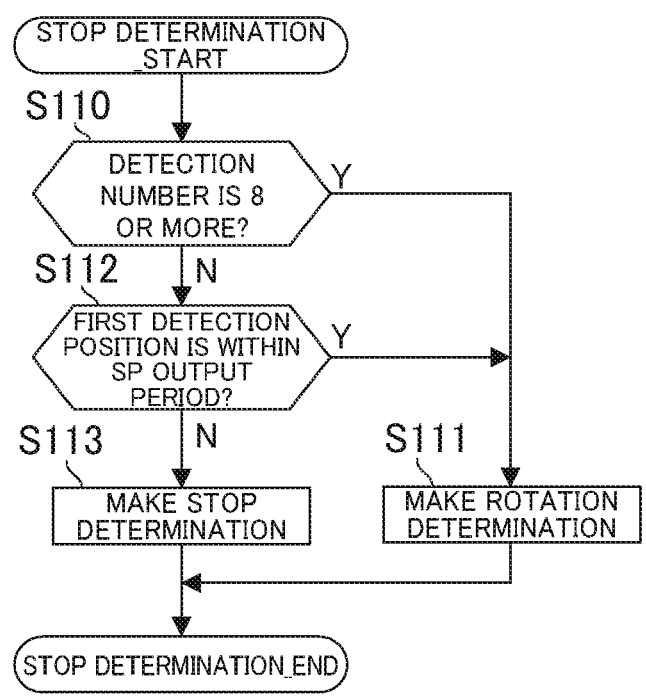
FIG. 48 is a flow chart for illustrating an operation of a drive circuit for a two-coil stepper motor according to Modification Example 7 of the fourth embodiment of the present invention.

Alternatively, the processing of changing the rank of the drive pulse SP (Step S25: rank raising/lowering) in the flow chart of FIG. 37 may be a flow illustrated in FIG. 46. In this flow, as illustrated in FIG. 29 to FIG. 31, the rotation detection period TC is divided into a plurality of individual periods T1, T2, and T3. In this example, the rotation detection period TC is divided into three periods, but the division number may be determined as appropriate. Further, the respective individual periods may have different lengths. In this case, it is assumed that the individual periods are arranged in the order of periods T1, T2, and T3 from the time point at which the drive pulse generation period is ended.

Referring back to FIG. 46, when the stop determination is not made, that is, when the rotation determination is made, it is determined whether or not one group of detection signals is detected across all of the periods T1, T2, and T3 (Step 100: there is detection during T1 to T3?). When one group of detection signals is detected across all of the periods T1 to T3 (determination Y), it is considered that this case corresponds to a state in which, as illustrated in FIG. 30, the rank of the drive pulse SP is weak and unstable although the rotor 51 can be rotated, and hence the rank of the drive pulse SP is raised by one rank (Step 71).

When the one group of detection signals is not detected across all of the periods T1 to T3 (determination N), it is determined whether or not the one group of detection signals is detected across the periods T1 and T2 excluding the last period T3 (Step 100: there is detection during T1 and T2?). When the one group of detection signals is detected across the periods T1 and T2 but is not detected in the period T3 (determination Y), it is considered that the rotor 51 is stably rotated due to the rank of the drive pulse SP and unnecessary drive force is not used. Therefore, the rank of the drive pulse SP is maintained as it is. Meanwhile, when the one group of detection signals is not detected across the periods T1 and T2 (determination N), that is, when the one group of detection signals is detected only in the period T1, it is considered that the state as illustrated in FIG. 31 is obtained and unnecessary power is consumed although the rank of the drive pulse SP is sufficient to rotate the rotor 51. Therefore, the rank of the drive pulse SP is lowered by one rank (Step S73). Even with the above-mentioned control, the rotation detection can be performed by outputting the detection pulse CP to one of the two coils. Further, the rank of the drive pulse SP can be adjusted to an appropriate value so that power can be saved.

Further, the rotation detection operation of Modification Example 5 may be further modified. That is, as illustrated in the timing chart of FIG. 47, at a time point at which the first detection signal CS exceeding the predetermined threshold value Vth is detected during the rotation detection period TC, the cycle of outputting the detection pulse CP may be shortened. In the example illustrated in FIG. 47, at a time point at which the first detection signal CS1 is detected, the cycle of outputting the detection pulse CP is changed to ½.

In this manner, the sensitivity of the rotation detection can be increased, and the possibility of false detection can be reduced. That is, when there are two or more detection signal groups, the stop determination is required to be made in Modification Example 5, but the two or more detection signal groups may approach each other depending on conditions, and the two or more detection signal groups may look like one detection signal group depending on the cycle of outputting the detection pulse CP. Such false detection can be prevented by shortening the cycle of outputting the detection pulse CP.

[Modification Example 6 of Rotation Detection Operation of Fourth Embodiment: FIG. 29 to FIG. 31]

As another modification example of the rotation detection operation of the fourth embodiment, the stop determination may be made based on the number of detection signals CS detected as exceeding the predetermined threshold value Vth after the drive pulse SP is output. That is, the stop determination is made when the number of detection signals CS detected as exceeding the predetermined threshold value Vth does not reach a predetermined number, and the rotation determination is made when the number is the predetermined number or more. In this case, the predetermined number is set to 8.

The timing charts of Modification Example 6 are similar to those of Modification Example 1 of the fourth embodiment, and hence FIG. 29 to FIG. 31 are referred to again. That is, the rotation detection period TC is set to a period from the beginning of the drive pulse output period to a time point at which a considerable period of time has elapsed after an elapse of the drive pulse output period.

At this time, as illustrated in FIG. 29, when the rank of the drive pulse SP is low and thus the rotor 51 is not rotated, the number of detection signals CS detected as exceeding the predetermined threshold value Vth from the terminal O2 of the coil A is 7. Therefore, the number of detection signals CS does not reach 8 being the predetermined number, and hence the stop determination is made. In this case, the non-rotation of the rotor 51 is correctly detected.

When the rank of the drive pulse SP is raised and thus the rotor 51 is rotated as illustrated in FIG. 30, the waveform of the counter-electromotive force Ia in the negative direction appears for a long period, and hence the number of detection signals CS exceeding the predetermined threshold value Vth is increased. The number of detection signals CS exceeding the predetermined threshold value Vth is 15 in the illustrated example. That is, the stop determination is not made in this case, and the rotation determination is made. Therefore, the rotation of the rotor 51 is correctly detected.

Further, when the rank of the drive pulse SP is further raised and thus the rotor 51 is rotated as illustrated in FIG. 31, the strength of the waveform of the counter-electromotive force Ia in the negative direction is increased, but the period itself in which the waveform appears is shortened. Therefore, in the illustrated example, the number of detection signals CS exceeding the predetermined threshold value Vth is 7, and the stop determination is made even though the rotor 51 is rotated.

Further, the operation of the control circuit 12 in Modification Example 6 may be the same as that illustrated in FIG. 25, or may be that illustrated in FIG. 37 or FIG. 38, which is described in Modification Example 2 of the fourth embodiment. In this case, when the stop determination is made due to the high rank of the drive pulse SP, the rank of the drive pulse SP is further raised because Step S32 illustrated in FIG. 25 is repeatedly executed, but when the rank reaches the maximum rank, Step S31 to Step S33 are executed so that the minimum rank is obtained. After that, the rank is raised again step by step from the minimum rank, and thus an appropriate rank is selected.

In Modification Example 6, the rotation detection may be ended at a time point at which a predetermined number of detection signals CS exceeding the predetermined threshold value Vth is detected. That is, the output of the detection pulse CP is stopped, and the rotation determination is made.

Further, as in Modification Example 5 of the fourth embodiment, the processing of changing the rank of the drive pulse SP (Step S25: rank raising/lowering) in the flow chart of FIG. 37 may be the flow illustrated in FIG. 46, and as described above, the rotation detection period may be divided into a plurality of individual periods so that the rank of the drive pulse SP is changed based on the presence/absence of the detection signal CS in each period.

[Modification Example 7 of Rotation Detection Operation of Fourth Embodiment: FIG. 25, FIG. 29 to FIG. 31, FIG. 37, FIG. 38, and FIG. 48]

As another modification example of the fourth embodiment, description is given of Modification Example 7 corresponding to a combination of Modification Example 6 of the fourth embodiment and Modification Example 1 of the fourth embodiment that have been already described. That is, in Modification Example 7, first, in accordance with Modification Example 6 of the fourth embodiment, the rotation determination is made when the number of detection signals CS detected as exceeding the predetermined threshold value Vth is a predetermined number or more. Meanwhile, when the number of detected detection signals CS does not reach the predetermined number, without immediately making the stop determination, in accordance with Modification Example 1 of the fourth embodiment, the rotation determination is made when the detection signal CS detected first falls within the drive pulse generation period, and the stop determination is made only when the detection signal CS detected first is outside of the drive pulse generation period. In this case, the predetermined number is set to 8 similarly to Modification Example 6 described above.

Further, the timing charts of Modification Example 7 are similar to those of Modification Example 1 of the fourth embodiment, and hence FIG. 29 to FIG. 31 are referred to again. The rotation detection period TC is set to a period from the beginning of the drive pulse output period to a time point at which a considerable period of time has elapsed after an elapse of the drive pulse output period.

Further, the operation of the control circuit 12 in Modification Example 7 may be the same as that illustrated in FIG. 25, or may be that illustrated in FIG. 37 or FIG. 38, which is described in Modification Example 2 of the fourth embodiment. At this time, the flow for making the stop determination, which is shown as Step 22 in FIG. 25 or FIG. 37, is performed as in the flow chart of FIG. 48 in Modification Example 7.

That is, after the stop determination is started, first, it is determined whether or not the number of detection signals CS exceeding the predetermined threshold value Vth is 8 or more (Step S110: detection number is 8 or more?). When the number of detection signals CS is 8 or more (determination Y), similarly to the case described in Modification Example 6, the rotation determination is immediately made (Step S111: make rotation determination).

When the number of detection signals CS does not reach 8 (Step S110: determination N), it is determined whether or not the position of the first detection signal CS exceeding the predetermined threshold value Vth is within the drive pulse output period (Step S112: first detection position is within SP output period?). When the position of the first detection signal CS is within the drive pulse output period (determination Y), similarly to the case described in Modification Example 1, the rotation determination is made (Step S111).

When the position of the first detection signal CS is outside of the drive pulse output period (Step S112: determination N), the stop determination is made (Step S113: make stop determination).

According to Modification Example 7, when the rank of the drive pulse SP is low and thus the rotor 51 is not rotated as illustrated in FIG. 29, seven detection signals CS exceeding the predetermined threshold value Vth are detected from the terminal O2 of the coil A, and hence the rotation determination is not made. Further, the position of the detection signal CS that is first detected is after the end of the drive pulse output period. Therefore, the rotation determination is still not made, and the stop determination is made. In this case, the non-rotation of the rotor 51 is correctly detected.

When the rank of the drive pulse SP is raised and thus the rotor 51 is rotated as illustrated in FIG. 30, the number of detection signals CS exceeding the predetermined threshold value Vth is 15, which is larger than 8 being the predetermined number. Therefore, the rotation determination is immediately made in this case, and hence the rotation of the rotor 51 is correctly detected.

Further, when the rank of the drive pulse SP is further raised and thus the rotor 51 is rotated as illustrated in FIG. 31, the number of detection signals CS exceeding the predetermined threshold value Vth is 7, and the rotation determination is not yet made at this time point. However, the position of the detection signal CS that is detected first is within the drive pulse output period. As a result, the rotation determination is made, and the rotation of the rotor 51 is correctly detected in this case.

As described above, in Modification Example 7, correct rotation determination can be made even in conditions that cause false determination in Modification Example 1 and Modification Example 6 (conditions that cause stop determination even though the rotor 51 is rotated). Thus, the accuracy of the rotation detection is improved.

The order of the combination may be reversed. For example, in the flow chart of FIG. 48, the order of Step S110 and Step S112 may be reversed so that the rotation determination is immediately made when the position of the detection signal CS that is detected first is within the drive pulse output period, and otherwise, the number of detection signals CS is determined.

As described above, according to the fourth embodiment, the rotation detection of the rotor 51 can be performed based on the result of detection of the detection signal CS generated from the other coil that is different from the drive coil. In addition, the rotor 51 can be certainly rotated, and the power consumption can be suppressed to be low.

Fifth Embodiment

[Description of Rotation Detection Operation of Fifth Embodiment: FIG. 49 to FIG. 52]

Figure 49:
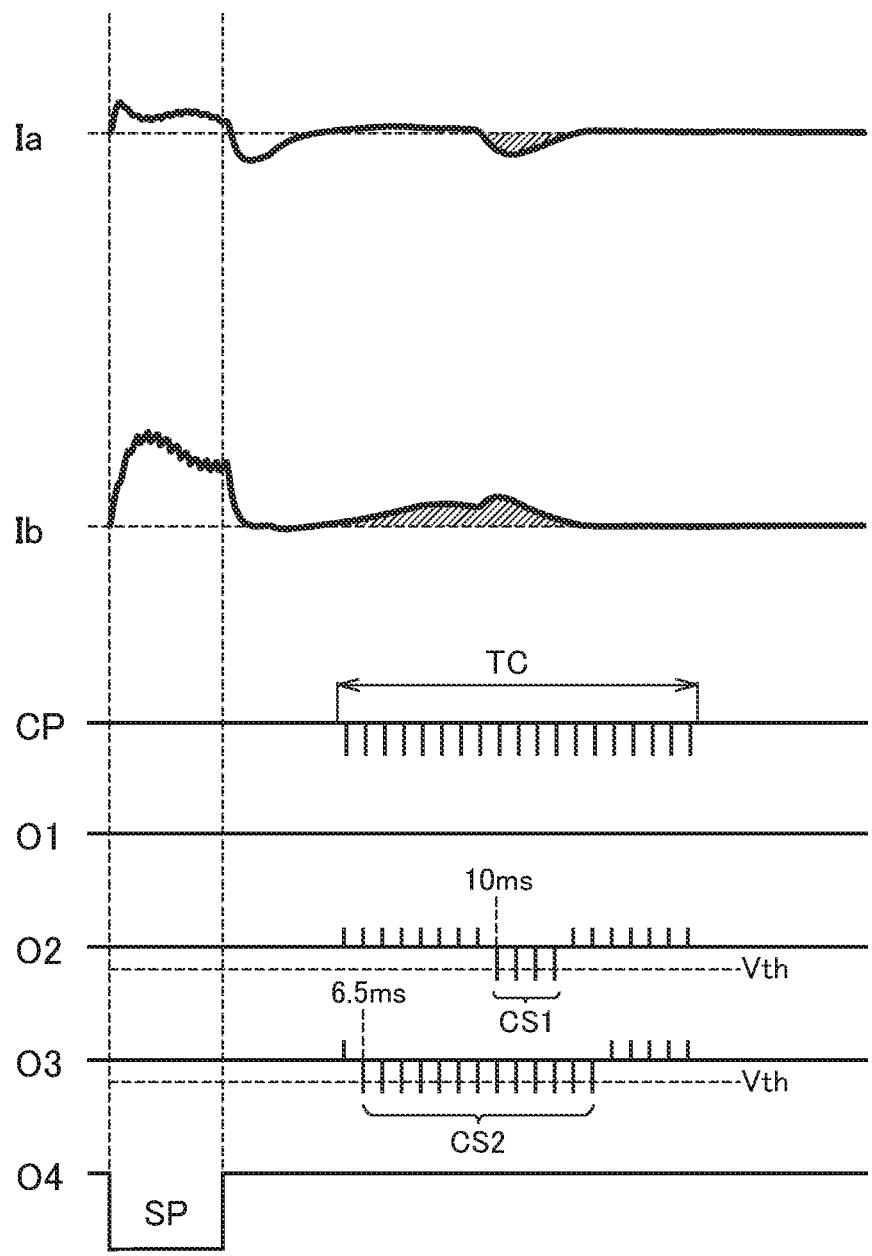
FIG. 49 is a timing chart for illustrating a detection operation performed during non-rotation by a drive circuit for a two-coil stepper motor according to a fifth embodiment of the present invention.
Figure 50:
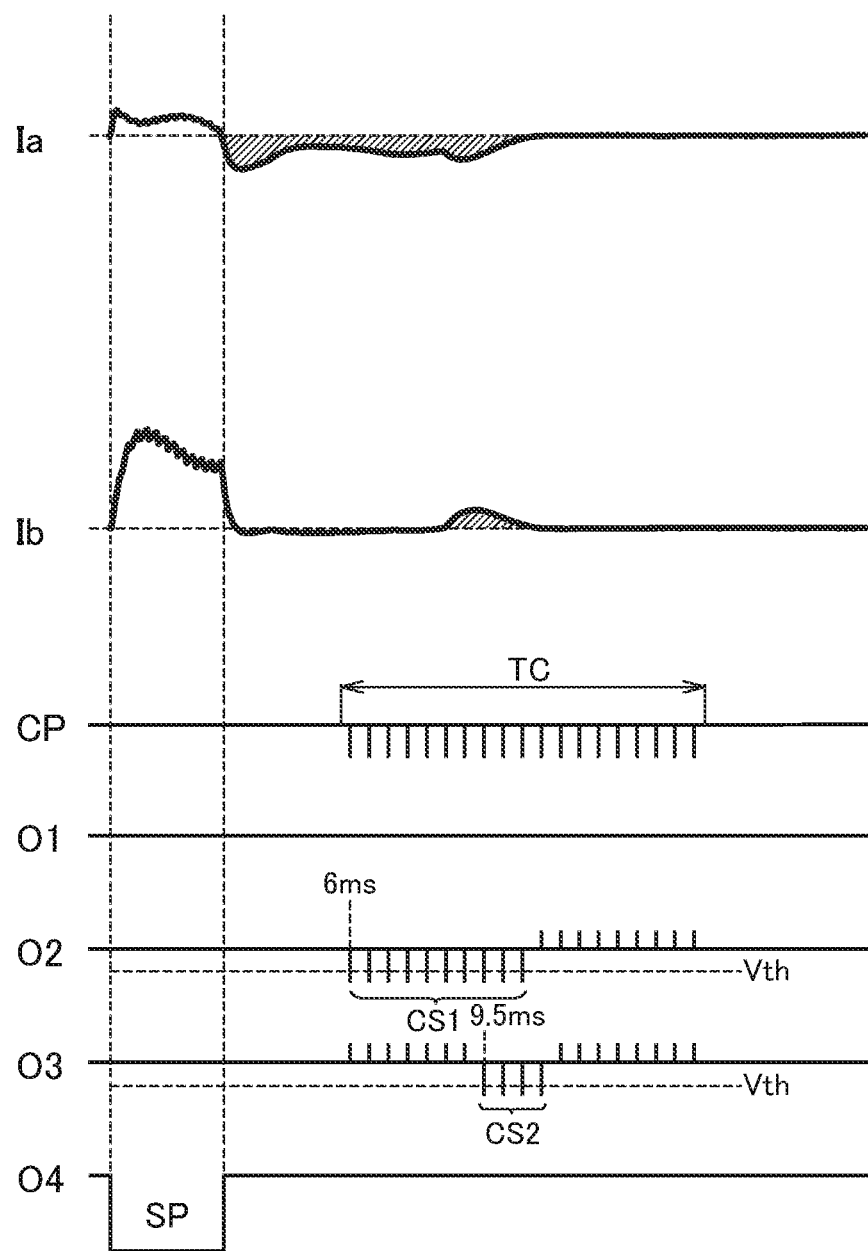
FIG. 50 is a timing chart for illustrating a detection operation performed during rotation by the drive circuit for a two-coil stepper motor according to the fifth embodiment of the present invention.
Figure 51:
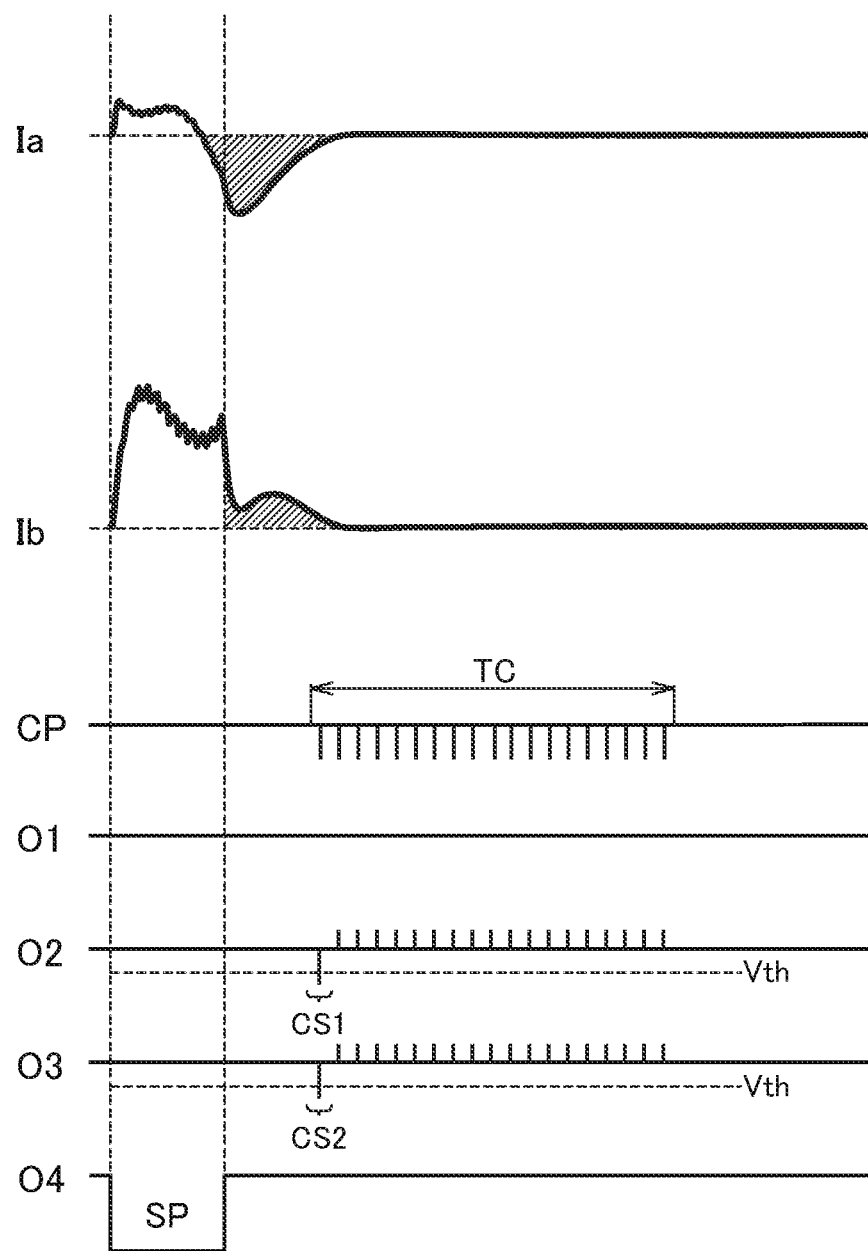
FIG. 51 is a timing chart for illustrating a detection operation performed during rotation by the drive circuit for a two-coil stepper motor according to the fifth embodiment of the present invention.

Next, with reference to the timing charts of FIG. 49 to FIG. 51, the rotation detection operation in the fifth embodiment is described. The fifth embodiment differs from the fourth embodiment described above in that the detection pulse CP is output to both of the coil A and the coil B, and the rotation detection of the rotor 51 of the stepper motor 50 is performed based on the detection signals CS obtained from the respective coils. The first example described as the fifth embodiment is similar to the first embodiment described above in that the rotation detection is performed based on the difference between total numbers of detection signals CS obtained from the respective coils. The configuration of the drive circuit 10 and the stepper motor to be used are similar to those of the first embodiment (see FIG. 1, FIG. 2, and FIG. 4) as in the embodiments described so far.

First, there is considered a case in which the drive pulse SP is output to the terminal O4 of the coil B in order to rotate the rotor 51 in the forward direction. At this time, the detection pulse CP is output to the terminal O2 for the coil A and to the terminal O3 for the coil B. Further, the rotation detection period TC is set so as to start after an elapse of 5 ms from the end of the output of the drive pulse SP, and the counter-electromotive forces Ia and Ib generated immediately after the output of the drive pulse SP are not detected.

Similarly to FIG. 26 referred to above, FIG. 49 is a timing chart of a case in which the rank of the drive pulse SP is low and thus the rotor 51 is not rotated. At this time, four detection signals CS1 exceeding the predetermined threshold value Vth are detected from the terminal O2 of the coil A, and thirteen detection signals CS2 are detected from the terminal O3 of the coil B to which the drive pulse SP is output. CS1<CS2 is obtained when the numbers are compared. The difference therebetween is 9.

Similarly to FIG. 27 referred to above, FIG. 50 is a timing chart of a case in which the rank of the drive pulse SP is raised and thus the rotor 51 is rotated. At this time, ten detection signals CS1 exceeding the predetermined threshold value Vth are detected from the terminal O2 of the coil A, and four detection signals CS2 are detected from the terminal O3 of the coil B to which the drive pulse SP is output. CS1>CS2 is obtained when the numbers are compared. The difference therebetween is 6.

Similarly to FIG. 28 referred to above, FIG. 51 is a timing chart of a case in which the rank of the drive pulse SP is further raised and thus the rotor 51 is rotated. At this time, the detection signal CS1 exceeding the predetermined threshold value Vth is detected from the terminal O2 of the coil A and the detection signal CS2 is detected from the terminal O3 of the coil B to which the drive pulse SP is output, but the detection signal CS1 and the detection signal CS2 are both detected only at the beginning of the rotation detection period TC. Further, the number of detection signals CS1 and the number of detection signals CS2 are equal to each other, which is 1.

Figure 52:
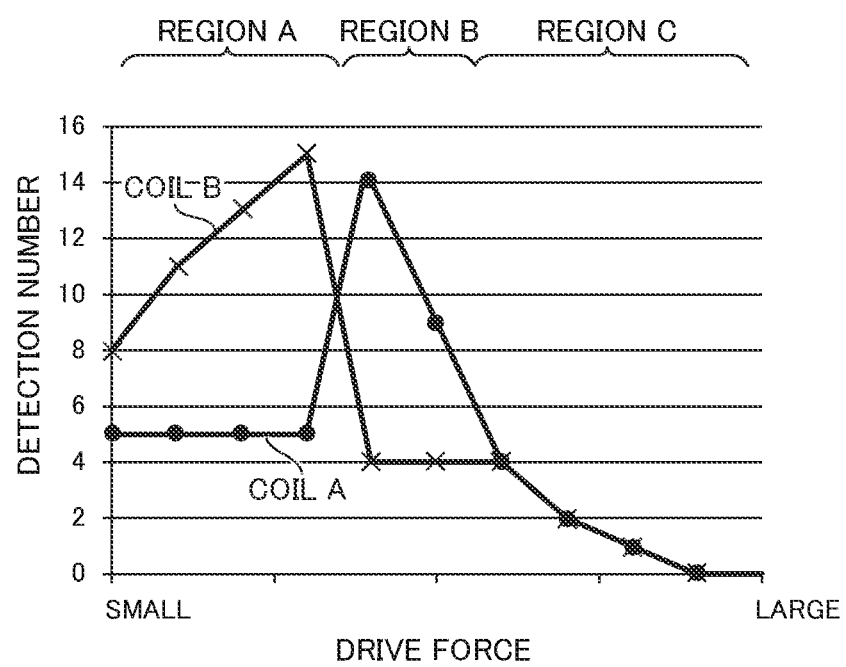
FIG. 52 is a schematic graph for showing change in numbers of detection signals CS1 and detection signals CS2 that can be detected by a coil A and a coil B, respectively, with respect to a drive force of a drive pulse SP.

FIG. 52 is a schematic graph for showing the change in numbers of detection signals CS1 and CS2 that can be detected from the respective coils A and B with respect to the drive force of the drive pulse SP. As is clear from the graph, in a region A in which the drive force is small, the number of detection signals CS2 detected in the coil B is larger than the number of detection signals CS1 detected in the coil A. Further, in the region A, the rotor 51 fails to rotate due to the insufficient drive force, and thus is not rotated. The region A corresponds to the timing chart of FIG. 49.

As the drive force is increased to enter a region B, the number of detection signals CS1 detected in the coil A is abruptly increased, and the number of detection signals CS2 detected in the coil B is abruptly decreased. Thus, the number of detection signals CS1 exceeds the number of detection signals CS2. In the region B, the rotor 51 is rotated. The region B corresponds to the timing chart of FIG. 50.

As the drive force is further increased to enter a region C, the numbers of detection signals CS1 and CS2 detected in the respective coils A and B are both decreased so that there is no difference therebetween. In the region C, the rotor 51 is rotated, but it is considered that unnecessary drive force is applied. The region C corresponds to the timing chart of FIG. 51.

In the fifth embodiment, the difference between numbers of detection signals CS1 and detection signals CS2 is used in the rotation detection. The rotation determination is made when CS1>CS2 is satisfied, that is, when the number of detection signals CS1 detected in the coil to which the drive pulse SP is not output exceeds the number of detection signals CS2 detected in the coil to which the drive pulse SP is output, and otherwise, the stop determination is made. That is, the stop determination is made in the regions A and C of FIG. 52, and the rotation determination is made in the region B.

In the fifth embodiment, the rank of the drive pulse SP is adjusted based on the stop determination. Specifically, the control circuit 12 may perform the same control as that illustrated in FIG. 25 in the fourth embodiment, or that illustrated in FIG. 37 or FIG. 38, which is described in Modification Example 2 of the fourth embodiment. In the fifth embodiment, when the drive force of the drive pulse SP is in the region C of FIG. 52, the stop determination is made due to the high rank of the drive pulse SP, and thus the rank of the drive pulse SP is further raised. However, similarly to the case described in Modification Example 6 of the fourth embodiment, when the rank reaches the maximum rank, the rank of the drive pulse SP is lowered to the minimum rank, and thus an appropriate rank is finally selected.

In the fifth embodiment, a margin may be provided for the rotation determination. For example, the rotation determination may be made when the number of detection signals CS1 detected in the coil to which the drive pulse SP is not output is larger than the number of detection signals CS2 detected in the coil to which the drive pulse SP is output by a predetermined number or more. The predetermined number is, for example, 1 to 3.

Further, as described in Modification Example 5 of the fourth embodiment and illustrated in the flow chart of FIG. 46, the rotation detection period TC may be divided into a plurality of individual periods T1, T2, and T3, and the rank of the drive pulse SP may be changed based on the presence/absence of the detection signal CS in each period.

[Modification Example 1 of Rotation Detection Operation of Fifth Embodiment: FIG. 49 to FIG. 52]

Various modifications can be made to the rotation detection operation of the fifth embodiment. Modification Example 1 described here is similar to the second embodiment, and the rotation detection is performed based on the timing at which the detection signal CS is first obtained in each of the coils. The timing charts at this time are the same as those of the fifth embodiment described above, and hence FIG. 49 to FIG. 51 are referred to again.

As illustrated in FIG. 49, when the rank of the drive pulse SP is low and thus the rotor 51 is not rotated, the timing at which the detection signal CS1 is first obtained is after an elapse of 10 ms from the start of the output of the drive pulse SP, and the timing at which the detection signal CS2 is first obtained is after an elapse of 6.5 ms from the start of the output of the drive pulse SP. Thus, the detection signal CS2 on the side of the coil B to which the drive pulse SP is output is detected earlier.

As illustrated in FIG. 50, when the rank of the drive pulse SP is raised and thus the rotor 51 is rotated, the relationship of the two detection signals is reversed. The detection signal CS1 is detected after an elapse of 6 ms from the start of the output of the drive pulse SP, and the detection signal CS2 is detected after an elapse of 9.5 ms from the start of the output of the drive pulse SP. Therefore, the detection signal CS1 on the side of the coil A to which the drive pulse SP is not output is detected earlier.

As illustrated in FIG. 51, when the rank of the drive pulse SP is further raised and thus the rotor 51 is rotated, the detection signals CS1 and CS2 are detected as soon as the rotation detection period TC is started, and there is no difference in detection timing therebetween.

In Modification Example 1 of the fifth embodiment, the difference in timing to detect the detection signal CS1 and the detection signal CS2 is used in the rotation detection. The rotation determination is made when CS1>CS2 is satisfied, that is, the timing at which the detection signal CS1 is first detected in the coil to which the drive pulse SP is not output is earlier than the timing at which the detection signal CS2 is first detected in the coil to which the drive pulse SP is output, and otherwise, the stop determination is made. Also in Modification Example 1, similarly to the fifth embodiment, the stop determination is made in the regions A and C of FIG. 52, and the rotation determination is made in the region B.

Also in Modification Example 1, the rank of the drive pulse SP is adjusted based on the stop determination. That is, the control circuit 12 may perform the same control as that illustrated in FIG. 25 in the fourth embodiment, or that illustrated in FIG. 37 or FIG. 38, which is described in Modification Example 2 of the fourth embodiment. Also in Modification Example 1, when the drive force of the drive pulse SP is in the region C of FIG. 52, the stop determination is made due to the high rank of the drive pulse SP, and thus the rank of the drive pulse SP is further raised. However, similarly to the case described in Modification Example 6 of the fourth embodiment, when the rank reaches the maximum rank, the rank of the drive pulse SP is lowered to the minimum rank, and thus an appropriate rank is finally selected.

Also in Modification Example 1, a margin may be provided for the timing determination. For example, the rotation determination may be made when the timing at which the detection signal CS1 is first detected in the coil to which the drive pulse SP is not output is earlier than the timing at which the detection signal CS is first detected in the coil to which the drive pulse SP is output by a predetermined time period or more. The predetermined time period is, for example, 1 ms to 3 ms.

Further, similarly to the above, as described in Modification Example 5 of the fourth embodiment and illustrated in the flow chart of FIG. 46, the rotation detection period TC may be divided into a plurality of individual periods T1, T2, and T3, and the rank of the drive pulse SP may be changed based on the presence/absence of the detection signal CS in each period.

Figure 53:
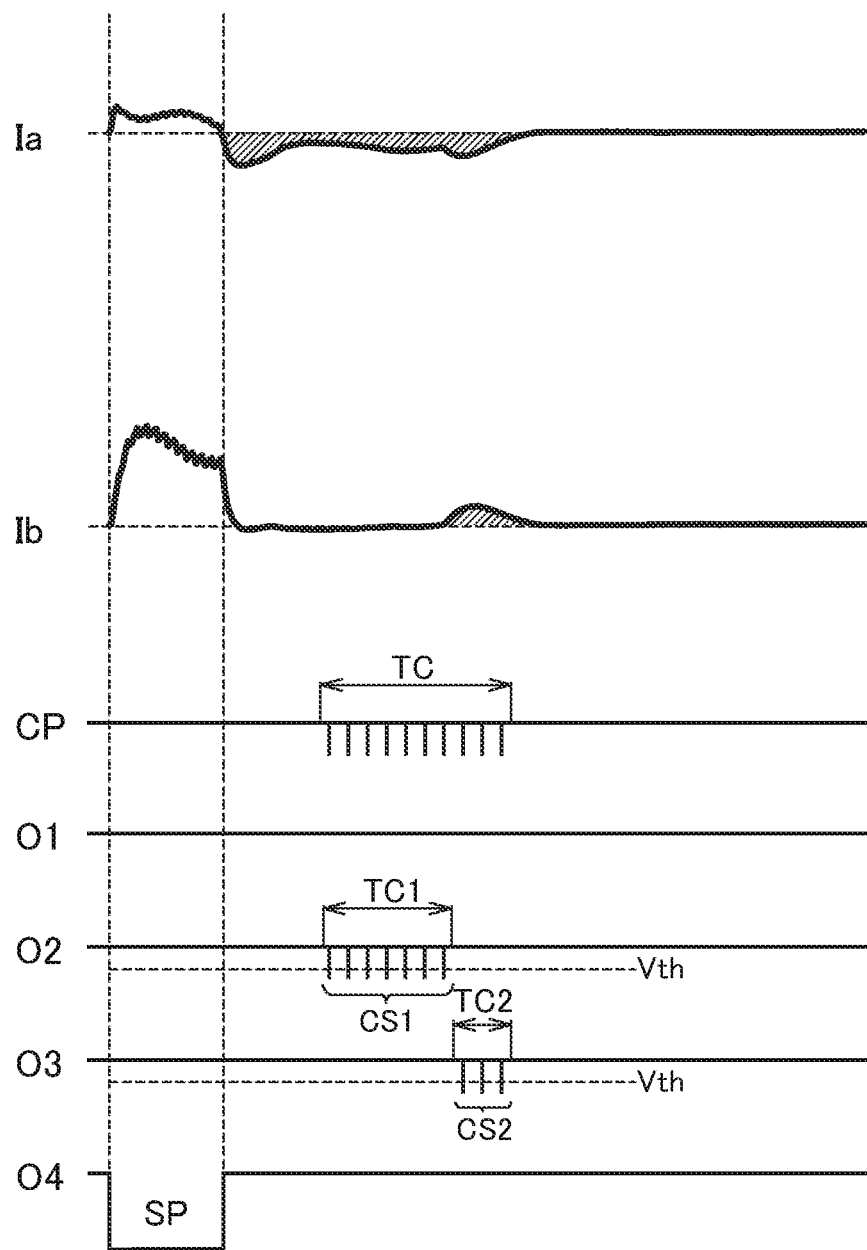
FIG. 53 is a timing chart for illustrating a detection operation performed during rotation by a drive circuit for a two-coil stepper motor according to Modification Example 2 of the fifth embodiment of the present invention.
Figure 54:
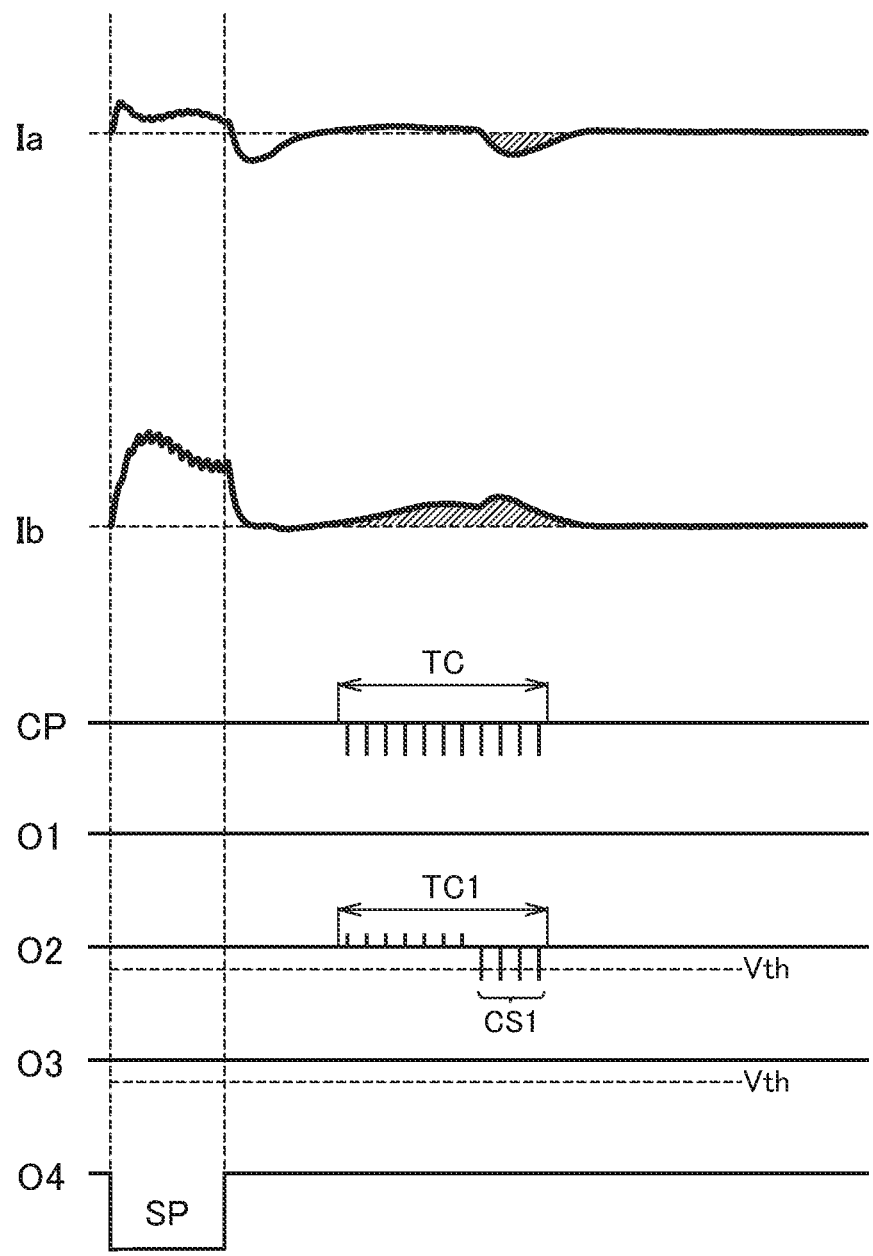
FIG. 54 is a timing chart for illustrating a detection operation performed during non-rotation by the drive circuit for a two-coil stepper motor according to Modification Example 2 of the fifth embodiment of the present invention.
Figure 55:
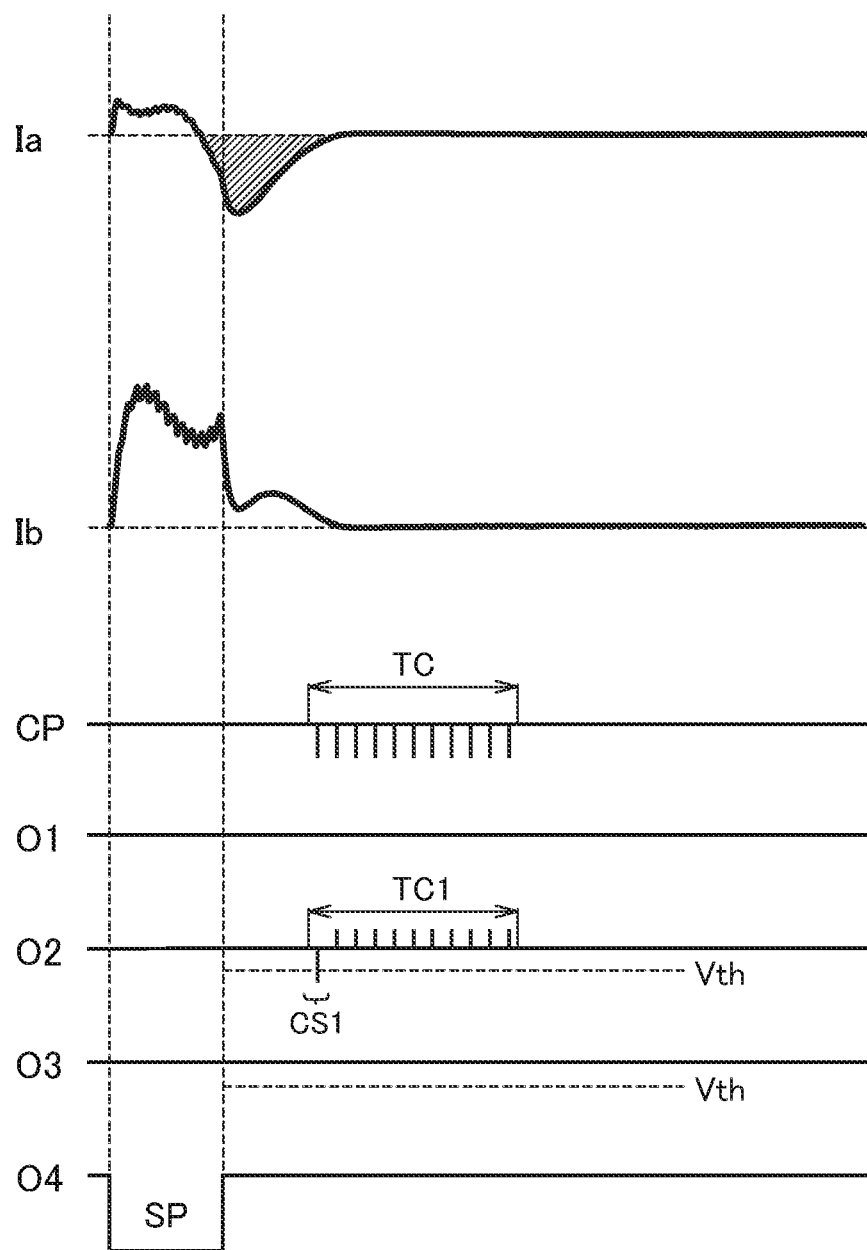
FIG. 55 is a timing chart for illustrating a detection operation performed during rotation by the drive circuit for a two-coil stepper motor according to Modification Example 2 of the fifth embodiment of the present invention.

[Modification Example 2 of Rotation Detection Operation of Fifth Embodiment: FIG. 53 to FIG. 55]

Another modification example of the rotation detection operation of the fifth embodiment is described. In Modification Example 2 described here, the rotation detection period TC is divided into a first rotation detection period TC1 and a second rotation detection period TC2, and the rotation detection is performed by outputting the detection pulse to different coils in the respective different rotation detection periods.

In this case, the first rotation detection period TC1 is allocated to the front side of the rotation detection period TC. When it is assumed that the rotation detection period TC is set to be started after an elapse of 6 ms from the output of the drive pulse SP, the first rotation detection period TC1 is also started after an elapse of 6 ms from the output of the drive pulse SP.

Further, when a given condition is satisfied in the first rotation detection period TC1, the process shifts to the second rotation detection period TC2. The given condition in the first rotation detection period TC1 corresponds to detection of the detection signals CS1 a predetermined number of times within a predetermined period in the coil to which the drive pulse SP is not output (in this case, the coil A). As an example, when the predetermined period is set to 5 ms, the cycle of outputting the detection pulse is set to 0.5 ms, and the predetermined number of times is set to 7, the condition corresponds to detection of seven detection signals CS1 until ten detection pulses are output from the start of the first rotation period TC1.

The stop determination is made when this condition is not satisfied, and the process immediately shifts to the second rotation detection period TC2 when the condition is satisfied.

Also in the second rotation detection period TC2, it is determined whether or not a given condition is satisfied. The stop determination is made when the given condition is not satisfied, and the rotation determination is made when the given condition is satisfied. The given condition in the second rotation detection period TC2 corresponds to detection of the detection signals CS2 a predetermined number of times within a predetermined period in the coil to which the drive pulse SP is output (in this case, the coil B). As an example, when the predetermined period is set to 3 ms and the predetermined number of times is set to 3, the condition corresponds to detection of three detection signals CS2 until six detection pulses are output from the start of the second rotation detection period TC2.

The rotation detection operation using those conditions is described with reference to the timing chart of FIG. 53. FIG. 53 corresponds to FIG. 50 of Modification Example 1, and represents a case in which the rank of the drive pulse SP is raised and thus the rotor 51 is rotated. Further, this state corresponds to the state in the region B in the case of FIG. 52.

At this time, the first rotation detection period TC1 is started after an elapse of 6 ms from the output of the drive pulse SP, and the detection pulse CP is output to the terminal O2 of the coil A. As a result, seven detection signals CS1 exceeding the predetermined threshold value Vth are successively detected, and the given condition in the first rotation detection period TC1 is satisfied.

The second rotation period TC2 is immediately started, and the detection pulse CP is output to the terminal O3 of the coil B. As a result, three detection signals CS2 exceeding the predetermined threshold value Vth are successively detected, and the given condition in the second rotation detection period TC2 is also satisfied. Therefore, the rotation detection period TC is ended at this time point, and the rotation determination is correctly made.

In contrast, the rotation detection operation in the timing chart of FIG. 54 is described. FIG. 54 corresponds to FIG. 49 referred to above, and represents a case in which the rank of the drive pulse SP is low and thus the rotor 51 is not rotated. Further, this state corresponds to the state in the region A in the case of FIG. 52.

At this time, the first rotation detection period TC1 is started after an elapse of 6 ms from the output of the drive pulse SP, and the detection pulse CP is output to the terminal O2 of the coil A. In the illustrated example, the detection signal exceeding the predetermined threshold value Vth cannot be obtained for the seven detection pulses CP, and four detection signals CS1 are successively detected finally after an elapse of 9.5 ms from the output of the drive pulse SP.

However, the predetermined period of the first rotation detection period TC1, which is 5 ms, has elapsed at this time point. Therefore, the given condition is not satisfied, and the first rotation detection period TC1 is ended. Further, the condition is not satisfied, and hence the process does not shift to the second rotation detection period TC2, and the rotation detection period TC itself is ended. Then, as a result of the rotation detection, the stop determination is made, and thus the determination on rotation is correctly made.

Further, the rotation detection operation in the timing chart of FIG. 55 is described. FIG. 52 corresponds to FIG. 51 referred to above, and represents a case in which the rank of the drive pulse SP is further raised and thus the rotor 51 is rotated. Further, this state corresponds to the state in the region C in the case of FIG. 52.

At this time, the first rotation detection period TC1 is started after an elapse of 6 ms from the output of the drive pulse SP, and the detection pulse CP is output to the terminal O2 of the coil A. In the illustrated example, the detection signal CS1 exceeding the predetermined threshold value Vth is obtained for the first detection pulse CP, but the detection signal cannot be obtained thereafter. As a result, the predetermined period of the first rotation detection period TC1, which is 5 ms, elapses under a state in which only one detection signal CS1 is detected. Therefore, the given condition is not satisfied, and the first rotation detection period TC1 is ended. The process does not shift to the second rotation detection period TC2, and the rotation detection period TC itself is ended. Then, the stop determination is made as a result of the rotation detection.

That is, in this case, the stop determination is made even though the rotor 51 is rotated. That is, also in Modification Example 2, similarly to the fifth embodiment and Modification Example 1 of the fifth embodiment, the stop determination is made in the regions A and C of FIG. 52, and the rotation determination is made in the region B.

Also in Modification Example 2, the rank of the drive pulse SP is adjusted based on the stop determination. Specifically, the control circuit 12 may perform the same control as that illustrated in FIG. 25 in the fourth embodiment, or that illustrated in FIG. 37 or FIG. 38, which is described in Modification Example 2 of the fourth embodiment. Also in Modification Example 2, when the drive force of the drive pulse SP is in the region C of FIG. 52, the stop determination is made due to the high rank of the drive pulse SP, and thus the rank of the drive pulse SP is further raised. However, similarly to the case described in Modification Example 6 of the fourth embodiment, when the rank reaches the maximum rank, the rank of the drive pulse SP is lowered to the minimum rank, and thus an appropriate rank is finally selected.

In each of the modification examples of the fifth embodiment, the rank of the drive pulse SP may be selected based on the timing at which the detection of the detection signal CS is ended when the rotation determination is made. For example, it may be determined that the drive force is too large when the timing at which the detection of the detection signal CS is ended is early so that the rank of the drive pulse SP is lowered. Further, it may be determined that the drive force is insufficient when the timing at which the detection of the detection signal CS is ended is late so that the rank of the drive pulse SP is raised.

The configuration diagram of the drive circuit, the configuration diagram of the stepper motor, the flow chart, the timing chart, and the like represented in each embodiment of the present invention are not limited to those described above, and can be changed as appropriate as long as the gist of the present invention is satisfied.

The invention claimed is:

1. A drive circuit for a two-coil stepper motor, comprising:
   a rotor, which is magnetized into two poles or more in a radial direction of the rotor;
   a stator including:
      a first stator magnetic-pole portion and a second stator magnetic-pole portion, which are formed so as to oppose to each other through intermediation of the rotor; and
      a third stator magnetic-pole portion, which is formed between the first stator magnetic-pole portion and the second stator magnetic-pole portion so as to face the rotor;
   a first coil, which is to be magnetically coupled to the first stator magnetic-pole portion and the third stator magnetic-pole portion;
   a second coil, which is configured to be magnetically coupled to the second stator magnetic-pole portion and the third stator magnetic-pole portion;
   a drive pulse generation circuit, which is configured to output a drive pulse for driving the rotor toward the first coil or toward the second coil;
   a detection pulse generation circuit, which is configured to output, to at least one of the first coil or the second coil, a detection pulse for detecting a counter-electromotive current generated in at least one of the first coil or the second coil, during or after the driving of the rotor due to the drive pulse; and
   a rotation detection circuit, which is configured to receive a detection signal generated in response to the detection pulse, as input to detect whether or not the rotor has rotated;
   wherein the detection pulse generation circuit is configured to output a first detection pulse to one of the first coil and the second coil to which the drive pulse is output, and to output a second detection pulse to another one of the first coil and the second coil, and wherein the rotation detection circuit is configured to determine whether or not the rotor is rotated with use of a first detection signal generated in response to the first detection pulse and a second detection signal generated in response to the second detection pulse;

wherein the rotation detection circuit is configured to:

count a total detection number of first detection signals and a total detection number of second detection signals;

determine that the rotor has not rotated when the total detection number of first detection signals is equal to or larger than the total detection number of second detection signals; and determine that the rotor has rotated when the total detection number of first detection signals is smaller than the total detection number of second detection signals.

2. The drive circuit for a two-coil stepper motor according to claim 1, wherein the first detection pulse has a pulse width that is larger than a pulse width of the second detection pulse.

3. The drive circuit for a two-coil stepper motor according to claim 1, further comprising a first detection resistor and a second detection resistor, which are configured to be connected to the first coil and the second coil at least when the first detection pulse and the second detection pulse are output, wherein a resistance value of the first detection resistor obtained when the first detection pulse is output is larger than a resistance value of the second detection resistor obtained when the second detection pulse is output.

4. The drive circuit for a two-coil stepper motor according to claim 1, wherein a first threshold value for determining whether or not to adopt the first detection signal is lower than a second threshold value for determining whether or not to adopt the second detection signal.

5. A drive circuit for a two-coil stepper motor, comprising:

a rotor, which is magnetized into two poles or more in a radial direction of the rotor;

a stator including:

a first stator magnetic-pole portion and a second stator magnetic-pole portion, which are formed so as to oppose to each other through intermediation of the rotor; and a third stator magnetic-pole portion, which is formed between the first stator magnetic-pole portion and the second stator magnetic-pole portion so as to face the rotor;

a first coil, which is to be magnetically coupled to the first stator magnetic-pole portion and the third stator magnetic-pole portion;

a second coil, which is configured to be magnetically coupled to the second stator magnetic-pole portion and the third stator magnetic-pole portion;

a drive pulse generation circuit, which is configured to output a drive pulse for driving the rotor toward the first coil or toward the second coil;

a detection pulse generation circuit, which is configured to output, to at least one of the first coil or the second coil, a detection pulse for detecting a counter-electromotive current generated in at least one of the first coil or the second coil, during or after the driving of the rotor due to the drive pulse; and a rotation detection circuit, which is configured to receive a detection signal generated in response to the detection pulse, as input to detect whether or not the rotor has rotated;

wherein the detection pulse generation circuit is configured to output a first detection pulse to one of the first coil and the second coil to which the drive pulse is output, and to output a second detection pulse to another one of the first coil and the second coil, and wherein the rotation detection circuit is configured to determine whether or not the rotor is rotated with use of a first detection signal generated in response to the first detection pulse and a second detection signal generated in response to the second detection pulse;

wherein the rotation detection circuit is configured to:

determine that the rotor has not rotated when detection of a predetermined number of first detection signals is earlier than or at the same time as detection of a predetermined number of second detection signals; and determine that the rotor has rotated when the detection of the predetermined number of first detection signals is later than the detection of the predetermined number of second detection signals.

6. The drive circuit for a two-coil stepper motor according to claim 5, wherein the first detection pulse has a pulse width that is larger than a pulse width of the second detection pulse.

7. The drive circuit for a two-coil stepper motor according to claim 5, further comprising a first detection resistor and a second detection resistor, which are configured to be connected to the first coil and the second coil at least when the first detection pulse and the second detection pulse are output, wherein a resistance value of the first detection resistor obtained when the first detection pulse is output is larger than a resistance value of the second detection resistor obtained when the second detection pulse is output.

8. The drive circuit for a two-coil stepper motor according to claim 5, wherein a first threshold value for determining whether or not to adopt the first detection signal is lower than a second threshold value for determining whether or not to adopt the second detection signal.

9. A drive circuit for a two-coil stepper motor, comprising:

a rotor, which is magnetized into two poles or more in a radial direction of the rotor;

a stator including:

a first stator magnetic-pole portion and a second stator magnetic-pole portion, which are formed so as to oppose to each other through intermediation of the rotor; and a third stator magnetic-pole portion, which is formed between the first stator magnetic-pole portion and the second stator magnetic-pole portion so as to face the rotor;

a first coil, which is to be magnetically coupled to the first stator magnetic-pole portion and the third stator magnetic-pole portion;

a second coil, which is configured to be magnetically coupled to the second stator magnetic-pole portion and the third stator magnetic-pole portion;

a drive pulse generation circuit, which is configured to output a drive pulse for driving the rotor toward the first coil or toward the second coil;

a detection pulse generation circuit, which is configured to output, to at least one of the first coil or the second coil, a detection pulse for detecting a counter-electromotive current generated in at least one of the first coil or the second coil, during or after the driving of the rotor due to the drive pulse;

a rotation detection circuit, which is configured to receive a detection signal generated in response to the detection pulse, as input to detect whether or not the rotor has rotated;

wherein the detection pulse generation circuit is configured to output a detection pulse to be output to one of the first coil and the second coil to which the drive pulse is not output, wherein the rotation detection circuit has configured to determine whether or not the rotor has rotated with use of the detection signal generated in response to the detection pulse;

wherein the detection pulse generation circuit is configured to output the detection pulse while the rotor is driven, wherein the drive pulse generation circuit is configured to end continuous output of the drive pulse due to detection of rotation of the rotor by the rotation detection circuit; and wherein the drive pulse generation circuit is configured to change a pulse width of the drive pulse until the detection signal is obtained during a period in which the drive pulse is output.

10. A drive circuit for a two-coil stepper motor, comprising:

a rotor, which is magnetized into two poles or more in a radial direction of the rotor;

a stator including:
 a first stator magnetic-pole portion and a second stator magnetic-pole portion, which are formed so as to oppose to each other through intermediation of the rotor; and
 a third stator magnetic-pole portion, which is formed between the first stator magnetic-pole portion and the second stator magnetic-pole portion so as to face the rotor;

a first coil, which is to be magnetically coupled to the first stator magnetic-pole portion and the third stator magnetic-pole portion;

a second coil, which is configured to be magnetically coupled to the second stator magnetic-pole portion and the third stator magnetic-pole portion;

a drive pulse generation circuit, which is configured to output a drive pulse for driving the rotor toward the first coil or toward the second coil;

a detection pulse generation circuit, which is configured to output, to at least one of the first coil or the second coil, a detection pulse for detecting a counter-electromotive current generated in at least one of the first coil or the second coil, during or after the driving of the rotor due to the drive pulse;

a rotation detection circuit, which is configured to receive a detection signal generated in response to the detection pulse, as input to detect whether or not the rotor has rotated;

wherein the detection pulse generation circuit is configured to output a first detection pulse to one of the first coil and the second coil to which the drive pulse is output, and to output a second detection pulse to another one of the first coil and the second coil, wherein the rotation detection circuit is configured to determine whether or not the rotor is rotated with use of a first detection signal generated in response to the first detection pulse and a second detection signal generated in response to the second detection pulse;

wherein, when a rotation detection period of determining whether or not the rotor has rotated is divided into a first rotation detection period on a front side and a second rotation detection period on a back side, the detection pulse generation circuit outputs the second detection pulse in the first rotation detection period, the rotation detection circuit determines whether the second detection signal satisfies a given condition, the detection pulse generation circuit outputs the first detection pulse in the second rotation detection period when the given condition is satisfied, and the rotation detection circuit detects rotation of the rotor based on the first detection signal.

\* \* \* \* \*